US008206779B2

(12) United States Patent
Suzuki et al.

(10) Patent No.: US 8,206,779 B2
(45) Date of Patent: Jun. 26, 2012

(54) METHOD FOR PRODUCING LAMINATE, POLARIZING PLATE, AND IMAGE DISPLAY DEVICE

(75) Inventors: Takato Suzuki, Minami-Ashigara (JP); Jun Watanabe, Minami-Ashigara (JP); Hiroyuki Yoneyama, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1332 days.

(21) Appl. No.: 11/723,949

(22) Filed: Mar. 22, 2007

(65) Prior Publication Data
US 2008/0038472 A1    Feb. 14, 2008

(30) Foreign Application Priority Data

Mar. 24, 2006    (JP) ............................... P2006-082864

(51) Int. Cl.
*B05D 5/06* (2006.01)
(52) U.S. Cl. ..................... 427/162; 427/163.1; 427/333; 427/337
(58) Field of Classification Search ............... 427/407.1, 427/372.2, 541, 542, 545, 553, 557, 558, 427/162, 163.1, 333, 337, 340
See application file for complete search history.

(56) References Cited

U.S. PATENT DOCUMENTS

| 2006/0068128 | A1* | 3/2006 | Greener et al. | ................ 428/1.1 |
| 2006/0225827 | A1* | 10/2006 | Lei et al. | ........................ 156/64 |
| 2006/0225831 | A1* | 10/2006 | Lei et al. | ...................... 156/229 |
| 2007/0121211 | A1* | 5/2007 | Watanabe et al. | ............. 359/601 |
| 2007/0134477 | A1* | 6/2007 | Bell | ............................. 428/216 |
| 2007/0141244 | A1* | 6/2007 | Bell et al. | .................. 427/163.1 |
| 2007/0195431 | A1* | 8/2007 | Asakura et al. | ............... 359/707 |
| 2007/0200147 | A1 | 8/2007 | Ohtani et al. | |

FOREIGN PATENT DOCUMENTS

| JP | H9-511681 | 11/1997 |
| JP | 3314965 B2 | 6/2002 |
| JP | 2006-72320 A | 3/2006 |
| WO | WO 95/29763 | 11/1995 |
| WO | WO 2005/123274 A1 * | 12/2005 |

OTHER PUBLICATIONS

Office Action issued Jan. 31, 2012, in corresponding Japanese Patent Application No. JP 2007-072991, and English translation thereof.

* cited by examiner

*Primary Examiner* — William Phillip Fletcher, III
(74) *Attorney, Agent, or Firm* — Buchanan Ingersoll & Rooney PC

(57) ABSTRACT

A method for producing a laminate comprising a support; and at least two layers provided by coating at least two kinds of coating compositions, respectively, the method comprising: simultaneously coating at least two kinds of coating compositions on a support; and drying the at least two kinds of coating compositions, wherein the at least two kinds of coating compositions each comprises a compound having a polymerizable functional group capable of forming a chemical bond to each other.

9 Claims, 5 Drawing Sheets

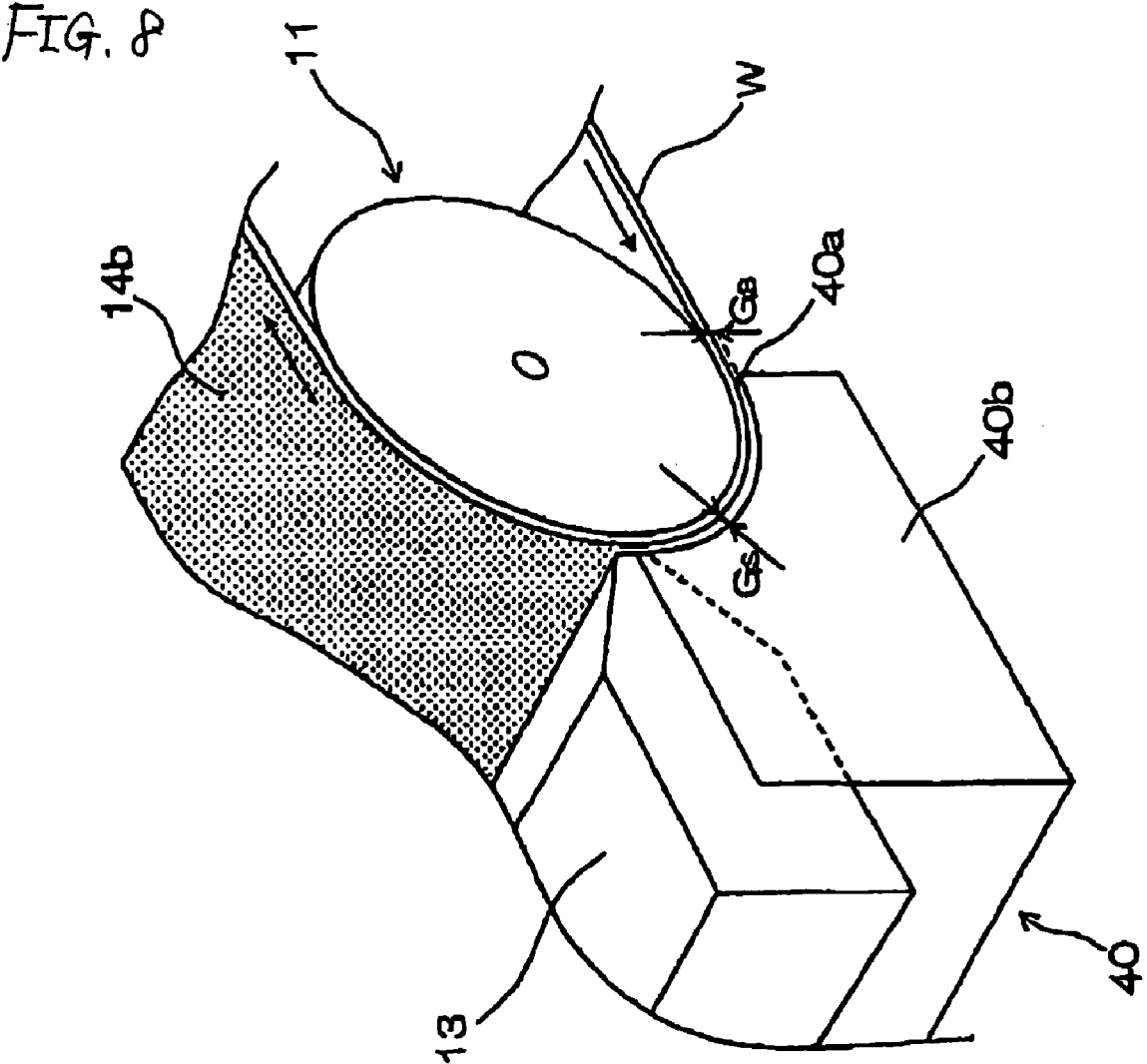

METHOD FOR PRODUCING LAMINATE, POLARIZING PLATE, AND IMAGE DISPLAY DEVICE

BACKGROUND OF THE INVENTION

1. Field of the Invention

The present invention relates to a production method of a laminate, a laminate produced by the production method, and a polarizing plate and an image display device each using the laminate.

2. Description of the Related Art

An antireflection film is used for various image display devices such as liquid crystal display (LCD), plasma display panel (PDP), electroluminescence display (ELD) and cathode ray tube display (CRT).

A method for forming the antireflection film by coating has been proposed. For example, in a scratch-resistant antiglare film, as means for ensuring scratch resistance, there has been proposed a film obtained by a method of finger-touch drying or half-curing a coating film coated on a support, thereby providing a semicured state, and after further stacking a coating film on the semicured coating film, simultaneously curing two coating film layers (see, Japanese Patent 3,314,965). The scratch resistance is improved by this technique but is not yet satisfied. Moreover, the coating film in the finger-touch dried or half-cured state is soft in the film hardness and is readily scratched during the handling. Also, for forming a multilayer film, the coating step needs to be performed multiple times and the productivity may decrease.

SUMMARY OF THE INVENTION

One aspect of the present invention is to provide a production method of a laminate having good scratch resistance. Another aspect of the present invention is to provide a laminate (preferably a laminate for optical film or a laminate for antireflection film) produced by the production method with excellent productivity, and a polarizing plate and an image display device each using the laminate.

As a result of intensive investigations to solve the problems described above, the present inventors have found that when the following constitutions are constructed, the problems can be solved and the aspects can be achieved. The present invention has been accomplished based on this finding. That is, the aspects of the present invention have been attained by the following constitutions.

(1) A method for producing a laminate comprising a support; and at least two layers provided by coating at least two kinds of coating compositions, respectively, the method comprising:

simultaneously coating at least two kinds of coating compositions on a support; and drying the at least two kinds of coating compositions, wherein the at least two kinds of coating compositions each comprises a compound having a polymerizable functional group capable of forming a chemical bond to each other.

(2) The method as described in (1) above, wherein the at least two kinds of coating compositions each comprises a radical polymerizable compound and a radical polymerization initiator.

(3) The method as described in (2) above, wherein the radical polymerization initiators contained in the at least two kinds of coating compositions all are photoradical polymerization initiators.

(4) The method as described in (2) above, wherein the radical polymerization initiators contained in the at least two kinds of coating compositions all are thermal radical polymerization initiators.

(5) The method as described in any of (2) to (4) above, wherein the radical polymerizable compound comprises at least one compound having at least two (meth)acryloyl groups within one molecule.

(6) The method as described in (1) above, wherein the at least two kinds of coating compositions each comprises a cationic curable compound and a curing catalyst.

(7) The method as described in (6) above, wherein the curing catalysts contained in the at least two kinds of coating compositions all are photoacid generators.

(8) The method as described in (6) above, wherein the curing catalysts contained in the at least two kinds of coating compositions all are thermal acid generators.

(9) A method for producing a laminate comprising a support; and at least two layers provided by coating at least two kinds of coating compositions, respectively, the method comprising:

simultaneously coating at least two kinds of coating compositions on a support; and drying the at least two kinds of coating compositions, wherein the at least two kinds of coating compositions each comprises at least one of a hydroxyl group-containing compound and a crosslinking compound capable of reacting with a hydroxyl group.

(10) The method as described in (9) above, wherein the crosslinking compound capable of reacting with a hydroxyl group is a compound having a skeleton in which a nitrogen atom is bonded to a triazine ring.

(11) The method as described in any of (1) to (10) above, wherein using a coating apparatus comprising at least one slot die and at least one slide-type coating head disposed in a vicinity of an end part of the at least one slot die, at least two kinds of coating compositions are simultaneously coated on a support from the at least one slot die and the at least one slide-type coating head, respectively, while allowing the support to run in a state of being supported by a backup roller.

(12) The method as described in any of (1) to (11) above, which further comprises:

curing layers provided by drying the at least two kinds of coating compositions by at least one of a heat treatment and an irradiation with ionizing radiation.

(13) The method as described in any of (1) to (12) above, wherein layers provided by coating the at least two kinds of coating compositions each has a refractive index different from a refractive index of a layer adjacent thereto.

(14) The method as described in any of (1) to (13) above, wherein in a vicinity of an interface between layers provided by coating the at least two kinds of coating compositions, a mixing region in which the compound having a polymerizable functional group capable of forming a chemical bond to each other is allowed to migrate from respective layers and mixed is present.

(15) A laminate produced by a method as described in any of (1) to (14) above.

(16) The laminate as described in (15) above, which is used for an optical film or an antireflection film.

(17) A polarizing plate, which comprises:

a pair of protective films; and a polarizing film between the pair of protective films, wherein at least one of the pair of protective films is a laminate as described in (15) or (16) above.

(18) An image display device, which comprises a polarizing plate as described in (17) above on a viewing side of a display screen.

BRIEF DESCRIPTION OF THE DRAWINGS

FIG. 8 illustrates a perspective view showing the slot die 13 and its periphery at the coating step in the present invention.

DETAILED DESCRIPTION OF THE INVENTION

Figure 1:
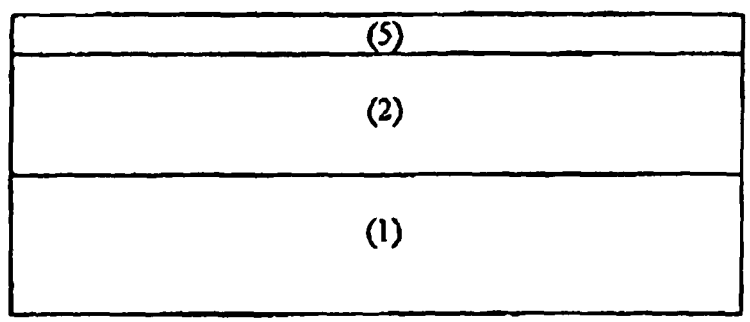
FIG. 1 illustrates a cross-sectional view schematically showing a representative layer construction of the laminate (antireflection film) of the present invention.

The present invention is described in detail below. Incidentally, the term "from (numerical value 1) to (numerical value 2)" as used in the present invention for expressing a physical value, a characteristic value or the like means "(numerical value 1) or more and (numerical value 2) or less". Also, the term "(meth)acrylate" as used in the present invention means "at least either acrylate or methacrylate". The same applies to "(meth)acrylic acid" and the like.

The production method of a laminate is, in one aspect of the present invention, a production method of a laminate comprising a support having thereon layers provided by coating at least two kinds of coating compositions, respectively, with the at least two kinds of coating compositions containing compounds having polymerizable functional groups capable of forming a chemical bond to each other in common, the method comprising simultaneously coating at least two kinds of coating compositions on a support and drying the coatings.

The production method of a laminate is, in another aspect of the present invention, a production method of a laminate comprising a support having thereon layers provided by coating at least two kinds of coating compositions each containing a radical polymerizable compound and a radical polymerization initiator, the method comprising simultaneously coating at least two kinds of coating compositions on a support and drying the coatings.

The production method of a laminate is, in still another aspect of the present invention, a production method of a laminate comprising a support having thereon layers provided by coating at least two kinds of coating compositions each containing a cationic curable compound and a curing catalyst, the method comprising simultaneously coating at least two kinds of coating compositions on a support and drying the coatings.

The production method of a laminate is, in yet still another aspect of the present invention, a production method of a laminate comprising a support having thereon layers provided by coating at least two kinds of coating compositions, respectively, with the at least two kinds of coating compositions containing at least either one of a hydroxyl group-containing compound and a crosslinking compound capable of reacting with a hydroxyl group in two kinds of compositions, the method comprising simultaneously coating at least two kinds of coating compositions on a support and drying the coatings.

The laminate produced by the production method of the present invention, in yet still another aspect of the present invention, is limited to a laminate produced by the production method of the present invention.

The laminate of the present invention is a laminate having layers provided by coating at least two kinds of coating compositions, respectively, on a support. The function of the layers provided by coating at least two kinds of coating compositions, respectively, is not particularly limited and examples of the layer include an information-recordable layer and an optically active layer. The at least two kinds of coating compositions are sufficient if a layer can be formed after coating. From the standpoint that a thin layer can be formed by coating, the laminate of the present invention is preferably a laminate for optical film or antireflection film. That is, the laminate of the present invention is preferably used as an optical film or an antireflection film. Incidentally, in the specification, the term "film of the present invention" is sometimes used in the same meaning as the laminate of the present invention.

Various optical films can be produced by the production method of a laminate of the present invention. In the case where the laminate of the present invention is a laminate for optical film or a laminate for antireflection film, the layers provided by coating at least two kinds of coating compositions are preferably at least two optical layers (optical functional layers). The optical layer is not particularly limited, but examples thereof include a layer having hardcoat property (hardcoat layer), a medium refractive index layer, a high refractive index layer and a low refractive index layer.

The boundary between at least two optical layers preferably has an optical interface. More specifically, for imparting an optical interference function, the difference between the refractive indexes of the both layers is preferably from 0.02 to 1.5, more preferably from 0.03 to 1.25, still more preferably from 0.05 to 1.0.

In the case of having another optical layer in addition to the at least two optical layers having an optical interface, the layer may be an optical layer having an optical interface with the at least two optical layers having an optical interface and/or an optical layer having no optical interface therewith. In the case of having no optical interface, in order to eliminate the optical action, the difference between the refractive index of the at least two optical layers having an optical interface and the refractive index of the optical layer having no optical interface is preferably from 0 to less than 0.02, more preferably from 0 to less than 0.01.

The presence or absence of the optical interface can be confirmed, for example, by the presence or absence of interference wave when the wavelength dependency of reflectance is measured. The refractive index of each optical layer can be determined by measuring the refractive index of each coating composition single layer (if desired, the refractive index of the interface on both sides thereof) by means of an Abbe refractometer or similarly to the above, by the fitting after measuring the wavelength dependency of reflectance.

The preferred embodiments of the laminate of the present invention are described in detail below.

In the present invention, when a laminate for optical film or a laminate for antireflection film is formed by simultaneously coating at least two kinds of coating compositions, the thicknesses after drying and curing of at least two layers simultaneously coated are preferably, in the order of [upper layer]/[lower layer], [from 30 to less than 200 nm]/[from 0.5 to 20 µm], more preferably [from 50 to 170 nm]/[from 1.0 to 15 µm], and most preferably [from 60 to 150 nm]/[from 1.5 to 10 µm]. Within this film thickness range, the surface state uniformity of the coating film is enhanced and it becomes easy to design the optical interference as the optical functional layer based on the difference in the refractive index. If the upper layer is too thin, repelling readily occurs, whereas if the upper layer is excessively thick, the balance between two layers is lost and non-uniform interface is liable to result.

In the present invention, the layers composed of those at least two kinds of coating solutions are not particularly limited but are preferably an optical interference layer and a hardcoat layer. Examples of the optical interference layer as used herein include a low refractive index layer, a medium refractive index layer and a high refractive index layer each having a thickness in the above-described preferred range. Also, the hardcoat layer is a cured film having a thickness in the above-described preferred range and is preferably a layer having a pencil hardness higher by 1H or more than that of the support alone. The optical interference layer may concurrently have functions such as antifouling property, antistatic property and ultraviolet ray absorptivity. The hardcoat layer may also concurrently have functions such as antiglare property, light-scattering property, antistatic property, easy adhesion property, interference unevenness-preventing property and refractive index adjusting property.

The factors which the materials suitably used for the production method of the present invention should have are described below. In the present invention, in order to simultaneously apply coating solutions for two or more layers and form layers differing in the refractive index, it is necessary that at least partial components of both coating solutions are not mixed after coating, drying and curing. The means for suppressing the mixing utilizes (A) reducing compatibility between both components, (B) suppressing diffusion of the layer constituent component between layers, or (C) reducing the interface energy with the adjoining interface. Accordingly, selection of the material for imparting these properties becomes important. Particularly, when one layer is formed as a thin layer to have a thickness as small as less than 200 nm after drying and curing, a coating defect such as repelling at the time of simultaneously coating and providing two or more layers tends to readily occur. This tendency increases when the means of reducing compatibility in (A) above is employed. It has been found that this problem can be solved when the reactive functional group in the curable compound is made in common between two layers simultaneously coated. The operational mechanism is not clearly known but this effect is presumed to be brought out because the affinity between two layers is appropriately enhanced by virtue of containing a functional group in common between two layers.

The preferred layer constitution of the laminate produced by the production method of the present invention is described below.

1) Low Refractive Index Layer/Hardcoat Layer Constitution

The main constituent material of the low refractive index layer is preferably a fluorine-containing polymer or a low refractive index particle. In view of (A) reducing the compatibility and (B) preventing diffusion, the mass average molecular weight of the fluorine-containing polymer is preferably from 5,000 to 500,000, more preferably from 5,000 to 300,000, and most preferably from 10,000 to 100,000. Also, in view of (C) above, a fluorine-containing polymer capable of giving a low surface free energy is preferred and it is more preferred to have a perfluorohydrocarbon group having a carbon atom number of $C_3F_7$ or more. Furthermore, the fluorine polymer preferably has a polysiloxane partial structure as represented by polydimethylsiloxane. The details of the molecular structure are described later in the paragraph of fluorine polymer. In this construction, the fluorine-containing polymer having a functional group capable of forming a chemical bond to the constitutional components of the hardcoat layer is preferably from 30 to 99 mass %, more preferably from 40 to 95 mass % with respect to the solid contents of the low refractive index layer. (In this specification, mass ratio is equal to weight ratio.) In addition, other than the fluorine-containing polymer, it may be possible to contain a compound having a functional group capable of forming a chemical bond to the fluorine-noncontaining constitutional components of the hardcoat layer, and the content of the compound is preferably lower than that of the fluorine-containing polymer, and from 1 to 30 mass % is preferred.

In the case of using a low refractive index particle, in view of (B) preventing diffusion, the particle size is preferably large and is preferably from 30 to 150 nm, more preferably from 35 to 80 nm. Also, in view of (C), the low refractive index particle is preferably surface-treated so as to give a low surface free energy and is preferably surface-treated with a compound using a compound containing an alkyl group or a fluorine-containing alkyl group. The particle and the surface treatment are described in more detail later in the paragraph of <Low Refractive Index Particle> and (Surface-Treating Agent) layer.

2) Medium•High Refractive Index Layer/Hardcoat Layer Constitution

A constitution where the medium•high refractive index layer contains a high refractive index particle is preferred. As for the high refractive index particle, in view of (B) preventing diffusion, the particle size is preferably large and is preferably from 30 to 150 nm, more preferably from 35 to 80 nm. Also, in view of (C), the high refractive index particle is preferably surface-treated so as to give a low surface free energy and is preferably surface-treated with a compound using a compound containing an alkyl group or a fluorine-containing alkyl group. These are described in more detail later in the paragraph of <High Refractive Index Particle> and (Surface-Treating Agent).

1. Coating Composition in Production Method of Laminate of the Present Invention The constitutions of the at least two kinds of coating compositions for use in the production method of a laminate of the present invention are described below.

(Compounds Having Polymerizable Functional Groups Capable of Forming Chemical Bond to Each Other (Curable Compound))

The laminate (preferably a film, more preferably an optical film) of the present invention can be formed by a crosslinking or polymerization reaction of compounds having polymerizable functional groups capable of forming a chemical bond to each other (preferably a radical polymerizable compound or a cationic curable compound). The curable compounds may be the same or different. The curable compound preferably acts as a binder in the layers provided by coating at least two kinds of coating compositions. In the case of practicing simultaneous superposition, the curable compounds in respective layers are preferably a group of curable compounds which initiate a reaction by the same kind of cause. By virtue of binders formed of the same kind of curable compounds, the curing step can be simplified. Furthermore, the layers are chemically bound and this brings about enhancement of the interface adhesion and is also preferred in view of scratch resistance. In addition, by using curable compounds having a common functional group, a coating defect such as repelling at the simultaneous coating of two or more layers is decreased. The operational mechanism is not clearly known but this effect is presumed to be brought out because the affinity between two layers is enhanced by virtue of containing a functional group in common between two layers. This means is used particularly for improving the "repelling" which readily occurs as a result of forming the upper layer to a small thickness of less than 200 nm so as to allow the layer to act as an optical functional layer.

(Radical Polymerizable Compound)

The functional group in the radical polymerizable polyfunctional monomer or polyfunctional oligomer is preferably a photo-, electron beam-, radiation- or heat-polymerizable functional group. Examples of the radical polymerizable functional group include an unsaturated polymerizable functional group such as (meth)acryloyl group, vinyl group, styryl group and allyl group, with a (meth)acryloyl group being preferred.

Specific examples of the radical polymerizable polyfunctional monomer having a radical polymerizable functional group include:

(meth)acrylic acid diesters of alkylene glycol, such as neopentyl glycol acrylate, 1,6-hexanediol(meth)acrylate and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohol, such as pentaerythritol di(meth)acrylate; and (meth)acrylic acid diesters of ethylene oxide or propylene oxide adduct, such as 2,2-bis{4-(acryloxy.diethoxy)phenyl}propane and 2-2-bis{4-(acryloxy-polypropoxy)phenyl}propane.

The radical polymerizable polyfunctional monomer is preferably a compound having at least two (meth)acryloyl groups within one molecule, because interface adhesion and/or scratch resistance of the obtained laminate are enhanced.

Furthermore, epoxy(meth)acrylates, urethane(meth)acrylates and polyester(meth)acrylates may also be preferably used as the radical polymerizable polyfunctional monomer.

Among these, esters of a polyhydric alcohol with a (meth)acrylic acid are preferred, and a polyfunctional monomer having three or more (meth)acryloyl groups within one molecule is more preferred. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate and tripentaerythritol hexatriacrylate.

Furthermore, a urethane(meth)acrylate may also be suitably used as the radical polymerizable polyfunctional monomer used in the coating composition of the present invention. The urethane(meth)acrylate used in the composition of the present invention must contain at least one (meth)acryloyl group bonded to the main chain of the oligomer and preferably contains 2 or more, more preferably contains 4 or more, further more preferably 6 or more, (meth)acryloyl groups.

Specific preferred examples of the urethane(meth)acrylate include a compound represented by the following formula (2):

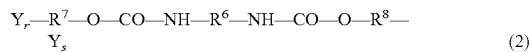

$$Y_r-R^7-O-CO-NH-R^6-NH-CO-O-R^8- \atop Y_s \qquad (2)$$

$R^6$ is a divalent organic group and is selected from divalent organic groups having a molecular weight of usually from 14 to 10,000, preferably from 76 to 500. $R^7$ and $R^8$ are (r+1)-valent and (s+1)-valent organic groups, respectively, and each is preferably selected from linear, branched or cyclic saturated hydrocarbon groups and unsaturated hydrocarbon groups. Y represents a monovalent organic group having in the molecule thereof a polymerizable unsaturated group capable of causing an intermolecular crosslinking reaction in the presence of an active radical species. Also, r and s each is preferably an integer of 1 to 20, more preferably from 1 to 10, still more preferably from 1 to 5. In the formula, $R^7$ and $R^8$ may be the same or different, and $Y_r$ and $Y_s$ may be the same or different.

Examples of the urethane(meth)acrylate for use in the present invention include BEAM SET 102, 502H, 505A-6, 510, 550B, 551B, 575, 575CB, EM-90 and EM92, trade names, produced by Arakawa Chemical Industries, Ltd.; PHOTOMER 6008 and 6210, trade names, produced by San Nopco Ltd.; NK OLIGO U-2PPA, U4HA, U-6HA, H-15HA, UA-32PA, U-324A, U4H and U-6H, trade names, produced by Shin-Nakamura Chemical Co., Ltd.; ARONIX M-1100, M-1200, M-1210, M-1310, M-1600 and M-1960, trade names, produced by Toagosei Co., Ltd.; AH-600, AT606 and UA-306H, trade names, produced by Kyoeisha Chemical Co., Ltd.; KAYARAD UX-2201, UX-2301, UX-3204, UX-3301, UX4101, UX-6101 and UX-7101, trade names, produced by Nippon Kayaku Co., Ltd.; SHIKOH UV-1700B, UV-3000B, UV-6100B, UV-6300B, UV-7000 and UV-2010B, trade names, produced by Nippon Synthetic Chemical Industry Co., Ltd.; ART RESIN UN-1255, UN-5200, HDP4T, HMP-2, UN-901T, UN-3320HA, UN-3320HB, UN-3320HC, UN-3320HS, H-61 and HDP-M20, trade names, produced by Negami Chemical Industrial Co., Ltd.; and Ebecryl 6700, 204, 205, 220, 254, 1259, 1290K, 1748, 2002, 2220, 4833, 4842, 4866, 5129, 6602 and 8301, trade names, produced by DAICEL-UCB Co., Ltd.

As for the monomer binder, monomers differing in the refractive index may be used for controlling the refractive index of each layer. In particular, examples of the high refractive index monomer include bis(4-methacryloylthiophenyl)

sulfide, vinylnaphthalene, vinyl phenyl sulfide and 4-methacryloxyphenyl-4'-methoxyphenylthioether.

Furthermore, dendrimers described, for example, in JP-A-2005-76005 and JP-A-2005-36105, and norbornene ring-containing monomers described, for example, in JP-A-2005-60425 may also be used.

Two or more kinds of polyfunctional monomers may be used in combination. The polymerization of a monomer having such a radical polymerizable group may be performed by irradiation of ionizing radiation or heating in the presence of a photoradical polymerization initiator or a thermal radical polymerization initiator.

The radical polymerization initiators contained in the at least two kinds of coating compositions are preferably all a photoradical polymerization initiator or all a thermal radical polymerization initiator. In the simultaneous multilayer coating (simultaneous superposition coating), respective layers are preferably cured under the same condition (all layers by a heat curing process or all layers by photo-curing process), because at least one of simplification of production process and enhancement of interface adhesion can be achieved.

(Cationic Curable Compound (Compound Having Cationic Polymerizable Group))

Examples of the cationic polymerizable group include an epoxy group, an oxetanyl group, an oxazolyl group and a vinyloxy group. The cationic polymerizable group is preferably a ring-opening polymerizable group, more preferably an epoxy group or an oxetanyl group, still more preferably an epoxy group. These groups each may have a substituent at a substitutable position.

A plurality of cationic polymerizable groups are preferably introduced per one molecule of the curing agent. The number of cationic polymerizable groups introduced per one molecule is more preferably from 2 to 20, still more preferably from 3 to 10

Examples of the compound suitably used in the present invention include, as a commercially available product, DENACOL EX314, DENACOL EX411, DENACOL EX421, DENACOL EX521, DENACOL EX611, DENACOL EX612 (all produced by Nagase Chemicals Ltd.), CELOXIDE GT301 and CELOXIDE GT401 (both produced by Daicel Chemical Industries, Ltd.).

Examples of the compound having a cationic polymerizable group, which is useful in the present invention, are set forth below.

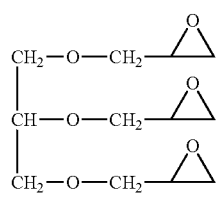

A-1

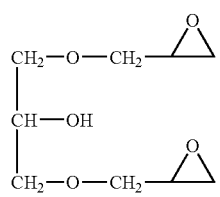

A-2

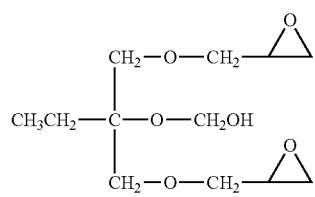

A-3

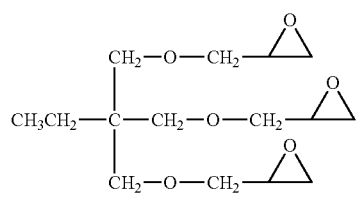

A-4

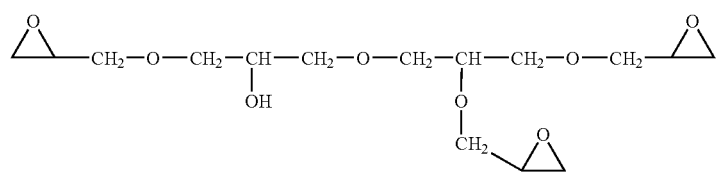

A-5

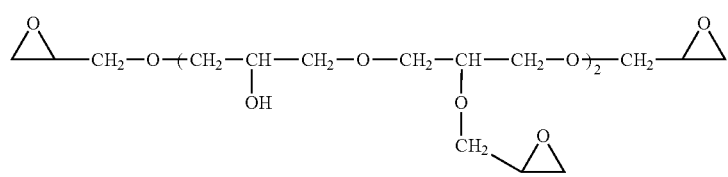

A-6

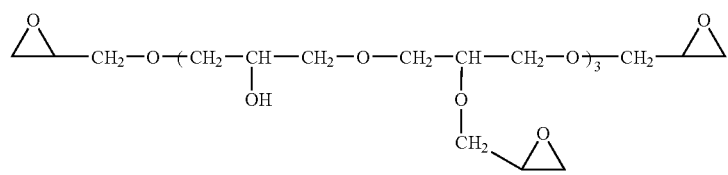

A-7

-continued
A-8
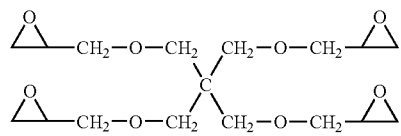
A-9
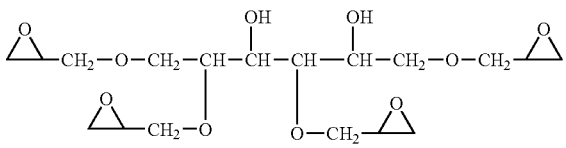
A-10
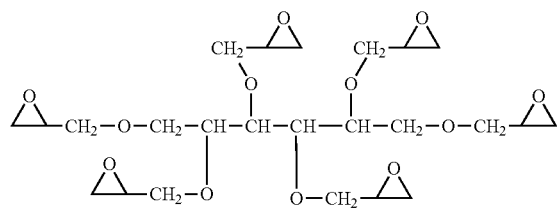
A-11
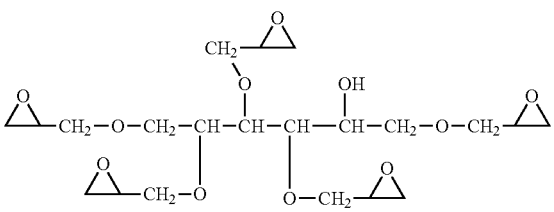
A-12
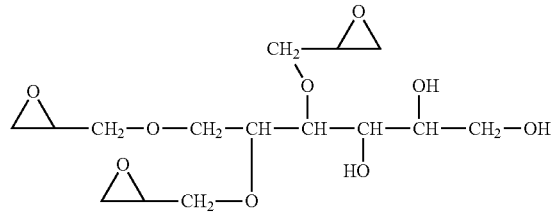
A-13
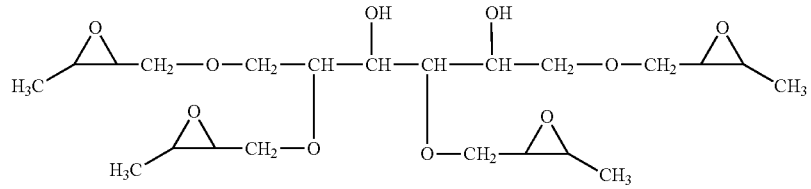
A-14
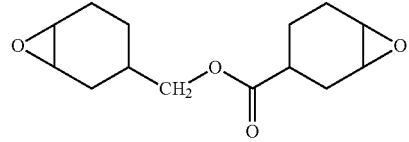
A-15
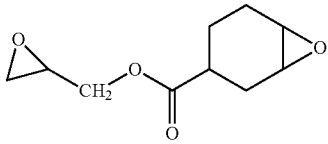
A-16
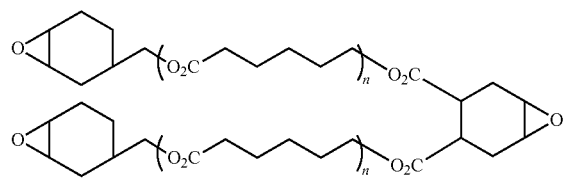
n = 1 ~ 4
A-17
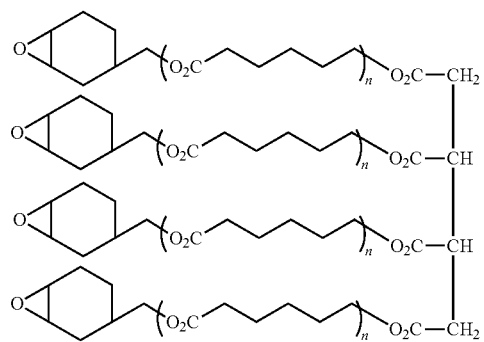
n = 1 ~ 4
A-18
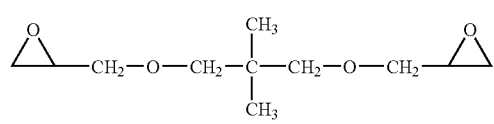
A-19
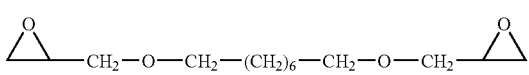

-continued
A-20
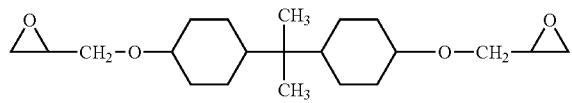
A-21
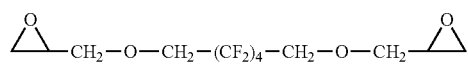
A-22
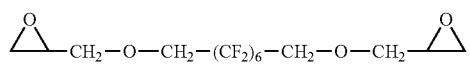
A-23
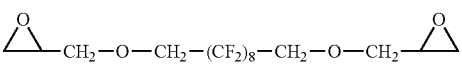
A-24
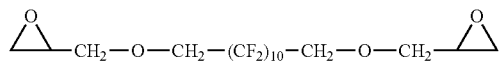
A-25
A-26
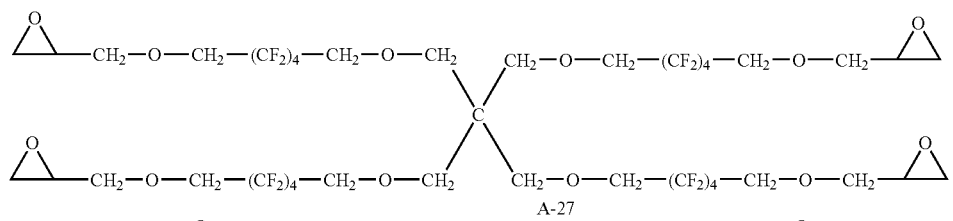
A-27
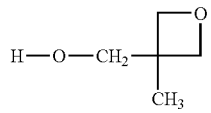
A-28
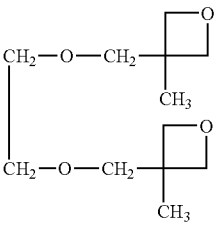
A-29
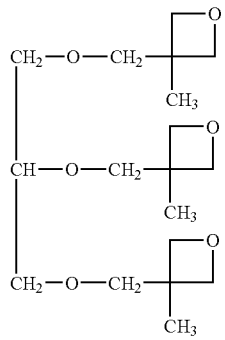
A-30
A-31
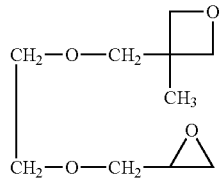
A-32
A-33
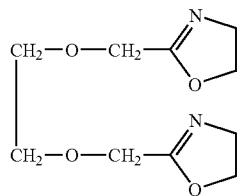
A-34
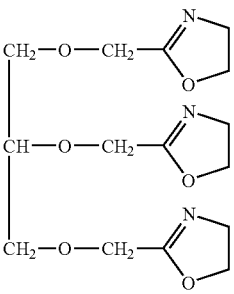

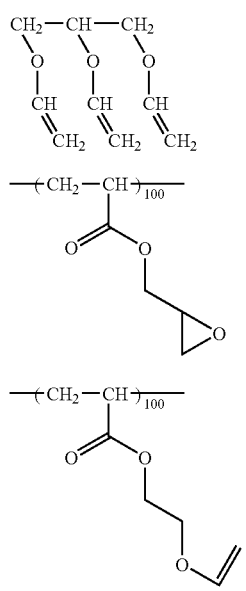
A-35

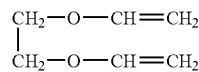
A-36

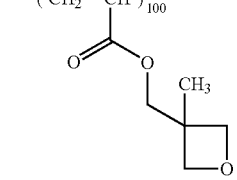
A-37

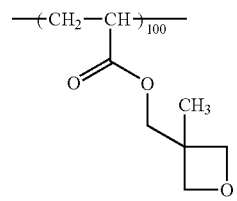
A-38

A-39

The molecular weight of the above-described compound is not particularly limited but is preferably from 200 to 10,000, more preferably from 200 to 3,000, still more preferably from 400 to 1,500.

(Fluorine-Containing Copolymer Compound)

In the present invention, a fluorine-containing copolymer compound can be preferably used as a binder forming a low refractive index layer.

Examples of the fluorine-containing vinyl monomer include fluoroolefins (e.g., fluoroethylene, vinylidene fluoride, tetrafluoroethylene, hexafluoropropylene), partially or completely fluorinated alkyl ester derivatives of (meth) acrylic acid (e.g., BISCOTE 6FM (trade name, produced by Osaka Organic Chemical Industry Ltd.), R-2020 (trade name, produced by Daikin Industries, Ltd.)), and completely or partially fluorinated vinyl ethers. Among these, perfluoroolefins are preferred, and hexafluoropropylene is more preferred in view of refractive index, solubility, transparency, availability and the like. When the compositional ratio of the fluorine-containing vinyl monomer is increased, the refractive index can be lowered but the film strength decreases. In the present invention, the fluorine-containing vinyl monomer is preferably introduced such that the copolymer has a fluorine content of 20 to 60 mass %, more preferably from 25 to 55 mass %, still more preferably from 30 to 50 mass %.

The constituent unit for imparting crosslinking reactivity mainly includes the following units (A), (B) and (C):

(A): a constituent unit obtained by the polymerization of a monomer previously having a self-crosslinking functional group within the molecule, such as glycidyl methacrylate and glycidyl vinyl ether, (B) a constituent unit obtained by the polymerization of a monomer having a carboxyl group, a hydroxyl group, an amino group, a sulfo group or the like, such as (meth)acrylic acid, methylol(meth)acrylate, hydroxyalkyl(meth)acrylate, allyl acrylate, hydroxyethyl vinyl ether, hydroxybutyl vinyl ether, maleic acid and crotonic acid, and (C) a constituent unit obtained by reacting a compound having a group capable of reacting with the functional group of (A) or (B) above within the molecule and separately having a crosslinking functional group, with the constituent unit of (A) or (B) above (for example, a constituent unit which can be synthesized by a technique such as a method of causing an acrylic acid chloride to act on a hydroxyl group).

In the constituent unit of (C), the crosslinking functional group is preferably a photopolymerizable group. Examples of the photopolymerizable group include a (meth)acryloyl group, an alkenyl group, a cinnamoyl group, a cinnamylideneacetyl group, a benzalacetophenone group, a styrylpyridine group, an α-phenylmaleimide group, a phenylazide group, a sulfonylazide group, a carbonylazide group, a diazo group, an o-quinonediazide group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group and an azadioxabicyclo group. The constituent unit may contain one of these groups or two or more species thereof. Among these, a (meth)acryloyl group and a cinnamoyl group are preferred, and a (meth)acryloyl group is more preferred.

The specific method for preparing the photopolymerizable group-containing copolymer includes, but is not limited to, the following methods:

a. a method of reacting a (meth)acrylic acid chloride with a crosslinking functional group-containing copolymer having a hydroxyl group, thereby effecting esterification, b. a method of reacting a (meth)acrylic acid ester having an isocyanate group with a crosslinking functional group-containing copolymer having a hydroxyl group, thereby effecting urethanization, c. a method of reacting a (meth)acrylic acid with a crosslinking functional group-containing copolymer having an epoxy group, thereby effecting esterification, and d. a method of reacting a (meth)acrylic acid ester having an epoxy group with a crosslinking functional group-containing copolymer having a carboxyl group, thereby effecting esterification.

The amount of the photopolymerizable group introduced can be arbitrarily controlled and from the standpoint of, for example, stabilizing the coated film surface state, reducing the surface state failure when an inorganic particle is present together, or enhancing the film strength, it is also preferred to leave a constant amount of carboxyl group, hydroxyl group or the like.

In the copolymer useful for the present invention, in addition to the repeating unit derived from the fluorine-containing vinyl monomer and the repeating unit having a (meth)acryloyl group in the side chain, other vinyl monomers may be appropriately copolymerized from various viewpoints such as adhesion to substrate, Tg (contributing to film hardness) of polymer, solubility in solvent, transparency, slipperiness, dust protection and antifouling property. A plurality of these vinyl monomers may be used in combination according to the purpose, and these monomers are preferably introduced to give a total content of 0 to 65 mol %, more preferably from 0 to 40 mol %, still more preferably from 0 to 30 mol %, in the copolymer.

The vinyl monomer unit which can be used in combination is not particularly limited, and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate, 2-hydroxyethyl acrylate), methacrylic acid esters (e.g., methyl methacrylate, ethyl methacrylate, butyl methacrylate, 2-hydroxyethyl methacrylate), styrene derivatives (e.g., styrene, p-hydroxymethylstyrene, p-methoxystyrene), vinyl ethers (e.g., methyl vinyl ether, ethyl vinyl ether, cyclohexyl vinyl ether, hydroxyethyl vinyl ether, hydroxybutyl vinyl ether), vinyl esters (e.g., vinyl acetate, vinyl propionate, vinyl cinnamate), unsaturated carboxylic acids (e.g., acrylic acid, methacrylic acid, crotonic acid, maleic acid, itaconic acid), acrylamides (e.g., N,N-dimethylacrylamide, N-tert-butylacrylamide, N-cyclohexylacrylamide), methacrylamides (e.g., N,N-dimethylmethacrylamide), and acrylonitrile.

The fluorine-containing polymer particularly useful in the present invention is a random copolymer of a perfluoroolefin and a vinyl ether or vinyl ester. In particular, the fluorine-containing polymer preferably has a group capable of undergoing a crosslinking reaction by itself (for example, a radical reactive group such as (meth)acryloyl group, or a ring-opening polymerizable group such as epoxy group and oxetanyl group). The crosslinking reactive group-containing polymerization unit preferably occupies from 5 to 70 mol %, more preferably from 30 to 60 mol %, in all polymerization units of the polymer. Preferred examples of the polymer include those described in JP-A-2002-243907, JP-A-2002-372601, JP-A-2003-26732, JP-A-2003-222702, JP-A-2003-294911, JP-A-2003-329804, JP-A-20044444 and JP-A-200445462.

The fluorine-containing polymer for use in the present invention preferably has a polystyrene-reduced mass average molecular weight of 5,000 to 500,000, more preferably from 5,000 to 300,000, and most preferably from 10,000 to 100,000, as measured by gel permeation chromatography.

[Compound Having Polysiloxane Partial Structure]

The compound having a polysiloxane partial structure, which can be particularly preferably used in the present invention, is described in detail below.

These compounds are roughly classified into those containing a polysiloxane partial structure in the polymer main chain as represented by formula (1-1) and those having a polysiloxane partial structure in the polymer side chain as represented by formula (2-1).

(Polymer Having Polysiloxane Partial Structure in Polymer Main Chain)

The polymer having a polysiloxane partial structure in the polymer main chain is preferably a fluorine-containing polymer containing a polysiloxane partial structure and a repeating unit derived from a fluorine-containing vinyl monomer in the main chain and containing a repeating unit having a (meth)acryloyl group and a repeating unit having a hydroxyl group in the side chain. Such a polymer can serve as a resin curable upon irradiation with ionizing radiation and also as a compound having a polysiloxane partial structure. This polymer is preferably represented by the following formula (1-1):

Formula (1-1):

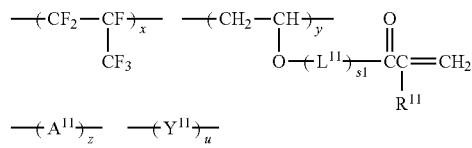

In formula (1-1), $L^{11}$ represents a linking group having a carbon number of 1 to 10, preferably a linking group having a carbon number of 1 to 6, more preferably a linking group having a carbon number of 2 to 4, which may be linear or may have a branched or cyclic structure and which may have a heteroatom selected from O, N and S. Preferred examples thereof include *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—, —CONH—$(CH_2)_3$—O—, *—$CH_2CH(OH)CH_2$—O—** and *—$CH_2CH_2OCONH(CH_2)_3$—O—** {wherein * denotes a linking site on the polymer main chain side and ** denotes a linking site on the (meth)acryloyl group side}.

s1 represents 0 or 1.

$R^{11}$ represents a hydrogen atom or a methyl group and in view of curing reactivity, preferably a hydrogen atom.

$A^{11}$ represents a repeating unit having a hydroxyl group in the side chain. This repeating unit is not particularly limited as long as it is a constituent component of a monomer copolymerizable with hexafluoropropylene, and may be appropriately selected in view of various points such as adhesion to substrate, Tg of polymer (contributing to film hardness), solubility in solvent, transparency, slipperiness, dust protection and antifouling property. The repeating unit may comprise a single vinyl monomer or a plurality of vinyl monomers according to the purpose.

Preferred examples of the vinyl monomer constituting $A^{11}$ include vinyl ethers such as methyl vinyl ether, ethyl vinyl ether, tert-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as methyl(meth)acrylate, ethyl(meth)acrylate, hydroxyethyl(meth)acrylate, glycidyl methacrylate, allyl(meth)acrylate and (meth)acryloyloxypropyltrimethoxysilane; styrene derivatives such as styrene and p-hydroxymethylstyrene; unsaturated carboxylic acids and derivatives thereof, such as crotonic acid, maleic acid and itaconic acid. Among these, vinyl ether derivatives and vinyl ester derivatives are more preferred, and vinyl ether derivatives are still more preferred. In view of being less affected by oxygen during film curing, a monomer containing a glycidyl group is preferred.

$Y^{11}$ represents a constituent component containing a polysiloxane partial structure in the main chain. The method for introducing a polysiloxane partial structure into the main chain is not particularly limited and examples thereof include a method using a polymer-type initiator such as azo group-containing polysiloxane amide (as the commercially available product, VPS-0501 and VPS-1001 (trade names, produced by Wako Pure Chemicals Industries, Ltd.)) described in JP-A-6-93100, a method of introducing a polymerization initiator and a reactive group (e.g., mercapto group, carboxyl group, hydroxyl group) originated in the chain transfer agent into the polymer terminal and reacting the reactive group with a reactive group (e.g., epoxy group, isocyanate group) at one terminal or both terminals, and a method of copolymerizing a cyclic cyclohexane oligomer such as hexamethylcyclotrisiloxane by anionic ring-opening polymerization. Among these, a method using an initiator having a polysiloxane partial structure is easy and preferred.

x, y and z represent mol % of respective repeating units based on all repeating units excluding $Y^{11}$ and each represents a value satisfying $30 \leq x \leq 60$, $0 \leq y \leq 70$ and $0 \leq z \leq 50$, preferably $35 \leq x \leq 55$, $30 \leq y \leq 60$ and $0 \leq z \leq 35$, provided that $x+y+z=100$ (mol %). u represents mass % of the constituent component $Y^{11}$ in the copolymer and satisfies $0.01 \leq u \leq 20$.

Of these, particularly preferred is a polymer represented by the following formula (1-2):

Formula (1-2):

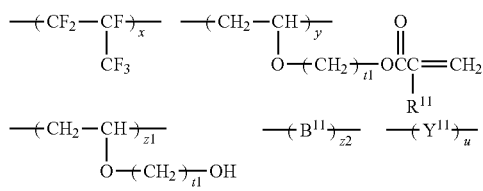

In formula (1-2), $R^{11}$, $Y^{11}$, x, y and u have the same meanings as in formula (1-1), and the preferred ranges are also the same.

$B^{11}$ represents a repeating unit derived from an arbitrary vinyl monomer and may comprise a single component or a plurality of components. Examples thereof include those described above as examples of $A^{11}$ in formula (1-1).

z1 and z2 represent mol % of respective repeating units based on all repeating units excluding $Y^{11}$ and each represents a value satisfying $0 \leq z1 \leq 40$ and $0 \leq z2 \leq 40$, preferably $0 \leq z1 \leq 30$ and $0 \leq z2 \leq 10$, more preferably $0 \leq z1 \leq 10$ and $0 \leq z2 \leq 5$, provided that $x+y+z1+z2=100$ (mol %). t1 represents an integer satisfying $2 \leq t1 \leq 10$ and is preferably $2 \leq t1 \leq 6$, more preferably $2 \leq t1 \leq 4$. The copolymer represented by formula (1-2) is more preferably a copolymer satisfying $40 \leq x \leq 60$, $40 \leq y \leq 60$ and z2=0.

The polysiloxane partial structure introduced into the copolymer of the present invention is preferably a structure represented by the following formula (1-3):

Formula (1-3):

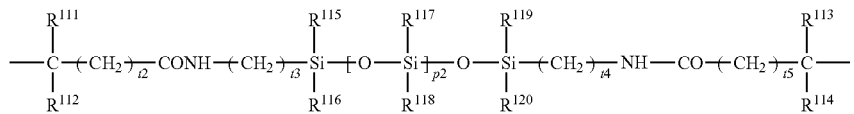

In formula (1-3), $R^{111}$, $R^{112}$, $R^{113}$ and $R^{114}$ each independently represents a hydrogen atom, an alkyl group (preferably having a carbon number of 1 to 5, e.g., methyl, ethyl), an aryl group (preferably having a carbon number of 6 to 10, e.g., phenyl, naphthyl), an alkoxycarbonyl group (preferably having a carbon number of 2 to 5, e.g., methoxycarbonyl, ethoxycarbonyl) or a cyano group, preferably an alkyl group or a cyano group, more preferably a methyl group or a cyano group.

$R^{115}$ to $R^{120}$ each independently represents a hydrogen atom, an alkyl group (preferably having a carbon number of 1 to 5, e.g., methyl, ethyl), a haloalkyl group (preferably a fluorinated alkyl group having a carbon number of 1 to 5, e.g., trifluoromethyl, pentafluoroethyl) or a phenyl group, preferably a methyl group or a phenyl group, more preferably a methyl group.

t2 and t5 each independently represents an integer of 1 to 10, preferably an integer of 1 to 6, more preferably an integer of 2 to 4. t3 and t4 each independently represents an integer of 0 to 10, preferably an integer of 1 to 6, more preferably an integer of 2 to 4. p2 represents an integer of 10 to 1,000, preferably an integer of 20 to 500, more preferably an integer of 50 to 200.

The polysiloxane partial structure represented by formula (1-3) is preferably introduced at a proportion of 0.01 to 20 mass %, more preferably from 0.05 to 10 mass %, still more preferably from 0.5 to 5 mass %, based on the polymer for use in the present invention.

By virtue of introducing the above-described polysiloxane partial structure, not only antifouling property and dust protection are imparted to the film but also slipperiness is imparted to the film surface and this is advantageous in view of scratch resistance.

In the polymer useful for the present invention, other than the repeating unit derived from a fluorine-containing monomer and the repeating unit having a (meth)acryloyl group in the side chain, other vinyl polymers may be appropriately copolymerized in view of various points such as adhesion to substrate, Tg of polymer (contributing to film hardness), solubility in solvent, transparency, transparency, dust protection and antifouling property. A plurality of these vinyl monomers may be used in combination according to the purpose, and these monomers are preferably introduced to give a total content of 0 to 40 mol %, more preferably from 0 to 30 mol %, still more preferably from 0 to 20 mol %, based on the copolymer.

The vinyl monomer unit which can be used in combination is not particularly limited, and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate, 2-hydroxyethyl acrylate), methacrylic acid esters (e.g., methyl methacrylate, ethyl methacrylate, butyl methacrylate, 2-hydroxyethyl methacrylate), styrene derivatives (e.g., styrene, p-hydroxymethylstyrene, p-methoxystyrene), vinyl ethers (e.g., methyl vinyl ether, ethyl vinyl ether, cyclohexyl vinyl ether, hydroxyethyl vinyl ether, hydroxybutyl vinyl ether), vinyl esters (e.g., vinyl acetate, vinyl propionate, vinyl cinnamate), unsaturated carboxylic acids (e.g., acrylic acid, methacrylic acid, crotonic acid, maleic acid, itaconic acid), acrylamides (e.g., N,N-dimethylacrylamide, N-tert-butylacrylamide, N-cyclohexylacrylamide), methacrylamides (e.g., N,N-dimethylmethacrylamide) and acrylonitrile.

Specific examples of the fluorine-containing copolymer compound for use in the present invention are set forth below, but the present invention is not limited thereto. In the Table below of specific examples, 50, x, y, z, z1 and z2 each denotes a molar ratio, u denotes mass % in the copolymer, VPS-1001 denotes a component originated in a polysiloxane-containing macro-azo initiator, "VPS-1001" (trade name), produced by Wako Pure Chemicals Industries, Ltd.) (hereinafter the same), VPS-0501 denotes a component originated in a polysiloxane-containing macro-azo initiator, "VPS0501" (trade name), produced by Wako Pure Chemicals Industries, Ltd.), and t1 denotes the number of methylene units.

TABLE 1

$-(CF_2-CF)_{50}-$  $-(CH_2-CH)_y-$ 
       |                    |
       $CF_3$              $O-(L^{11})_{s1}-\overset{O}{\overset{\|}{C}}-C=CH_2$
                                                    |
                                                    $R^{11}$ $-(CH_2-CH)_z-$     $-(VPS-1001)_u-$
       |
       $O-(L^{11})_{s1}-H$

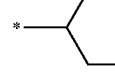

| | y | z | u | s1 | $L^{11}$ | $R^{11}$ |
|---|---|---|---|---|---|---|
| P-1 | 50 | 0 | 2 | 1 | *—CH₂CH₂O—** | H |
| P-2 | 50 | 0 | 2 | 1 | *—CH₂CH₂O—** | CH₃ |
| P-3 | 45 | 5 | 2 | 1 | *—CH₂CH₂O—** | H |
| P-4 | 40 | 10 | 2 | 1 | *—CH₂CH₂O—** | H |
| P-5 | 30 | 20 | 2 | 1 | *—CH₂CH₂O—** | H |
| P-6 | 50 | 0 | 2 | 0 | — | H |
| P-7 | 50 | 0 | 2 | 1 | *—C₄H₈O—** | H |
| P-8 | 50 | 0 | 2 | 1 | *—(CH₂)₂—O—(CH₂)₂—O—** | H |
| P-9 | 50 | 0 | 2 | 1 | *—⟨cyclohexyl⟩—O—** | H |
| P-10 | 50 | 0 | 2 | 1 | *—CH₂CH₂NH—** | H |
| P-11 | 50 | 0 | 3 | 1 | *—(CH₂)₂OC(=O)NH(CH₂)₃O—** | H |

TABLE 1-continued

| | y | z | u | s1 | $L^{11}$ | $R^{11}$ |
|---|---|---|---|---|---|---|
| P-12 | 50 | 0 | 3 | 1 | *—(CH₂)₂OC(=O)NH(CH₂)₃O—** | CH₃ |
| P-13 | 50 | 0 | 3 | 1 | *—(CH₂)₄OC(=O)NH(CH₂)₃O—** | CH₃ |
| P-14 | 50 | 0 | 3 | 1 | *—CH₂CH(OH)CH₂O—** | H |
| P-15 | 50 | 0 | 3 | 1 | *—CH₂CH(CH₂OH)O—** | H |
| P-16 | 50 | 0 | 3 | 1 | *—(CH₂)₂OCH₂—CH(OH)CH₂O—** | H |
| P-17 | 50 | 0 | 3 | 1 | *—CH₂OCH₂CH(OH)—CH₂O—** | CH₃ |
| P-18 | 50 | 0 | 3 | 1 | *—CH₂OCH₂CH(CH₂OH)—O—** | CH₃ |
| P-19 | 40 | 10 | 2 | 1 | *—CH₂CH₂O—** | CH₃ |

*indicates the polymer main chain side, and **indicates the (meth)acryloyl group side.

TABLE 2

$-(CF_2-CF)_x-$  $-(CH_2-CH)_y-$ 
       |                    |
       $CF_3$              $O-L^{11}-\overset{O}{\overset{\|}{C}}CH=CH_2$ $-(A^{11})_z-$    $-(VPS-0501)_u-$

| | x | y | z | u | $L^{11}$ | $A^{11}$ |
|---|---|---|---|---|---|---|
| P-20 | 55 | 45 | 0 | 4 | *—CH₂CH₂O—** | — |
| P-21 | 45 | 55 | 0 | 4 | *—CH₂CH₂O—** | — |
| P-22 | 50 | 45 | 5 | 4 | *—(CH₂)₂OC(=O)NH(CH₂)₃O—** | —CH₂—CH(OCH₂CH₂OH)— |
| P-23 | 50 | 45 | 5 | 4 | *—CH₂CH(OH)—CH₂O—** | —CH₂—CH(O—CH₂-glycidyl)— |
| P-24 | 50 | 45 | 5 | 4 | *—CH₂CH(CH₂OH)O—** | —CH₂—CH(O—CH₂-glycidyl)— |

TABLE 2-continued $$-(CF_2-CF)_x- \quad -(CH_2-CH)_y- \quad -(A^{11})_z- \quad -(VPS\text{-}0501)_u-$$

where the second repeat unit has $CF_3$ on the CF, and $O-L^{11}-\overset{O}{\overset{\|}{C}}CH=CH_2$ on the CH.

| | x | y | z | u | $L^{11}$ | $A^{11}$ |
|---|---|---|---|---|---|---|
| P-25 | 50 | 40 | 10 | 4 | *—CH$_2$CH$_2$O—** | —CH$_2$—CH(OCH$_2$CH$_3$)— |
| P-26 | 50 | 40 | 10 | 4 | *—CH$_2$CH$_2$O—** | —CH$_2$—CH(O-cyclohexyl)— |
| P-27 | 50 | 40 | 10 | 4 | *—CH$_2$CH$_2$O—** | —CH(CH$_3$)—CH(COOH)— |

*indicates the polymer main chain side, and **indicates the (meth)acryloyl group side.

TABLE 3

$$-(CF_2-CF(CF_3))_x- \quad -(CH_2-CH(O-(CH_2)_{t1}O\overset{O}{\overset{\|}{C}}C(R^{11})=CH_2))_y-$$
$$-(CH_2-CH(O-(CH_2)_{t1}OH))_{z1}- \quad -(B^{11})_{z2}- \quad -(VPS\text{-}1001)_u-$$

| | x | y | z1 | z2 | u | t1 | $R^{11}$ | $B^{11}$ |
|---|---|---|---|---|---|---|---|---|
| P-28 | 50 | 40 | 5 | 5 | 2 | 2 | H | —CH$_2$—CH(OCH$_2$CH$_3$)— |
| P-29 | 50 | 35 | 5 | 10 | 2 | 2 | H | —CH$_2$—CH(OC(CH$_3$)$_3$)— |
| P-30 | 40 | 40 | 10 | 10 | 2 | 4 | CH$_3$ | —CH$_2$—CH(O-cyclohexyl)— |

TABLE 4

$$-(CF_2-CF(CF_3))_{50}- \quad -(Z^{11})_y- \quad -(Z^{12})_z- \quad -(VPS\text{-}1001)_u-$$

| | y | z | u | $Z^{11}$ | $Z^{12}$ |
|---|---|---|---|---|---|
| P-31 | 45 | 5 | 5 | —CH(CH$_3$)—CH(CO$_2$CH$_2$CH(OH)CH$_2$O\overset{O}{\overset{\|}{C}}C(CH$_3$)=CH$_2$)— | —CH(CH$_3$)—CH(COOH)— |
| P-32 | 40 | 10 | 10 | —CH(COOH)—CH(CONHCH$_2$CH$_2$O\overset{O}{\overset{\|}{C}}CH=CH$_2$)— | —CH—CH— (succinic anhydride ring) |

TABLE 5

$$-(CH_2-CH)_x- \quad -(CH_2-CH)_y-$$
$$\quad\quad | \quad\quad\quad\quad\quad\quad | $$
$$\quad\quad O=C \quad\quad\quad\quad O=C$$
$$\quad\quad | \quad\quad\quad\quad\quad\quad\quad | \quad\quad O$$
$$\quad\quad O-Rf \quad\quad\quad\quad O-L^{11}-CCH=CH_2$$

$$-(CH_2-CH)_z- \quad\quad -(VPS-1001)_u-$$
$$\quad\quad |$$
$$\quad\quad O=C$$
$$\quad\quad |$$
$$\quad\quad O-L^{11}-H$$

| | x | y | z | u | Rf | $L^{11}$ |
|---|---|---|---|---|---|---|
| P-33 | 60 | 40 | 0 | 5 | —CH$_2$CH$_2$C$_8$F$_{17}$(n) | —CH$_2$CH$_2$O— |
| P-34 | 60 | 30 | 10 | 5 | —CH$_2$CH$_2$C$_4$F$_8$(n) | —CH$_2$CH$_2$O— |
| P-35 | 40 | 60 | 0 | 5 | —CH$_2$CH$_2$C$_6$F$_{12}$H(n) | —CH$_2$CH$_2$CH$_2$CH$_2$O— |

TABLE 6

$$-(CH_2-CH)_x- \quad -(CH_2-CH)_y- \quad\quad O$$
$$\quad\quad | \quad\quad\quad\quad\quad\quad | \quad\quad\quad\quad ||$$
$$\quad\quad O-Rf \quad\quad\quad\quad O-(CH_2)_{t1}-OCCH=CH_2$$

$$-(CH_2-CH)_z- \quad\quad -(VPS-1001)_u-$$
$$\quad\quad |$$
$$\quad\quad O-(CH_2)_{t1}-OH$$

| | x | y | z | u | t1 | Rf |
|---|---|---|---|---|---|---|
| P-36 | 50 | 50 | 0 | 5 | 2 | —CH$_2$C$_4$F$_8$H(n) |
| P-37 | 40 | 55 | 5 | 5 | 2 | —CH$_2$C$_4$F$_8$H(n) |
| P-38 | 30 | 70 | 0 | 5 | 4 | —CH$_2$C$_8$F$_{17}$(n) |
| P-39 | 60 | 40 | 0 | 5 | 2 | —CH$_2$CH$_2$C$_8$F$_{16}$H(n) |

TABLE 7

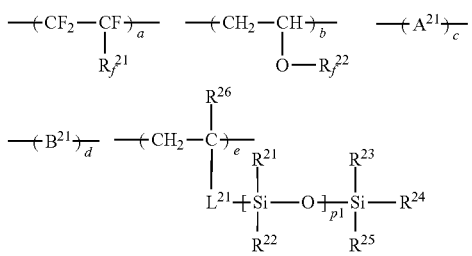

| | u | p2 |
|---|---|---|
| P-40 | 2 | 50 |
| P-41 | 2 | 100 |
| P-42 | 2 | 200 |
| P-43 | 2 | 500 |
| P-44 | 2 | 1000 |
| P-45 | 3 | 100 |
| P-46 | 4 | 100 |
| P-47 | 5 | 100 |
| P-48 | 10 | 100 |
| P-49 | 20 | 100 |

In the Table above, the ratio (50/50) of components in the vinyl monomer denotes a molar ratio, u denotes mass %, and p2 denotes the number of dimethylcyclohexane partial structures.

(Polymer Having Polysiloxane Partial Structure in Polymer Side Chain)

The polymer having a polysiloxane partial structure in the polymer side chain is described in detail below. The form of the polymer particularly preferred in the present invention is a form represented by formula (2-1).

Formula (2-1):

$$-(CF_2-CF)_a- \quad -(CH_2-CH)_b- \quad -(A^{21})_c-$$
$$\quad\quad | \quad\quad\quad\quad\quad\quad | $$
$$\quad\quad R_f^{21} \quad\quad\quad\quad\quad O-R_f^{22}$$

$$-(B^{21})_d- \quad -(CH_2-C)_e-$$
$$\quad\quad\quad\quad\quad\quad\quad\quad | \quad R^{26}$$
$$\quad\quad\quad\quad\quad\quad\quad\quad R^{21} \quad R^{23}$$
$$\quad\quad\quad\quad\quad\quad\quad\quad | \quad\quad |$$
$$\quad\quad\quad\quad\quad\quad L^{21}+Si-O]_{p1}-Si-R^{24}$$
$$\quad\quad\quad\quad\quad\quad\quad\quad | \quad\quad |$$
$$\quad\quad\quad\quad\quad\quad\quad\quad R^{22} \quad R^{25}$$

In formula (2-1), $R_f^{21}$ represents a perfluoroalkyl group having a carbon number of 1 to 5, $R_f^{22}$ represents a fluorine-containing alkyl group having a carbon number of 1 to 30 and having a linear, branched or alicyclic structure, which may have an ether bond, $A^{21}$ represents a constituent unit having a reactive group capable of participating in a crosslinking reaction, $B^{21}$ represents an arbitrary constituent component, $R^{21}$ and $R^{22}$, which may be the same or different, each represents an alkyl group or an aryl group, p1 represents an integer of 10 to 500, $R^{23}$ to $R^{25}$ each independently represents a substituted or unsubstituted monovalent organic group or a hydrogen atom, $R^{26}$ represents a hydrogen atom or a methyl group, and $L^{21}$ represents an arbitrary linking group having a carbon number of 1 to 20 or a singe bond.

a to d represent a molar fraction (%) of respective constituent components excluding the polymerization unit containing a polysiloxane partial structure and each represents a value satisfying the relationships of $10 \leq a+b \leq 55$, $10 \leq a \leq 55$ (preferably $40 \leq a \leq 55$), $0 \leq b \leq 45$ (preferably $0 \leq b \leq 30$), $10 \leq c \leq 50$ (preferably $20 \leq c \leq 50$) and $0 \leq d \leq 40$ (preferably $0 \leq d \leq 30$), and (%) represents a mass fraction (%) of the polymerization unit containing a polysiloxane partial structure based on the entire mass of other four components and satisfies the relationship of $0.01 \leq e \leq 20$ (preferably $0.1 \leq e \leq 10$, more preferably $0.5 \leq e \leq 5$).

The perfluoroolefin is preferably a perfluoroolefin having a carbon number of 3 to 7 and is preferably perfluoropropylene or perfluorobutylene in view of polymerization reactivity, more preferably perfluoropropylene in view of availability.

The perfluoroolefin content in the polymer is from 10 to 55 mol %. It may be desired to increase the introduction percentage of perfluoroolefin for reducing the refractive index of the material, but in view of polymerization reactivity, an introduction percentage on the order of 50 to 70 mol % is the limit in a general solution-based radical polymerization reaction and a higher introduction percentage is difficult to achieve. In the present invention, the perfluoroolefin content is preferably from 10 to 55 mol %, more preferably from 40 to 55 mol %.

(Fluorine-Containing Vinyl Ether)

In the present invention, a fluorine-containing vinyl ether represented by the following formula (M1) may be copolymerized for reducing the refractive index. This copolymerization component may be introduced into the polymer at a proportion of 0 to 45 mol %, but the content thereof is preferably from 0 to 30 mol %, more preferably from 0 to 20 mol %. Particularly, in the case where the film hardness of the low refractive index needs to be set relatively high (for example, when a large amount of a low refractive index filler is contained in the low refractive index layer and elevation of the film strength is rather required than to decrease the refractive index of the layer by a binder polymer), the introduction percentage of the copolymerization component, that is, the fluorine-containing vinyl ether represented by formula (M1), is preferably 0 mol %, because a polymerization unit having a reactive group capable of participating in a crosslinking reaction described later can be introduced into the side chain in a higher percentage by excluding this copolymerization component.

Formula (M1):

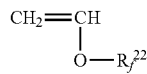

In formula (M1), $R_f^{22}$ represents a fluorine-containing alkyl group having a carbon number of 1 to 30 and is preferably a fluorine-containing alkyl group having a carbon number of 1 to 20, more preferably from 1 to 15, which may be linear {e.g., $-CF_2CF_3$, $-CH_2(CF_2)_4H$, $-CH_2(CF_2)_8CF_3$, $-CH_2CH_2(CF_2)_4H$}, may have a branched structure {e.g., $CH(CF_3)_2$, $CH_2CF(CF_3)_2$, $CH(CH_3)CF_2CF_3$, $CH(CH_3)(CF_2)_5CF_2H$} or an alicyclic structure (preferably a 5- or 6-membered ring, for example, a perfluorocyclohexyl group, a perfluorocyclopentyl group or an alkyl group substituted with such a group), or may have an ether bond (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$).

The monomer represented by formula (M1) can be synthesized, for example, by a method of causing a fluorine-containing alcohol to act on leaving group-substituted alkyl vinyl ethers (e.g., vinyloxyalkyl sulfonate, vinyloxyalkyl chloride) in the presence of a base catalyst described in Macromolecules, Vol. 32 (21), page 7122 (1999) and JP-A-2-721; a method of mixing a fluorine-containing alcohol with vinyl ethers (e.g., butyl vinyl ether) in the presence of a palladium catalyst, thereby effecting exchange with a vinyl group described in International Application No. 92/05135, pamphlet; or a method of reacting fluorine-containing ketone with dibromoethane in the presence of a potassium fluoride catalyst and then performing an HBr-removing reaction with use of an alkali catalyst described in U.S. Pat. No. 3,420,793.

Preferred examples of the constituent component represented by formula (M1) are set forth below.

M1-(1)
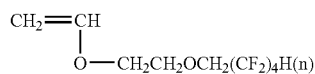

M1-(2)

M1-(3)
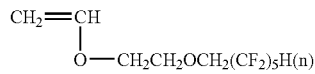

M1-(4)
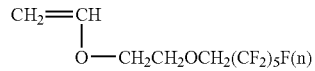

M1-(5)
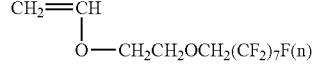

M1-(6)
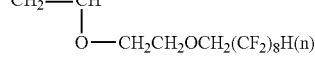

M1-(7)
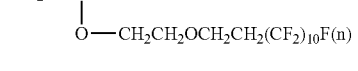

M1-(8)
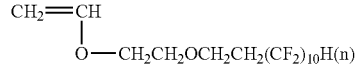

M1-(9)
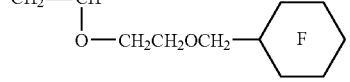

M1-(10)
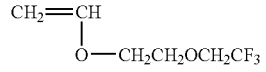

M1-(11)
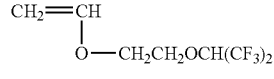

M1-(12)
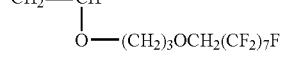

M1-(13)
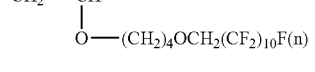

M1-(14)
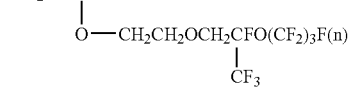

M1-(15)
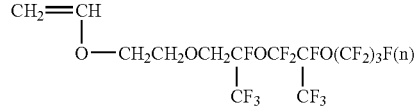

M1-(16)
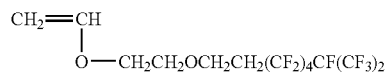

M1-(17)
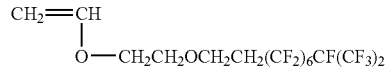

M1-(18)
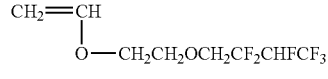

M1-(19)
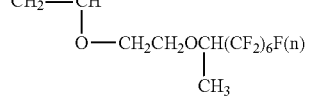

M1-(20)
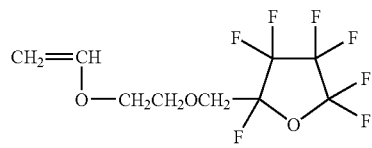

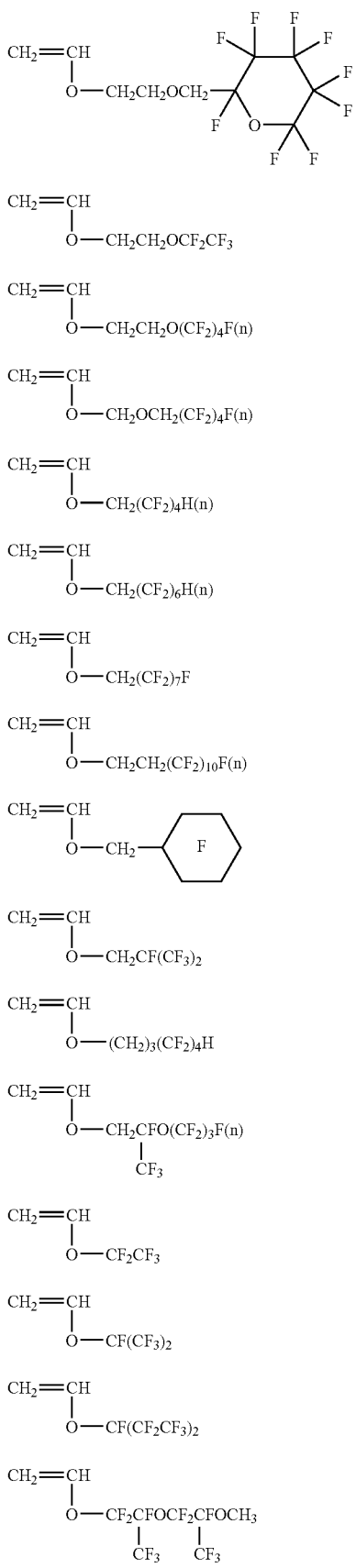
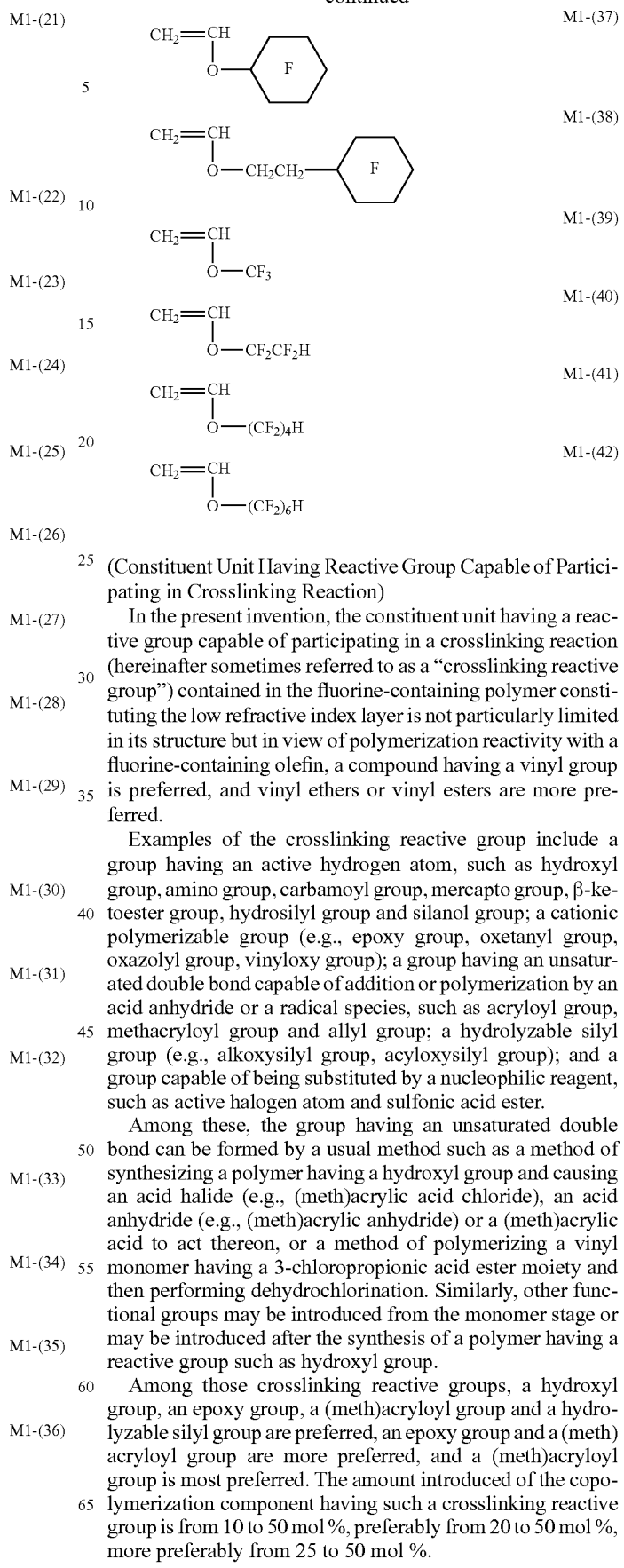

(Constituent Unit Having Reactive Group Capable of Participating in Crosslinking Reaction)

In the present invention, the constituent unit having a reactive group capable of participating in a crosslinking reaction (hereinafter sometimes referred to as a "crosslinking reactive group") contained in the fluorine-containing polymer constituting the low refractive index layer is not particularly limited in its structure but in view of polymerization reactivity with a fluorine-containing olefin, a compound having a vinyl group is preferred, and vinyl ethers or vinyl esters are more preferred.

Examples of the crosslinking reactive group include a group having an active hydrogen atom, such as hydroxyl group, amino group, carbamoyl group, mercapto group, β-ketoester group, hydrosilyl group and silanol group; a cationic polymerizable group (e.g., epoxy group, oxetanyl group, oxazolyl group, vinyloxy group); a group having an unsaturated double bond capable of addition or polymerization by an acid anhydride or a radical species, such as acryloyl group, methacryloyl group and allyl group; a hydrolyzable silyl group (e.g., alkoxysilyl group, acyloxysilyl group); and a group capable of being substituted by a nucleophilic reagent, such as active halogen atom and sulfonic acid ester.

Among these, the group having an unsaturated double bond can be formed by a usual method such as a method of synthesizing a polymer having a hydroxyl group and causing an acid halide (e.g., (meth)acrylic acid chloride), an acid anhydride (e.g., (meth)acrylic anhydride) or a (meth)acrylic acid to act thereon, or a method of polymerizing a vinyl monomer having a 3-chloropropionic acid ester moiety and then performing dehydrochlorination. Similarly, other functional groups may be introduced from the monomer stage or may be introduced after the synthesis of a polymer having a reactive group such as hydroxyl group.

Among those crosslinking reactive groups, a hydroxyl group, an epoxy group, a (meth)acryloyl group and a hydrolyzable silyl group are preferred, an epoxy group and a (meth)acryloyl group are more preferred, and a (meth)acryloyl group is most preferred. The amount introduced of the copolymerization component having such a crosslinking reactive group is from 10 to 50 mol %, preferably from 20 to 50 mol %, more preferably from 25 to 50 mol %.

Preferred examples of the polymerization unit capable of participating in a crosslinking reaction are set forth below, but the present invention is not limited thereto.

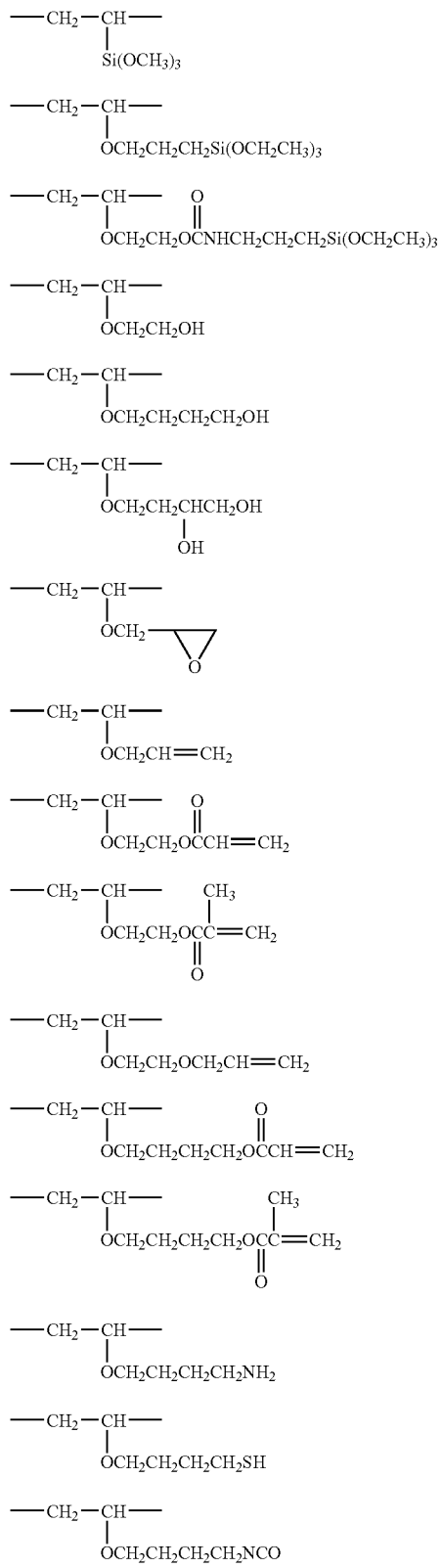

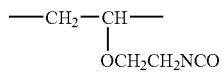

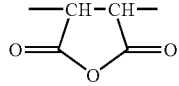

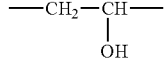

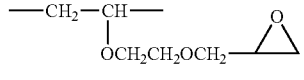

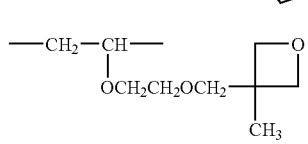

(Polysiloxane Partial Structure)

The polysiloxane partial structure in the polymer having a polysiloxane partial structure in the side chain, which is used in the present invention, is described below. The polysiloxane partial structure preferably has a repeating siloxane moiety of the following formula (S-A):

Formula (S-A):

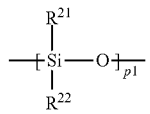

In formula (S-A), $R^{21}$ and $R^{22}$, which may be the same or different, each represents an alkyl group or an aryl group. The alkyl group is preferably an alkyl group having a carbon number of 1 to 4, and examples thereof include a methyl group, a trifluoromethyl group and an ethyl group. The aryl group is preferably an aryl group having a carbon number of 6 to 20, and examples thereof include a phenyl group and a naphthyl group. Among these, a methyl group and a phenyl group are preferred, and a methyl group is more preferred. p1 represents an integer of 10 to 500, preferably from 10 to 350, more preferably from 10 to 250.

The polymer having a polysiloxane structure represented by formula (S-A) in the side chain can be synthesized by a method of introducing a polysiloxane [for example, "Silaplane" Series {produced by Chisso Corp.}] having, at one terminal, a reactive group (for example, an amino group, a mercapto group, a carboxyl group or a hydroxyl group for an epoxy group or an acid anhydride group) reactive with a polymer having a reactive group such as epoxy group, hydroxyl group, carboxyl group or acid anhydride group, through a polymer reaction described in J. A. Appl. Polym. Sci., Vol. 2000, page 78 (1955) and JP-A-56-28219; or a method of polymerizing a polysiloxane-containing silicon macromer. Either method may be preferably used. In the present invention, a method of introducing the structure by the polymerization of a silicon macromer is more preferred.

The polymerization unit containing a repeating siloxane moiety in the side chain preferably occupies from 0.01 to 20 mass %, more preferably from 0.1 to 10 mass %, still more preferably from 0.5 to 5%, in the copolymer.

Preferred examples of the polymerization unit containing a repeating siloxane moiety in the side chain, which is useful in the present invention, are set forth below, but the present invention is not limited thereto.

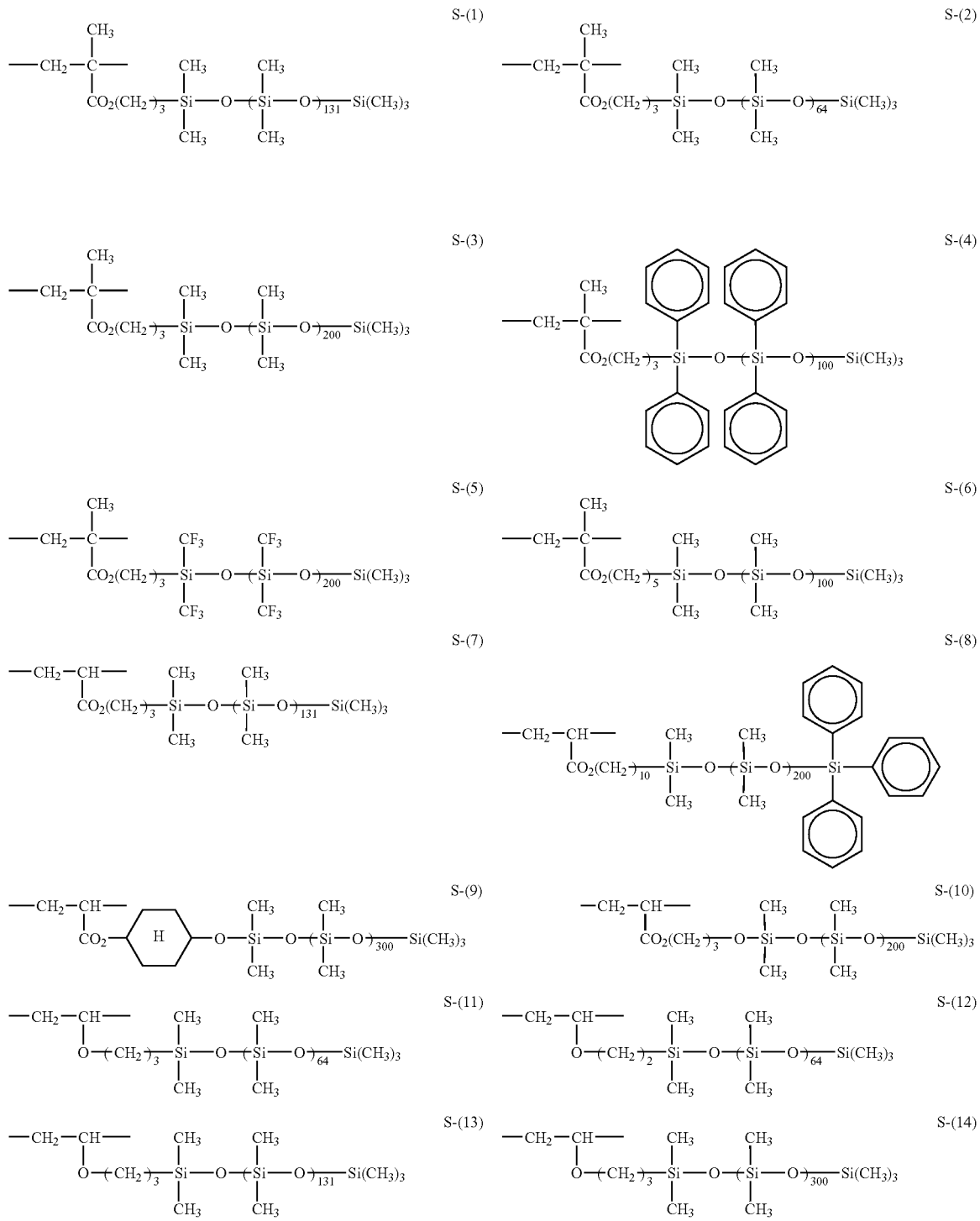

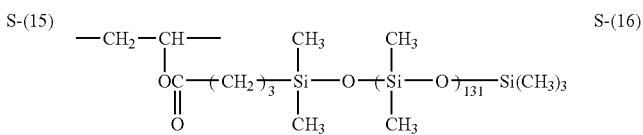
S-(15)
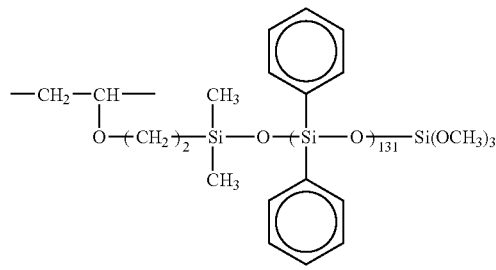
S-(16)
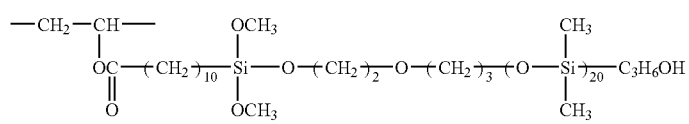
S-(17)
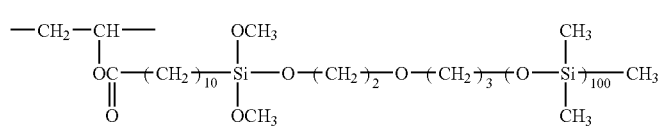
S-(18)
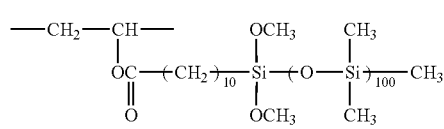
S-(19)
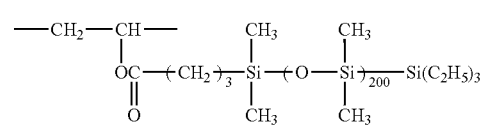
S-(20)
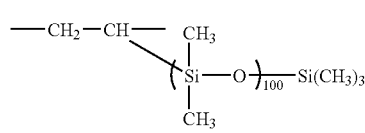
S-(21)
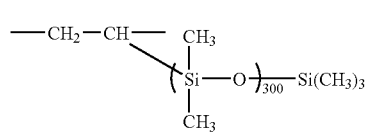
S-(22)
S-(23)
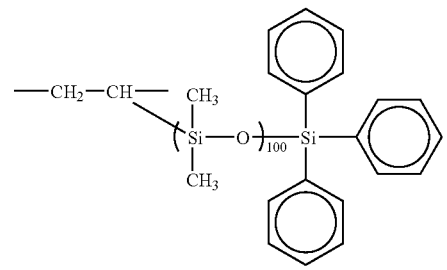
S-(24)
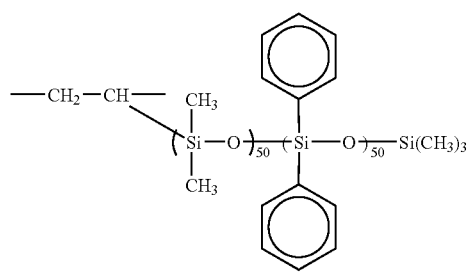
S-(25)
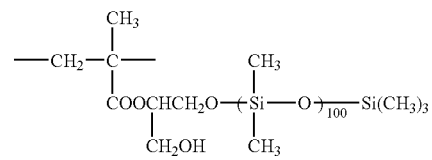
S-(26)
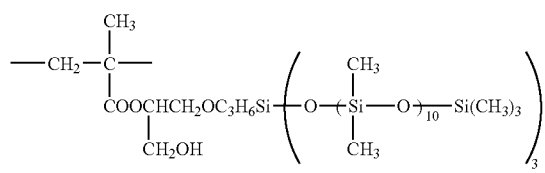
S-(27)
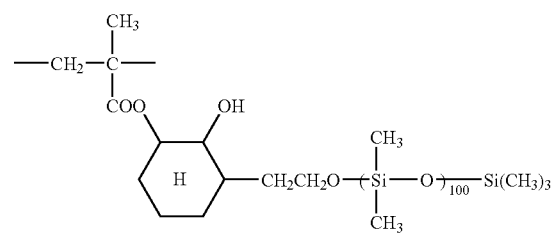
S-(28)

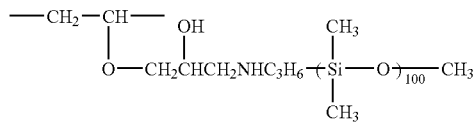
S-(29)

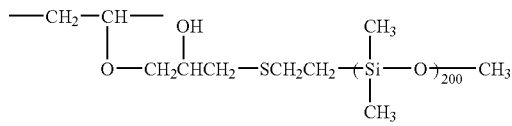
S-(30)

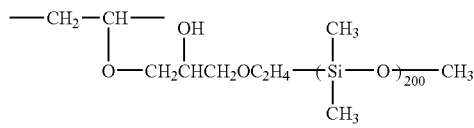
S-(31)

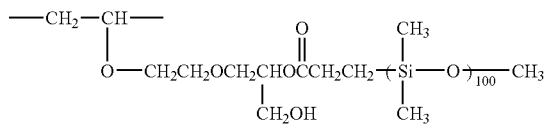
S-(32)

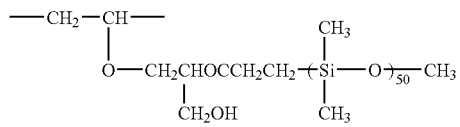
S-(33)

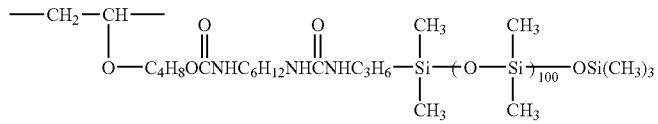
S-(34)

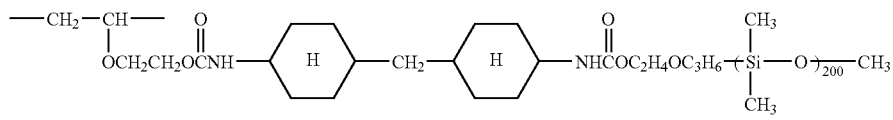
S-(35)

Other than these, as described above, a polymerization unit formed by a polymer reaction of a polysiloxane having, at one terminal, a reactive group reactive with a reactive group of another polymerization unit may also be used as the polymerization unit containing a repeating siloxane moiety in the side chain. Examples of the commercially available product of this polysiloxane include the followings:

S-(36): "Silaplane FM0711" (produced by Chisso Corp.)
S-(37): "Silaplane FM0721" (produced by Chisso Corp.)
S-(38): "Silaplane FM0725" (produced by Chisso Corp.)

(Other Copolymerization Component)

A copolymerization component other than those described above may also be appropriately selected in view of various points such as hardness, adhesion to substrate, solubility in solvent and transparency.

Examples of this copolymerization unit include vinyl ethers such as methyl vinyl ether, ethyl vinyl ether, tert-butyl vinyl ether, n-butyl vinyl ether, cyclohexyl vinyl ether and isopropyl vinyl ether; and vinyl esters such as vinyl acetate, vinyl propionate, vinyl butyrate and vinyl cyclohexanecarboxylate. The amount introduced of such a copolymerization component is from 0 to 40 mol %, preferably from 0 to 30 mol %, more preferably from 1 to 20 mol %.

TABLE 8

| | Fluorine-Containing Polymer | | | | | | | | |
|---|---|---|---|---|---|---|---|---|---|
| | Basic Constitution [molar fraction (%)] | | | | | | Constituent Unit Having Polysiloxane | | |
| | | Fluorine-Containing Vinyl Ether | | Constituent Unit Having Crosslinking Reactive Group | | Other Copolymerization Components | | Partial Structure [mass fraction (%)] | Mass Average Molecular Weight |
| No. | Hexafluoropropylene | Kind | Amount | Kind | Amount | Kind* | Amount | Kind | Amount | $(\times 10^3)$ |
| PP-1 | 50 | — | — | A-(4)/A-(9) | 5/45 | — | — | S-(36) | 2 | 1.9 |
| PP-2 | 50 | — | — | A-(4)/A-(9) | 10/40 | — | — | S-(37) | 2 | 3.1 |
| PP-3 | 50 | — | — | A-(4)/A-(9) | 15/35 | — | — | S-(38) | 1 | 3.3 |
| PP-4 | 50 | — | — | A-(4)/A-(10) | 5/45 | — | — | S-(38) | 1 | 4.5 |
| PP-5 | 50 | — | — | A-(4)/A-(10) | 10/40 | — | — | S-(36) | 2 | 2.5 |
| PP-6 | 50 | — | — | A-(4)/A-(10) | 15/35 | — | — | S-(37) | 2 | 5.1 |
| PP-7 | 50 | — | — | A-(5)/A-(12) | 5/45 | — | — | S-(11) | 1 | 3.5 |
| PP-8 | 50 | — | — | A-(5)/A-(12) | 10/40 | — | — | S-(16) | 2 | 2.8 |
| PP-9 | 50 | — | — | A-(5)/A-(12) | 5/45 | — | — | S-(17) | 1 | 4.5 |
| PP-10 | 50 | — | — | A-(5)/A-(12) | 10/40 | — | — | S-(37) | 2 | 4.2 |
| PP-11 | 50 | — | — | A-(9) | 50 | — | — | S-(37) | 2 | 3.2 |
| PP-12 | 50 | — | — | A-(10) | 50 | — | — | S-(36) | 2 | 3.7 |

TABLE 8-continued

Fluorine-Containing Polymer

| No. | Basic Constitution [molar fraction (%)] | | | | | | Constituent Unit Having Polysiloxane Partial Structure [mass fraction (%)] | | Mass Average Molecular Weight ($\times 10^3$) |
|---|---|---|---|---|---|---|---|---|---|
| | Hexafluoro-propylene | Fluorine-Containing Vinyl Ether Kind | Amount | Constituent Unit Having Crosslinking Reactive Group Kind | Amount | Other Copolymerization Components Kind* | Amount | Kind | Amount | |
| PP-13 | 50 | — | — | A-(12) | 50 | — | — | S-(38) | 1 | 2.8 |
| PP-14 | 50 | — | — | A-(13) | 50 | — | — | S-(37) | 1 | 3.1 |
| PP-15 | 50 | M1-(1) | 10 | A-(9) | 40 | — | — | S-(36) | 2 | 7.1 |
| PP-16 | 50 | M1-(1) | 10 | A-(4)/A-(9) | 5/35 | — | — | S-(37) | 1 | 6.3 |
| PP-17 | 50 | M1-(5) | 10 | A-(4)/A-(10) | 5/35 | — | — | S-(37) | 2 | 4.1 |
| PP-18 | 50 | M1-(5) | 10 | A-(5)/A-(12) | 5/35 | — | — | S-(38) | 1 | 3.5 |
| PP-19 | 50 | — | — | A-(4)/A-(9) | 5/35 | EVE | 10 | S-(11) | 1 | 4.8 |
| PP-20 | 50 | — | — | A-(9) | 35 | EVE | 15 | S-(17) | 1 | 1.6 |

Kind* EVE: ethyl vinyl ether

TABLE 9

Fluorine-Containing Polymer

| No. | Basic Constitution [molar fraction (%)] | | | | | | Constituent Unit Having Polysiloxane Partial Structure [mass fraction (%)] | | Mass Average Molecular Weight ($\times 10^3$) |
|---|---|---|---|---|---|---|---|---|---|
| | Hexafluoro-propylene | Fluorine-Containing Vinyl Ether Kind | Amount | Constituent Unit Having Crosslinking Reactive Group Kind | Amount | Other Copolymerization Components Kind* | Amount | Kind | Amount | |
| PP-21 | 50 | — | — | A-(4)/A-(8) | 5/45 | — | — | S-(36) | 3 | 1.6 |
| PP-22 | 50 | — | — | A-(8) | 40 | EVE | 10 | S-(5) | 2 | 3.5 |
| PP-23 | 50 | M1-(1) | 10 | A-(8) | 40 | — | — | S-(37) | 3 | 3.0 |
| PP-24 | 50 | M1-(5) | 10 | A-(8) | 40 | — | — | S-(38) | 2 | 4.6 |
| PP-25 | 50 | — | — | A-(8)/A-(9) | 10/40 | — | — | S-(36) | 2 | 2.6 |
| PP-26 | 50 | — | — | A-(8)/A-(12) | 10/40 | — | — | S-(36) | 1 | 6.8 |
| PP-27 | 50 | — | — | A-(2)/A-(9) | 10/40 | — | — | S-(37) | 2 | 2.7 |
| PP-28 | 50 | — | — | A-(2)/A-(10) | 10/40 | — | — | S-(38) | 1 | 9.1 |
| PP-29 | 50 | — | — | A-(6)/A-(8) | 5/45 | — | — | S-(11) | 1 | 2.6 |
| PP-30 | 50 | — | — | A-(6)/A-(8) | 10/40 | — | — | S-(17) | 1 | 3.6 |
| PP-31 | 50 | — | — | A-(4)/A-(9) | 5/35 | tBVE | 10 | S-(16) | 1 | 1.9 |
| PP-32 | 50 | — | — | A-(5)/A-(12) | 5/40 | tBVE | 5 | S-(5) | 1 | 2.4 |
| PP-33 | 50 | — | — | A-(9)/A-(10) | 25/25 | — | — | S-(36) | 2 | 3.3 |
| PP-34 | 50 | — | — | A-(7) | 50 | — | — | S-(37) | 2 | 4.1 |
| PP-35 | 50 | M1-(1) | 10 | A-(7) | 40 | — | — | S-(38) | 1 | 2.2 |
| PP-36 | 50 | M1-(5) | 5 | A-(6)/A-(7) | 5/40 | — | — | S-(11) | 2 | 3.5 |
| PP-37 | 50 | — | — | A-(2)/A-(7) | 10/40 | — | — | S-(37) | 2 | 4.3 |
| PP-38 | 50 | — | — | A-(2)/A-(6) | 30/10 | EVE | 10 | S-(17) | 2 | 4.6 |
| PP-39 | 50 | — | — | A-(2)/A-(5) | 40/10 | — | — | S-(16) | 2 | 2.2 |
| PP-40 | 50 | M1-(5) | 10 | A-(2) | 40 | — | — | S-(38) | 1 | 1.9 |

Kind* EVE: ethyl vinyl ether, tBVE: tert-butyl vinyl ether

The polymer having a polysiloxane structure in the main or side chain, which is a compound having a polysiloxane partial structure for use in the present invention, preferably has a polystyrene-reduced mass average molecular weight of 5,000 to 500,000, more preferably from 5,000 to 300,000, and most preferably from 10,000 to 100,000, as measured by gel permeation chromatography.

The synthesis of the polymer having a polysiloxane structure in the main or side chain can be performed by synthesizing a precursor such as hydroxyl group-containing polymer according to various polymerization methods (e.g., solution polymerization, sedimentation polymerization, suspension polymerization, precipitation polymerization, bulk polymerization, emulsion polymerization), and then introducing a (meth)acryloyl group through the above-described polymer reaction. The polymerization reaction may be performed by an arbitrary operation such as batch system, semi-continuous system or continuous system.

The polymerization initiating method includes a method using a radical initiator, a method of irradiating light or radiation, and the like. These polymerization methods and polymerization initiating methods are described, for example, in Teiji Tsuruta, Kobunshi Gosei Hoho (Polymer Synthesis Method), revised edition, Nikkan Kogyo Shinbun Sha (1971), and Takayuki Ohtsu and Masaetsu Kinoshita, Kobunshi Gosei no Jikken Ho (Test Method of Polymer Synthesis), pp. 124-154, Kagaku Dojin (1972).

Among those polymerization methods, a solution polymerization method using a radical initiator is preferred. Examples of the solvent for use in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol, and one of these solvents may be used alone, or a mixture of two or more thereof may be used. A mixed solvent with water may also be used.

The polymerization temperature needs to be set according to the molecular weight of polymer produced, the kind of initiator, and the like, and a polymerization temperature from 0° C. or less to 100° C. or more may be used, but the polymerization is preferably performed in the range from 50 to 100° C.

The reaction pressure may be appropriately selected but is usually from 1 to 100 kg/cm$^2$, preferably on the order of 1 to 30 kg/cm$^2$. The reaction time is approximately from 5 to 30 hours.

The reprecipitation solvent for the polymer obtained is preferably isopropanol, hexane, methanol or the like.

(Organosilane Compound)

In view of scratch resistance, the coating composition for forming at least one layer out of the layers constituting the film of the present invention preferably contains at least one hydrolysate of organosilane compound and/or partial condensate thereof, that is, a so-called sol component (hereinafter, sometimes referred to in this way). Particularly, in the case of an antireflection film, the sol component is preferably incorporated into both the low refractive index layer and the functional layer so as to satisfy both the antireflection ability and the scratch resistance. This sol component forms a cured product by undergoing condensation during drying and heating after the coating of the coating composition and functions as a part of the binder in those layers. Furthermore, in the case where the cured product has a polymerizable unsaturated bond, a binder having a three-dimensional structure is formed by the irradiation of actinic rays.

The organosilane compound is preferably an organosilane compound represented by the following formula A:

Formula A:

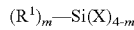

In formula A, R$^1$ represents a substituted or unsubstituted alkyl group or a substituted or unsubstituted aryl group. The alkyl group is preferably an alkyl group having a carbon number of 1 to 30, more preferably from 1 to 16, still more preferably from 1 to 6. Specific examples of the alkyl group include methyl, ethyl, propyl, isopropyl, hexyl, decyl and hexadecyl. Examples of the aryl group include phenyl and naphthyl, with a phenyl group being preferred.

X represents a hydroxyl group or a hydrolyzable group. Examples of the hydrolyzable group include an alkoxy group (preferably an alkoxy group having a carbon number of 1 to 5, e.g., methoxy, ethoxy), a halogen atom (e.g., Cl, Br, I) and a group represented by R$^2$COO (wherein R$^2$ is preferably a hydrogen atom or an alkyl group having a carbon number of 1 to 6; e.g., CH$_3$COO, C$_2$H$_5$COO). Among these, an alkoxy group is preferred, and a methoxy group and an ethoxy group are more preferred.

In formula A, m represents an integer of 1 to 3, preferably 1 or 2.

When a plurality of X's are present, the plurality of X's may be the same or different.

The substituent contained in R$^1$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted.

R$^1$ is preferably a substituted alkyl group or a substituted aryl group. In addition, an organosilane compound having a vinyl polymerizable substituent represented by the following formula B which is derived from the compound represented by the formula A is preferred.

Formula B:

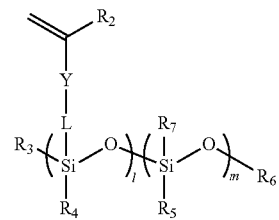

In formula B, R$_2$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. R$_2$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, *—COO—**, *—CONH—** or *—O—**, preferably a single bond, *—COO—** or *—CONH—**, more preferably a single bond or *—COO—**, still more preferably *—COO—**. * denotes the position bonded to =C(R$_2$)— and ** denotes the position bonded to L.

L represents a divalent linking chain. Specific examples thereof include a substituted or unsubstituted alkylene group, a substituted or unsubstituted arylene group, a substituted or unsubstituted alkylene group having in the inside thereof a linking group (e.g., ether, ester, amido), and a substituted or unsubstituted arylene group having in the inside thereof a linking group, preferably a substituted or unsubstituted alkylene group, a substituted or unsubstituted arylene group, or an alkylene group having in the inside thereof a linking group, more preferably an unsubstituted alkylene group, an unsubstituted arylene group or an alkylene group having in the inside thereof an ether or ester linking group, still more preferably an unsubstituted alkylene group or an alkylene group having in the inside thereof an ether or ester linking group.

Examples of the substituent include a halogen, a hydroxyl group, a mercapto group, a carboxyl group, an epoxy group, an alkyl group and an aryl group. These substituents each may be further substituted.

In formula B, l represents a number satisfying the mathematical formula: l=100−m, and m represents a number of 0 to 50. m is preferably a number of 0 to 40, more preferably a number of 0 to 30.

$R_3$ to $R_6$ each is preferably a halogen atom, a hydroxyl group, an unsubstituted alkoxy group or an unsubstituted alkyl group. $R_3$ to $R_5$ is more preferably a chlorine atom, a hydroxyl group or an unsubstituted alkoxy group having a carbon number of 1 to 6, still more preferably a hydroxyl group or an alkoxy group having a carbon number of 1 to 3, yet still more preferably a hydroxyl group or a methoxy group.

$R^6$ represents a hydrogen atom, an alkyl group, an alkoxy group, an alkoxycarbonyl group, a cyano group, a fluorine atom or a chlorine atom. Examples of the alkyl group include a methyl group and an ethyl group; examples of the alkoxy group include a methoxy group and an ethoxy group; and examples of the alkoxycarbonyl group include a methoxycarbonyl group and an ethoxycarbonyl group. $R^6$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group. $R^7$ has the same meaning as $R^1$ in formula A and is preferably a hydroxyl group or an unsubstituted alkyl group, more preferably a hydroxyl group or an alkyl group having a carbon number of 1 to 3, still more preferably a hydroxyl group or a methyl group.

Two or more kinds of the compounds represented by formula A may be used in combination. In particular, the compound of formula B is synthesized using two kinds of compounds of formula A as the starting material. Specific examples of the compound represented by formula A and the starting material for the compound represented by formula B are set forth below, but the present invention is not limited thereto.

M-1
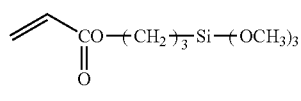

M-2
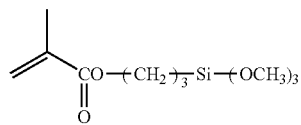

M-3
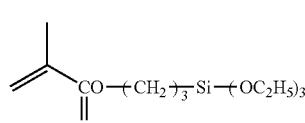

M-4
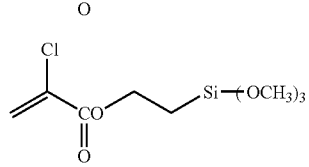

M-5
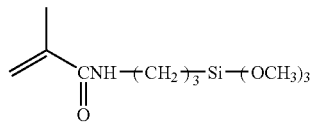

M-6
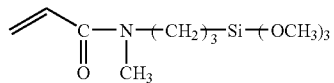

M-7
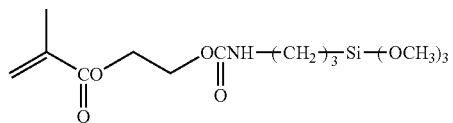

M-8
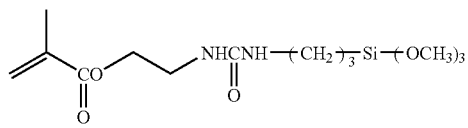

M-9
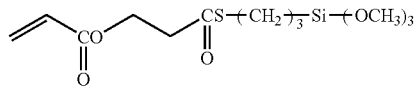

M-10
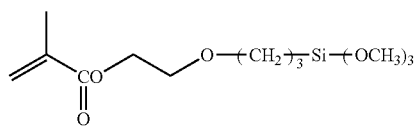

M-11
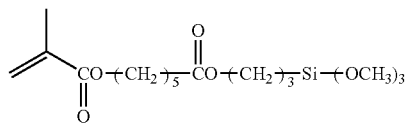

M-12
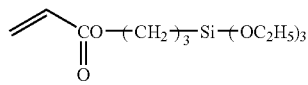

M-13
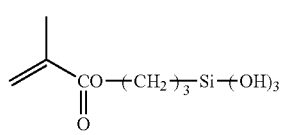

M-14
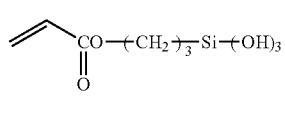

M-15
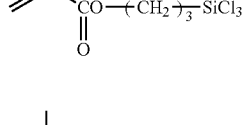

M-16
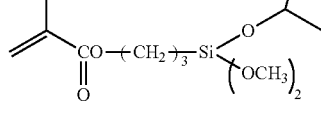

M-17
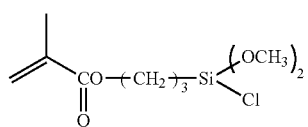

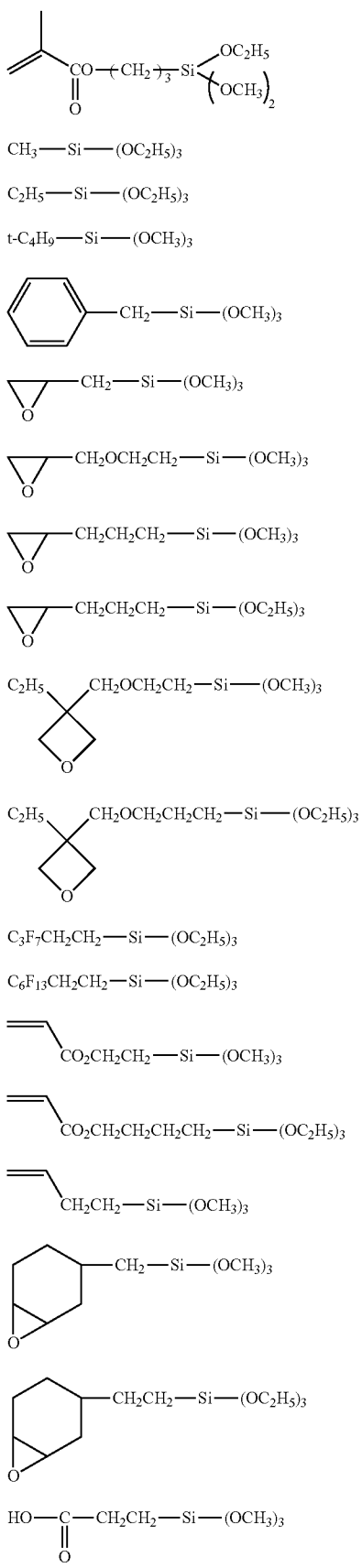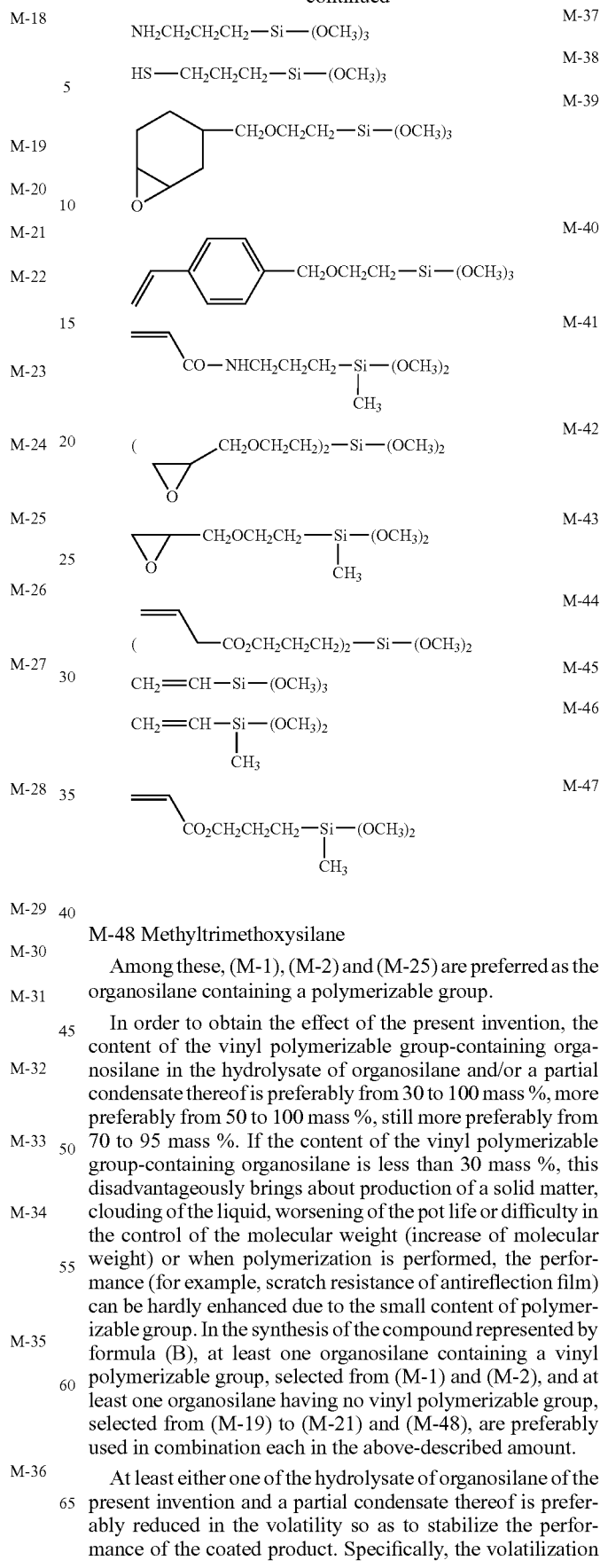

M-48 Methyltrimethoxysilane

Among these, (M-1), (M-2) and (M-25) are preferred as the organosilane containing a polymerizable group.

In order to obtain the effect of the present invention, the content of the vinyl polymerizable group-containing organosilane in the hydrolysate of organosilane and/or a partial condensate thereof is preferably from 30 to 100 mass %, more preferably from 50 to 100 mass %, still more preferably from 70 to 95 mass %. If the content of the vinyl polymerizable group-containing organosilane is less than 30 mass %, this disadvantageously brings about production of a solid matter, clouding of the liquid, worsening of the pot life or difficulty in the control of the molecular weight (increase of molecular weight) or when polymerization is performed, the performance (for example, scratch resistance of antireflection film) can be hardly enhanced due to the small content of polymerizable group. In the synthesis of the compound represented by formula (B), at least one organosilane containing a vinyl polymerizable group, selected from (M-1) and (M-2), and at least one organosilane having no vinyl polymerizable group, selected from (M-19) to (M-21) and (M-48), are preferably used in combination each in the above-described amount.

At least either one of the hydrolysate of organosilane of the present invention and a partial condensate thereof is preferably reduced in the volatility so as to stabilize the performance of the coated product. Specifically, the volatilization volume per hour at 105° C. is preferably 5 mass % or less, more preferably 3 mass % or less, still more preferably 1 mass % or less.

The content of the vinyl polymerizable group-containing organosilane in at least either one of the hydrolysate of organosilane of the present invention and a partial condensate thereof is preferably from 30 to 100 mass %, more preferably from 50 to 100 mass %, still more preferably from 70 to 100 mass %. If the content of the vinyl polymerizable group-containing organosilane is less than 30 mass %, this disadvantageously brings about production of a solid matter, clouding of the liquid, worsening of the pot life or difficulty in the control of the molecular weight (increase of molecular weight) or when polymerization is performed, the performance (for example, scratch resistance of antireflection film) can be hardly enhanced due to the small content of polymerizable group.

The sol component for use in the present invention is prepared by the hydrolysis and/or partial condensation of the organosilane.

The hydrolysis and condensation reaction is performed by adding water in an amount of 0.05 to 2.0 mol, preferably from 0.1 to 1.0 mol, per mol of the hydrolyzable group (X) and stirring the resulting solution at 25 to 100° C. in the presence of a catalyst for use in the present invention.

In at least either one of the hydrolysate of organosilane of the present invention and a partial condensate thereof, either the hydrolysate of the vinyl polymerizable group-containing organosilane or the partial condensate thereof preferably has a mass average molecular weight of 450 to 20,000, more preferably from 500 to 10,000, still more preferably from 550 to 5,000, yet still more preferably from 600 to 3,000, excluding the components having a molecular weight of less than 300.

Out of the components having a molecular weight of 300 or more in the hydrolysate of organosilane and/or a partial condensate thereof, the content of the components having a molecular weight of more than 20,000 is preferably 10 mass % or less, more preferably 5 mass % or less, still more preferably 3 mass % or less. If this content exceeds 10 mass %, the cured film obtained by curing a curable composition containing such a hydrolysate of organosilane and/or a partial condensate thereof is sometimes poor in transparency or adhesion to the substrate.

Here, the mass average molecular weight and the molecular weight are a molecular weight determined by the differential refractometer detection with a solvent THF in a GPC analyzer using a column, TSKgel GMHxL, TSKgel G4000HxL or TSKgel G2000HxL (trade names, all produced by Tosoh Corp.), and expressed in terms of polystyrene. The content is an area % of the peaks in the above-described molecular weight range, assuming that the peak area of the components having a molecular weight of 300 or more is 100%. The dispersity (mass average molecular weight/number average molecular weight) is preferably from 3.0 to 1.1, more preferably from 2.5 to 1.1, still more preferably from 2.0 to 1.1, yet still more preferably from 1.5 to 1.1.

The state of X in formula A being condensed in the form of —OSi can be confirmed by the $^{29}$Si—NMR analysis of the hydrolysate of organosilane of the present invention or the partial condensate. At this time, assuming that the case where three bonds of Si are condensed in the form of —OSi is (T3), the case where two bonds of Si are condensed in the form of —OSi is (T2), the case where one bond of Si is condensed in the form of —OSi is (T1) and the case where Si is not condensed at all is (T0), the condensation rate α is represented by mathematical formula (II):

$$\alpha=(T3\times3+T2\times2+T1\times1)/3/(T3+T2+T1+T0)$$ Mathematical Formula (II)

The condensation rate α is preferably from 0.2 to 0.95, more preferably from 0.3 to 0.93, still more preferably from 0.4 to 0.9. If the condensation rate is less than 0.1, the hydrolysis or condensation proceeds insufficiently and since the monomer component increases, the curing becomes insufficient, whereas if it exceeds 0.95, the hydrolysis or condensation excessively proceeds and the hydrolyzable group is consumed out, as a result, the interaction of binder polymer, resin substrate, inorganic fine particle and the like is reduced and the effect can be hardly obtained even when these are used.

The hydrolysate of organosilane compound and the partial condensate for use in the present invention are described in detail. The hydrolysis reaction of organosilane and the subsequent condensation reaction are generally performed in the presence of a catalyst. Examples of the catalyst include inorganic acids such as hydrochloric acid, sulfuric acid and nitric acid; organic acids such as oxalic acid, acetic acid, butyric acid, maleic acid, citric acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxy aluminum, tetrabutoxy zirconium, tetrabutyl titanate and dibutyltin dilaurate; metal chelate compounds with the center metal being a metal such as Zr, Ti or Al; and F-containing compounds such as KF and NH4F. One of these catalysts may be used alone, or a plurality of species thereof may be used in combination.

The hydrolysis and condensation reaction of organosilane may be performed without a solvent or in a solvent, but in order to uniformly mix the components, an organic solvent is preferably used. Suitable examples thereof include alcohols, aromatic hydrocarbons, ethers, ketones and esters.

The solvent is preferably a solvent capable of dissolving the organosilane and the catalyst. In view of the process, the organic solvent is preferably used as a coating solution or a part of the coating solution. Furthermore, a solvent which does not impair the solubility or dispersibility when mixed with other materials such as fluorine-containing polymer is preferred.

Examples of the alcohols include a monohydric alcohol and a dihydric alcohol. The monohydric alcohol is preferably a saturated aliphatic alcohol having a carbon number of 1 to 8.

Specific examples of the alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol acetate monoethyl ether.

Specific examples of the aromatic hydrocarbons include benzene, toluene and xylene. Specific examples of the ethers include tetrahydrofuran and dioxane. Specific examples of the ketones include acetone, methyl ethyl ketone, methyl isobutyl ketone, diisobutyl ketone and cyclohexanone. Specific examples of the esters include ethyl acetate, propyl acetate, butyl acetate and propylene carbonate.

One of these organic solvents may be used alone, or two or more species thereof may be used as a mixture. The solid content concentration in the reaction is not particularly limited but is usually from 1 to 100%.

The reaction is performed by adding water in an amount of 0.05 to 2 mol, preferably 0.1 to 1 mol, per mol of the hydrolyzable group of organosilane, and stirring the resulting solution at 25 to 100° C. in the presence or absence of the above-described solvent and in the presence of the catalyst.

In the present invention, the hydrolysis is preferably performed by stirring the solution at 25 to 100° C. in the presence of at least one metal chelate compound where an alcohol represented by the formula: $R^3OH$ (wherein $R^3$ represents an alkyl group having a carbon number of 1 to 10) and a compound represented by the formula: $R^4COCH_2COR^5$ (wherein $R^4$ represents an alkyl group having a carbon number of 1 to 10 and $R^5$ represents an alkyl group having a carbon number of 1 to 10 or an alkoxy group having a carbon number of 1 to 10) are present as ligands and the center metal is a metal selected from Zr, Ti and Al.

In the case of using a fluorine-containing compound as the catalyst, the fluorine-containing compound has a capability of allowing progress of complete hydrolysis and condensation and this is advantageous in that the polymerization degree can be determined by selecting the amount of water added and an arbitrary molecular weight can be designed. That is, in order to prepare an organosilane hydrolysate/partial condensate having an average polymerization degree of M, this may be attained by using water in an amount of (M-1) mol per M mol of the hydrolyzable organosilane.

Any metal chelate compound may be suitably used without particular limitation as long as it is a metal chelate compound where an alcohol represented by the formula: $R^3OH$ (wherein $R^3$ represents an alkyl group having a carbon number of 1 to 10) and a compound represented by the formula: $R^4COCH_2COR^5$ (wherein $R^4$ represents an alkyl group having a carbon number of 1 to 10 and $R^5$ represents an alkyl group having a carbon number of 1 to 10 or an alkoxy group having a carbon number of 1 to 10) are present as ligands and the center metal is a metal selected from Zr, Ti and Al. Within this category, two or more kinds of metal chelate compounds may be used in combination. The metal chelate compound for use in the present invention is preferably selected from the group consisting of compounds represented by the formulae: $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$. These compounds have an activity of accelerating the condensation reaction of the hydrolysate and partial condensate of the organosilane compound.

In the metal chelate compounds, $R^3$ and $R^4$ may be the same or different and each represents an alkyl group having a carbon number of 1 to 10, such as ethyl group, n-propyl group, i-propyl group, n-butyl group, sec-butyl group, tert-butyl group, n-pentyl group or phenyl group. $R^5$ represents an alkyl group having a carbon number of 1 to 10 the same as above or an alkoxy group having a carbon number of 1 to 10, such as methoxy group, ethoxy group, n-propoxy group, i-propoxy group, n-butoxy group, sec-butoxy group or tert-butoxy group. In the metal chelate compounds, p1, p2, q1, q2, r1 and r2 each represents an integer determined to satisfy the relationships of p1+p2=4, q1+q2=4 and r1+r2=3.

Specific examples of the metal chelate compound include a zirconium chelate compound such as zirconium tri-n-butoxyethylacetoacetate, zirconium di-n-butoxy-bis(ethylacetoacetate), zirconium n-butoxytris(ethylacetoacetate), zirconium tetrakis(n-propylacetoacetate), zirconium tetrakis(acetylacetoacetate) and zirconium tetrakis(ethylacetoacetate); a titanium chelate compound such as titanium diisopropoxy-bis(ethylacetoacetate), titanium diisopropoxy-bis(acetylacetate) and titanium diisopropoxy-bis(acetylacetone); and an aluminum chelate compound such as aluminum diisopropoxyethylacetoacetate, aluminum diisopropoxyacetylacetonate, aluminum isopropoxy-bis(ethylacetoacetate), aluminum isopropoxybis(acetylacetonate), aluminum tris(ethylacetoacetate), aluminum tris(acetylacetonate) and aluminum monoacetylacetonate.bis(ethylacetoacetate).

Among these metal chelate compounds, preferred are zirconium tri-n-butoxyethylacetoacetate, titanium diisopropoxybis(acetylacetonate), aluminum diisopropoxyethyl-acetoacetate and aluminum tris(ethylacetoacetate). One of these meal chelate compounds may be used alone, or two or more species thereof may be used as a mixture. A partial hydrolysate of such a metal chelate compound may also be used.

The metal chelate compound is preferably used in a proportion of 0.01 to 50 mass %, more preferably from 0.1 to 50 mass %, still more preferably from 0.5 to 10 mass %, based on the organosilane compound. When the metal chelate compound is used in this range, the condensation reaction of the organosilane compound proceeds at a high rate, the coating film has good durability, and the composition comprising the hydrolysate and partial condensate of the organosilane compound and the metal chelate compound is assured of good storage stability.

In the coating solution for use in the present invention, at least either one of a β-diketone compound and a β-ketoester compound is preferably added in addition to the composition containing the above-described sol component and metal chelate compound. This is further described below.

The compound used in the present invention is at least either one of a β-diketone compound and a β-ketoester compound, represented by the formula: $R^4COCH_2COR^5$, and this compound functions as a stability enhancer for the composition used in the present invention. That is, this compound is considered to coordinate to a metal atom in the metal chelate compound (at lease one compound of zirconium, titanium and aluminum compounds) and inhibit the metal chelate compound from exerting the activity of accelerating the condensation reaction of the hydrolysate and partial condensate of the organosilane compound, whereby the storage stability of the composition obtained is improved. $R^4$ and $R^5$ constituting the β-diketone compound and the β-ketoester compound have the same meanings as $R^4$ and $R^5$ constituting the metal chelate compound above.

Specific examples of the β-diketone compound and the β-ketoester compound include acetylacetone, methyl acetoacetate, ethyl acetoacetate, n-propyl acetoacetate, i-propyl acetoacetate, n-butyl acetoacetate, sec-butyl acetoacetate, tert-butyl acetoacetate, 2,4-hexane-dione, 2,4-heptane-dione, 3,5-heptane-dione, 2,4-octane-dione, 2,4-nonane-dione and 5-methyl-hexane-dione. Among these, ethyl acetoacetate and acetylacetone are preferred, and acetylacetone is more preferred. One of these β-diketone compounds and O-ketoester compounds may be used alone, or two or more species thereof may be used as a mixture. In the present invention, the β-diketone compound and the β-ketoester compound each is preferably used in an amount of 2 mol or more, more preferably from 3 to 20 mol, per mol of the metal chelate compound. When the amount added is 2 mol or more, the composition can have good storage stability.

The content of the hydrolysate and partial condensate of the organosilane compound is preferably small in the case of an antireflection layer which is a relatively thin film, and preferably large in the case of a hardcoat or antiglare layer which is a thick film. Considering the expression of effect, refractive index, shape/surface state of film and the like, the content is preferably from 0.1 to 50 mass %, more preferably from 0.5 to 30 mass %, and most preferably from 1 to 15 mass %, based on the entire solid content of the layer containing it (the layer to which added).

(Initiator)

The polymerization of the polyfunctional monomer (preferably a monomer having an ethylenically unsaturated group of various kinds) can be performed by irradiation of ionizing radiation or heating in the presence of a photoradical polymerization initiator or a thermal radical polymerization initiator. In preparing the film of the present invention, a photoinitiator or a thermal initiator can be used in combination.

<Photo-Initiator>

Examples of the photoradical polymerization initiator include acetophenones, benzoins, benzophenones, phosphine oxides, ketals, anthraquinones, thioxanthones, azo compounds, peroxides (described, for example, in JP-A-2001-139663), 2,3-dialkyldione compounds, disulfide compounds, fluoroamine compounds, aromatic sulfoniums, lophine dimers, onium salts, borate salts, active esters, active halogens, inorganic complexes and coumarins.

Examples of the acetophenones include 2,2-dimethoxyacetophenone, 2,2-diethoxyacetophenone, p-dimethylacetophenone, 1-hydroxy-dimethyl phenyl ketone, 1-hydroxy-dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-tert-butyl-dichloroacetophenone.

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether and benzoin isopropyl ether.

Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone) and 3,3',4,4'-tetra(tert-butylperoxycarbonyl)benzophenone.

Examples of the borate salts include organic boric acid salt compounds described, for example, in Japanese Patent 2764769, JP-A-2002-116539, and Kunz, Martin, Rad Tech'98, Proceeding April, pages 19-22, 1998, Chicago. More specifically, examples thereof include compounds described in the paragraphs [0022] to [0027] of JP-A-2002-116539, supra. Other examples of the organoboron compound include organoboron transition metal coordination complexes described JP-A-6-348011, JP-A-7-128785, JP-A-7-140589, JP-A-7-306527 and JP-A-7-292014, and specific examples thereof include ion complexes with a cationic coloring matter.

Examples of the phosphine oxides include 2,4,6-trimethylbenzoyldiphenylphosphine oxide.

Examples of the active esters include 1,2-octanedione, 1-[4-(phenylthio)-2-(O-benzoyloxime)], sulfonic acid esters and cyclic active ester compounds.

Specifically, Compounds 1 to 21 described in Examples of JP-A-2000-80068 are preferred.

Examples of the onium salts include an aromatic diazonium salt, an aromatic iodonium salt and an aromatic sulfonium salt.

Specific examples of the active halogens include compounds described in Wakabayashi et al., Bull Chem. Soc. Japan, Vol. 42, page 2924 (1969), U.S. Pat. No. 3,905,815, JP-A-5-27830, and M. P. Hutt, Journal of Heterocyclic Chemistry, Vol. 1 (No. 3), (1970), particularly an oxazole compound substituted by a trihalomethyl group; and an s-triazine compound. Among these, preferred is an s-triazine derivative where at least one mono-, di- or tri-halogen-substituted methyl group is bonded to the s-triazine ring. Specifically, s-triazine and oxathiazole compounds are known, and examples of these compounds include 2-(p-methoxyphenyl)-4,6-bis(trichloromethyl)-s-triazine, 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl-4,6-bis(trichloromethyl)-s-triazine and 2-trihalomethyl-5-(p-methoxyphenyl)-1,3,4-oxadiazole.

Specific preferred examples thereof include compounds described at pp. 14-30 of JP-A-58-15503 and pp. 6-10 of JP-A-55-77742, compound Nos. 1 to 8 described at page 287 of JP-B-60-27673, compound Nos. 1 to 17 described at pp. 443-444 of JP-A-60-239736, and compound Nos. 1 to 19 described in U.S. Pat. No. 4,701,399.

Examples of the inorganic complexes include bis-($\eta^5$-2,4-cyclopentadien-1-yl)-bis[2,6-difluoro-3-(1H-pyrrol-1-yl)-phenyl]titanium.

Examples of the coumarins include 3-ketocoumarin.

With respect to the active halogens as the initiator, the following initiators are preferred.

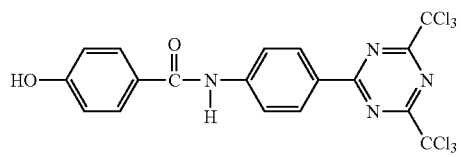

(IC-1)

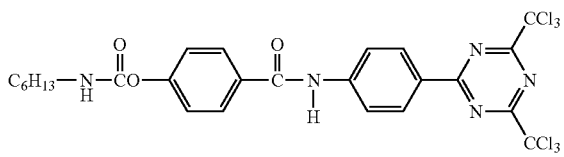

(IC-2)

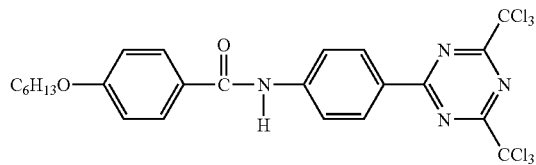

(IC-3)

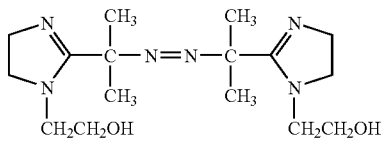

(IC-4)

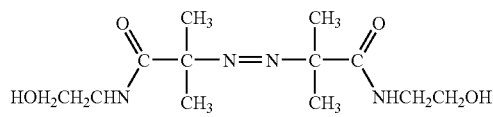

(IC-5)

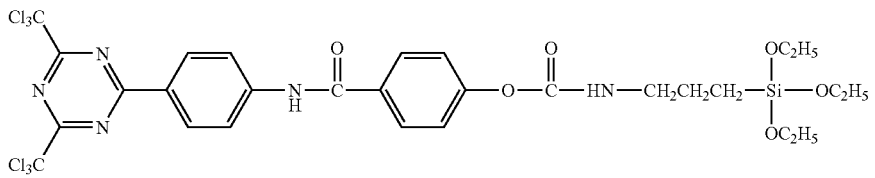
(IC-6)

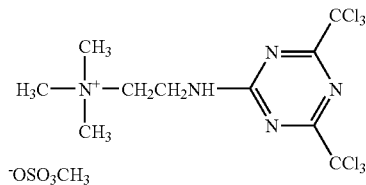
(IC-7)

Examples of the self-polymerization-initiating curable compound where an ethylenically unsaturated group-containing curable compound and a polymerization initiation site are linked and bonded within the molecule are set forth below.

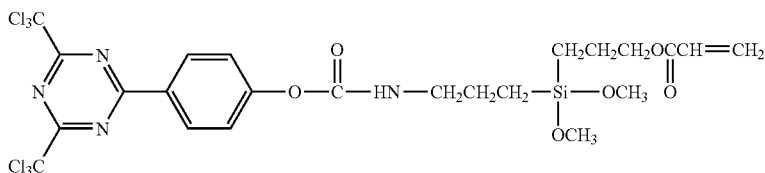
(IC-8)

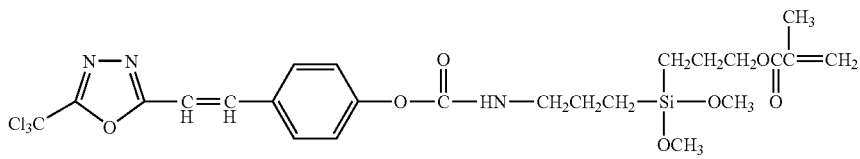
(IC-9)

Also, specific compounds of the initiator which can be used in the present invention are set forth below.

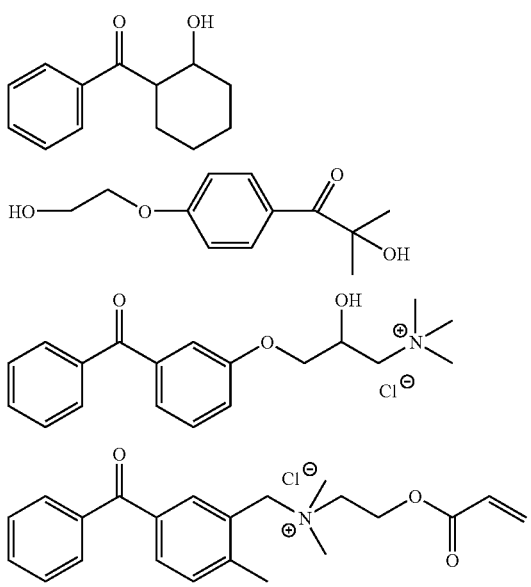

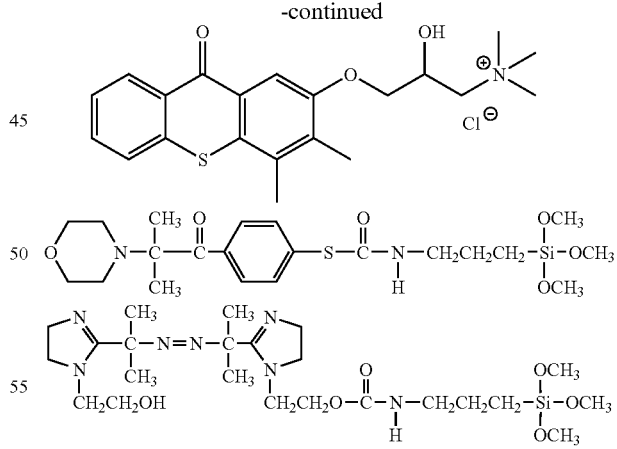

These initiators may be used individually or as a mixture. Various examples are also described in Saishin UV Koka Gijutsu (Latest UV Curing Technologies), page 159, Technical Information Institute Co., Ltd. (1991), and Kiyomi Kato, Shigaisen Koka System (Ultraviolet Curing System), pp. 65-148, Sogo Gijutsu Center (1989), and these are useful in the present invention.

Preferred examples of the commercially available photo-radical polymerization initiator include KAYACURE (e.g., DETX-S, BP-100, BDMK, CTX, BMS, 2-EAQ, ABQ, CPTX, EPD, ITX, QTX, BTC, MCA) produced by Nippon Kayaku Co., Ltd.; Irgacure (e.g., 651, 184, 500, 819, 907, 369, 1173, 1870, 2959, 4265, 4263) produced by Ciba Specialty Chemicals Corp.; Esacure (KIP100F, KB1, EB3, BP, X33, KT046, KT37, KIP150, TZT) produced by Sartomer Company Inc.; and a mixture thereof.

The photopolymerization initiator is preferably used in an amount of 0.1 to 15 parts by mass, more preferably from 1 to 10 parts by mass, per 100 parts by mass of the polyfunctional monomer.

<Photosensitizer>

In addition to the photopolymerization initiator, a photosensitizer may be used. Specific examples of the photosensitizer include n-butylamine, triethylamine, tri-n-butylphosphine, Michler's ketone and thioxanthone.

Furthermore, one or more auxiliary agents such as azide compound, thiourea compound and mercapto compound may be used in combination.

Examples of the commercially available photosensitizer include KAYACURE (DMBI, EPA) produced by Nippon Kayaku Co., Ltd.

<Thermal Initiator>

As for the thermal radical initiator, an organic or inorganic peroxide, an organic azo or diazo compound, or the like may be used.

More specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2,2'-azobis(isobutyronitrile), 2,2'-azobis(propionitrile) and 1,1'-azobis(cyclohexanecarbonitrile); and examples of the diazo compound include diazoaminobenzene and p-nitrobenzenediazonium.

(Crosslinking Compound (Crosslinking Compound Capable of Reacting with a Hydroxyl Group))

In the case where the monomer or polymer binder constituting the present invention lacks in satisfactory curability by itself, the necessary curability can be imparted by blending a crosslinking compound in at least either one of the two kinds of coating compositions. For example, when the polymer body contains a hydroxyl group, various amino compounds are preferably used as the curing agent. The amino compound used as the crosslinking compound is, for example, a compound having two or more groups in total of either one or both of a hydroxyalkylamino group and an alkoxyalkylamino group, and specific examples thereof include a melamine-based compound, a urea-based compound, a benzoguanamine-based compound and a gycoluril-based compound.

In another embodiment of the present invention for the production method of a laminate comprising layers provided by coating at least two kinds of coating compositions, respectively, at least either one of a hydroxyl group-containing compound and the above-described crosslinking compound is contained in the two compositions. In the case where only either one compound is contained in the two compositions, the compound is preferably a crosslinking compound. From the standpoint of increasing the interface strength, two compositions both preferably contain a hydroxyl group-containing compound and the above-described crosslinking compound.

The melamine-based compound is generally known as a compound having a skeleton where a nitrogen atom is bonded to the triazine ring, and specific examples thereof include melamine, alkylated melamine, methylol melamine and alkoxylated methyl melamine. A compound having two or more groups in total of either one or both of a methylol group and an alkoxylated methyl group within one molecule is preferred. Specifically, a methylolated melamine obtained by reacting melamine and formaldehyde under basic conditions, an alkoxylated methyl melamine, and a derivative thereof are preferred, and an alkoxylated methyl melamine is more preferred because of good storage stability of the curable resin composition and good reactivity. The methylolated melamine and alkoxylated methyl melamine used as the crosslinking compound are not particularly limited, and various resinous materials obtained by a method described, for example, in Plastic Zairyo Koza (Plastic Material Lecture) [8] Urea-Melamine Jushi (Urea-Melamine Resin), Nikkan Kogyo Shinbun-Sha, can also be used.

Examples of the urea-based compound include urea, an polymethylolated urea, its derivative alkoxylated methylurea, and a methylolated or alkoxylated methyl urone having a uronic ring. As for the compound such as urea derivative, also various resinous materials described in the publication above can be used.

In the case where the polymer body has a polymerizable unsaturated group, a crosslinking compound having a polymerizable unsaturated group is preferably used. In the case of addition to a fluorine-based polymer, as described in JP-A-2002-145952, use in combination with a compound having a fluorine-containing polyfunctional polymerizable unsaturated group is also preferred. Examples of the compound having a polyfunctional polymerizable unsaturated group include polyfunctional monomers described above for the hardcoat layer. These compounds are preferred, because when a compound having a polymerizable unsaturated group in the polymer body is employed, a large effect of improving the scratch resistance is obtained by the use in combination.

(Curing Catalyst)

In the film of the present invention, a crosslinking reaction between the hydroxyl group of the fluorine-containing polymer and the curing agent is caused to proceed under heating, whereby the film is cured. In this system, the curing is more accelerated by an acid and therefore, an acidic substance is preferably added to the curable resin composition. However, if a normal acid is added, the crosslinking reaction proceeds even in the coating solution and this give rise to a failure (e.g., unevenness, repelling). Accordingly, in order to satisfy both the storage stability and the curing activity in the thermal (photo) curing system, it is more preferred to add a compound capable of generating an acid by the effect of heat (light).

(Thermal Acid Generator)

The thermal acid generator is preferably a salt comprising an acid and an organic base. Examples of the acid include an organic acid such as sulfonic acid, phosphonic acid and carboxylic acid, and an inorganic acid such as phosphoric acid. In view of compatibility with the polymer, an organic acid is more preferred, a sulfonic acid and a phosphonic acid are still more preferred, and a sulfonic acid is most preferred. Preferred examples of the sulfonic acid include p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MsOH) and nonafluorobutane-1-sulfonic acid (NFBS), and these all are preferably used (abbreviations are shown in parentheses).

The cursing catalyst greatly varies depending on the basicity and boiling point of the organic base combined with the acid. The curing catalyst preferably used in the present invention from respective standpoints is described below.

The acid generation efficiency at the heating is higher as the basicity of the organic base is lower, and this is preferred in view of curing activity, but if the basicity is too low, the storage stability becomes insufficient. Accordingly, an organic base having appropriate basicity is preferably used. When the basicity is expressed by using, as an index, pKa of the conjugated acid, the pKa of the organic base used in the present invention is preferably from 5.0 to 11.0, more preferably from 6.0 to 10.5, still more preferably from 6.5 to 10.0. As for the pKa value of the organic base, the values in an aqueous solution are described in Kagaku Binran (Chemical Handbook), Kiso-Hen (Basic Edition), 5th Rev. Ed., Vol. 2, pp. II-334-340, compiled by The Chemical Society of Japan, Maruzene (2004), and an organic base having an appropriate pKa can be selected therefrom. Even when not described in this publication, a compound estimated to have an appropriate pKa from its structure can also be preferably used. Compounds having an appropriate pKa described in the publication are shown in the Table below, but the compounds which can be preferably used in the present invention are not limited thereto.

TABLE 10

|      |                                | pKa  |
| ---- | ------------------------------ | ---- |
| b-1  | N,N-dimethylaniline            | 5.1  |
| b-2  | benzimidazole                  | 5.5  |
| b-3  | pyridine                       | 5.7  |
| b-4  | 3-methylpyridine               | 5.8  |
| b-5  | 2,9-dimethyl-1,10-phenanthroline | 5.9 |
| b-6  | 4,7-dimethyl-1,10-phenanthroline | 5.9 |
| b-7  | 2-methylpyridine               | 6.1  |
| b-8  | 4-methylpyridine               | 6.1  |
| b-9  | 3-(N,N-dimethylamino)pyridine  | 6.5  |
| b-10 | 2,6-dimethylpyridine           | 7.0  |
| b-11 | imidazole                      | 7.0  |
| b-12 | 2-methylimidazole              | 7.6  |
| b-13 | N-ethylmorpholine              | 7.7  |
| b-14 | N-methylmorpholine             | 7.8  |
| b-15 | bis(2-methoxyethyl)amine       | 8.9  |
| b-16 | 2,2'-iminodiethanol            | 9.1  |
| b-17 | N,N-dimethyl-2-aminoethanol    | 9.5  |
| b-18 | trimethylamine                 | 9.9  |
| b-19 | triethylamine                  | 10.7 |

The acid generation efficiency at the heating is higher as the boiling point of the organic base is lower, and this is preferred in view of curing activity. Accordingly, an organic base having appropriate boiling point is preferably used. The boiling point of the base is preferably 120° C. or less, more preferably 80° C. or less, still more preferably 70° C. or less.

Examples of the organic base which can be preferably used in the present invention include, but are not limited to, the following compounds. The boiling points are shown in parentheses.

b-3: pyridine (115° C.), b-14: N-methylmorpholine (115° C.), b-20: diallylmethylamine (111° C.), b-19: triethylamine (88.8° C.), b-21: tert-butylmethylamine (67 to 69° C.), b-22: dimethylisopropylamine (66° C.), b-23: diethylmethylamine (63 to 65° C.), b-24: dimethylethylamine (36 to 38° C.), and b-18: trimethylamine (3 to 5° C.).

In use as the thermal acid generator of the present invention, a salt comprising the acid and the organic base may be isolated and used or after mixing the acid and the organic base to form a salt in a solution, the solution may be used. For both the acid and the organic base, one species may be used alone or a plurality of species may be mixed and used. In mixing the acid and the organic base, the equivalent ratio between the acid and the organic base mixed is preferably 1:0.9 to 1.5, more preferably 1:0.95 to 1.3, still more preferably 1:1.0 to 1.1.

The proportion of the thermal acid generator used is preferably from 0.01 to 10 parts by mass, more preferably from 0.1 to 5 parts by mass, still more preferably from 0.2 to 3 parts by mass, per 100 parts by mass of the fluorine-containing polymer in the curable resin composition.

The curing catalysts contained in the at least two kinds of coating compositions all are preferably a thermal acid generator. When all curing catalysts are of the same curing type, the curing step can be simplified. Also, even when the curing catalysts are mixed resulting from mixing of layers at the simultaneous superposition, the curing is hardly worsened and this is preferred. Furthermore, the layers are chemically bound by the compounds of the same curing type and this is associated with enhancement of interface adhesion and is advantageous also in view of scratch resistance.

In the present invention, a compound capable of generating an acid upon irradiation of light, that is, a photoacid generator (in the present invention, used in the same meaning as a photosensitive acid generator), may be further added other than the thermal acid generator described above. The photosensitive acid generator is a substance which imparts photosensitivity to the coating film of the curable resin composition and allows the coating film to be photo-cured, for example, upon irradiation of radiation such as light. Examples of the photosensitive acid generator include (1) various onium salts such as iodonium salt, sulfonium salt, phosphonium salt, diazonium salt, ammonium salt and pyridinium salt; (2) sulfone compounds such as β-ketoester, β-sulfonylsulfone and their α-diazo compound; (3) sulfonic acid esters such as alkylsulfonic acid ester, haloalkylsulfonic acid ester, arylsulfonic acid ester and imino sulfonate; (4) sulfonimide compounds; (5) diazomethane compounds; and others. These may be appropriately used.

These photosensitive acid generators may be used individually or in combination of two or more thereof or may be used in combination with the above-described thermal acid generator. The proportion of the photosensitive acid generator used is preferably from 0 to 20 parts by mass, more preferably from 0.1 to 10 parts by mass, per 100 parts by mass of the fluorine-containing polymer in the curable resin composition. When the proportion of the photosensitive acid generator is not more than the upper limit above, the cured film can have excellent strength and good transparency and this is preferred.

(Photoacid Generator)

In the present invention, a photoacid generator (photosensitive acid generator) can be used as the curing catalyst contained in the at least two kinds of coating composition. The photoacid generator is described in detail below.

Examples of the photoacid generator include known compounds such as photo-initiator for photo-cationic polymerization, photo-decoloring agent for coloring matters, photo-discoloring agent and known acid generator used for microresist or the like, and a mixture thereof. Also, examples of the acid generator include an organic halogenated compound, a disulfone compound and an onium compound. Of these, specific examples of the organohalogen compound and the disulfone compound are the same as those described above for the radical-generating compound.

Examples of the photosensitive acid generator include (1) various onium salts such as iodonium salt, sulfonium salt, phosphonium salt, diazonium salt, ammonium salt and pyridinium salt; (2) sulfone compounds such as β-ketoester, β-sulfonylsulfone and their α-diazo compound; (3) sulfonic acid esters such as alkylsulfonic acid ester, haloalkylsulfonic acid ester, arylsulfonic acid ester and imino sulfonate; (4) sulfonimide compounds; and (5) diazomethane compounds.

Examples of the onium compound include a diazonium salt, an ammonium salt, an iminium salt, a phosphonium salt, an iodonium salt, a sulfonium salt, an arsonium salt and a selenonium salt. Among these, a diazonium salt, an iodonium salt, a sulfonium salt and an iminium salt are preferred in view of photosensitivity at the initiation of photopolymerization, material stability of the compound, and the like. Examples thereof include compounds described in paragraphs [0058] to [0059] of JP-A-2002-29162.

The proportion of the photosensitive acid generator used is preferably from 0.01 to 10 parts by mass, more preferably from 0.1 to 5 parts by mass, per 100 parts by mass of the curable resin composition.

As for specific compounds and use method, those described, for example, in JP-A-2005-43876 can be used.

In the present invention, the curing catalysts contained in the at least two kinds of coating compositions all are preferably a photoacid generator. When all curing catalysts are of the same curing type, the curing step can be simplified. Also, even when the curing catalysts are mixed resulting from mixing of layers at the simultaneous superposition, the curing is hardly worsened and this is preferred. Furthermore, the layers are chemically bound by the compounds of the same curing type and this is associated with enhancement of interface adhesion and is advantageous also in view of scratch resistance.

(Light-Transparent Resin Particle)

The at least two kinds of coating compositions may contain a light-transparent resin particle having an average particle diameter of 3 to 15 µm. By virtue of the light-transparent resin particle, the layers provided by coating at least two kinds of coating composition can function as a light-diffusing layer. The particle diameter of the light-transparent resin is preferably from 5 to 13 µm, more preferably from 6 to 10 µm. This light-transparent resin particle is used for the purpose of diffusing and thereby weakening the outside light reflected on the display surface or enlarging the viewing angle (particularly the viewing angle in the downward direction) of a liquid crystal display device to ensure that even when the viewing angle in the observation direction is changed, contrast reduction, black-and-white reversal or color phase change less occurs. In the present invention, when the average particle diameter is within the above-described range, a screen assured of real black and less roughened texture despite appropriate antiglare property can be obtained and on viewing a high-definition display, fine brightness unevenness called glaring ascribable to surface irregularities can be reduced.

The light-transparent resin particle should have the above-described average particle diameter and additionally, the difference in the refractive index from the binder described above needs to be adjusted so as to bring out the light-diffusing effect and the antiglare property. More specifically, the difference in the refractive index between the light-transparent resin particle and the binder is, in terms of an absolute value, preferably from 0 to 0.2, more preferably from 0.001 to 0.1, still more preferably from 0.001 to 0.05. Furthermore, a particle having a high crosslinking degree is preferred, and the particle is preferably crosslinked by containing a crosslinking agent in an amount of 1 mol % or more, more preferably 3 mol % or more, based on all monomers before synthesizing the particle.

Here, the refractive index of the binder may be quantitatively evaluated by directly measuring the refractive index with an Abbe refractometer or by measuring a spectral reflection spectrum or a spectral ellipsometry. The refractive index of the light-transparent particle is determined as follows. The light-transparent particle is dispersed in an equivalent amount in solvents prepared by changing the mixing ratio of two kinds of solvents differing in the refractive index and thereby varying the refractive index, the turbidity is measured, and the refractive index of the solvent when the turbidity becomes minimum is measured by an Abbe refractometer.

The amount of the light-transparent resin particle added to the binder is preferably from 2 to 40 mass %, more preferably from 4 to 25 mass %, based on the entire solid content of the light-diffusing layer. The coated amount of the light-transparent resin particle is preferably from 10 to 10,000 mg/m$^2$, more preferably from 50 to 4,000 mg/m$^2$. The light-transparent resin particle may be selected from the resin particles described below according to the desired refractive index and average particle size.

Specific preferred examples of the resin particle for use in the present invention include a resin particle such as crosslinked polymethyl methacrylate particle, crosslinked methyl methacrylate-styrene copolymer particle, crosslinked polystyrene particle, crosslinked methyl methacrylate-methyl acrylate copolymer particle and crosslinked acrylate-styrene copolymer particle. Furthermore, a so-called surface-modified particle obtained by chemically bonding a compound containing a fluorine atom, a silicon atom, a carboxyl group, a hydroxyl group, an amino group, a sulfonic acid group, a phosphoric acid group or the like, onto the surface of such a resin particle may also be preferably used. Among these, preferred are a crosslinked styrene particle, a crosslinked polymethyl methacrylate particle and a crosslinked methyl methacrylate-styrene copolymer particle.

The shape of the resin particle may be either true spherical or amorphous. As for the particle size distribution, in view of the control of haze value and diffusing property and the homogeneity of coated surface state, a monodisperse particle is preferred. For example, when a particle having a particle diameter 20% or more larger than the average particle diameter is defined as a coarse particle, the percentage by number of this coarse particle in all particles is preferably 1% or less, more preferably 0.1% or less, still more preferably 0.01% or less. The particle having such a particle diameter distribution is obtained by performing classification after a normal synthesis reaction, and when the number of classifications is increased or the level of classification is elevated, a particle having a more preferred distribution can be obtained.

The particle size distribution of the particle is measured by a Coulter counter method, and the measured distribution is converted into a particle number distribution. The average particle diameter is calculated from the obtained particle distribution.

Two or more kinds of light-transparent particles differing in the particle diameter may be used in combination. The light-transparent particle having a larger particle diameter can impart antiglare property and the light-transparent particle having a smaller particle diameter can reduce the roughened texture on the surface.

The density of the light-transparent particle is preferably from 10 to 1,000 mg/m$^2$, more preferably from 100 to 700 mg/m$^2$.

<Preparation and Classification of Light-Transparent Particle>

Examples of the production method of the light-transparent particle for use in the present invention include a suspension polymerization method, an emulsion polymerization method, a soap-free emulsion polymerization method, a dispersion polymerization method and a seed polymerization method, and any of these production methods may be employed. These methods may be performed by referring to methods described, for example, in Takayuki Ohtsu and Masaetsu Kinoshita, Kobunshi Gosei no Jikken Ho (Experimental Technique for the Synthesis of Polymer), page 130 and pages 146-147, Kagaku Dojin Sha, Gosei Kobunshi (Synthetic Polymer), Vol. 1, pp. 246-290, ibid., Vol. 3, pp. 1-108, U.S. Pat. Nos. 2,543,503, 3,508,304, 2,746,275, 3,521,560 and 3,580,320, JP-A-10-1561, JP-A-7-2908, JP-A-5-297506 and JP-A-2002-145919.

As for the particle size distribution of the light-transparent particle, in view of the control of haze value and diffusing property and the homogeneity of coated surface state, a monodisperse particle is preferred. For example, when a particle having a particle diameter 20% or more larger than the average particle diameter is defined as a coarse particle, the percentage by number of this coarse particle in all particles is preferably 1% or less, more preferably 0.1% or less, still more preferably 0.01% or less. For obtaining a particle having such a particle size distribution, classification after preparation or synthesis reaction is effective and by increasing the number of classifications or elevating the level of classification, a particle having a preferred distribution can be obtained.

The classification is preferably performed by using a method such as air classification, centrifugal classification, precipitation classification, filtration classification and electrostatic classification.

(Inorganic Particle)

In the present invention, for enhancing physical properties such as hardness or optical properties such as reflectance and scattering, various inorganic particles can be used.

The inorganic particle comprises an oxide of at least one metal selected from silicon, zirconium, titanium, aluminum, indium, zinc, tin and antimony. Specific examples thereof include $ZrO_2$, $TiO_2$, $Al_2O_3$, $In_2O_3$, ZnO, $SnO_2$, $Sb_2O_3$ and ITO. Other examples include $BaSO_4$, $CaCO_3$, talc and kaolin.

The inorganic particle for use in the present invention is preferably dispersed in a dispersion medium to have a particle diameter as small as possible. The mass average particle diameter is from 1 to 200 nm, preferably from 5 to 150 nm, more preferably from 10 to 100 nm, still more preferably from 10 to 80 nm. By finely dispersion the inorganic particle to 100 nm or less, a film of which transparency is not impaired can be formed. The particle diameter of the inorganic particle can be measured by a light-scattering method or an electron microphotograph.

The specific surface area of the inorganic particle is preferably from 10 to 400 $m^2/g$, more preferably from 20 to 200 $m^2/g$, and most preferably from 30 to 150 $m^2/g$.

The inorganic particle for use in the present invention is preferably dispersed in a dispersion medium and added as a dispersion to the coating solution of the layer in which the inorganic particle is used.

The dispersion medium for the inorganic particle is preferably a liquid having a boiling point of 60 to 170° C. Examples of the dispersion medium include water, an alcohol (e.g., methanol, ethanol, isopropanol, butanol, benzyl alcohol), a ketone (e.g., acetone, methyl ethyl ketone, methyl isobutyl ketone, cyclohexanone), an ester (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran) and an ether alcohol (e.g., 1-methoxy-2-propanol). Among these, preferred are toluene, xylene, methyl ethyl ketone, methyl isobutyl ketone, cyclohexanone and butanol.

The dispersion medium is more preferably methyl ethyl ketone, methyl isobutyl ketone or cyclohexanone.

The inorganic particle is dispersed by using a disperser. Examples of the disperser include a sand grinder mill (e.g., bead mill with pin), a high-speed impeller mill, a pebble mill, a roller mill, an attritor and a colloid mill. Among these, a sand grinder mill and a high-speed impeller mill are preferred. Also, a preliminary dispersion treatment may be performed. Examples of the disperser for use in the preliminary dispersion treatment include a ball mill, a three-roll mill, a kneader and an extruder.

<High Refractive Index Particle>

For the purpose of elevating the refractive index of the layer constituting the present invention, a cured product of a composition prepared by dispersing a high refractive index inorganic particle in the monomer, initiator and organic substituted silicon compound is preferably used.

As for the inorganic particle used here, in view of refractive index, $ZrO_2$ or $TiO_2$ is preferably used. A $ZrO_2$ fine particle is most preferred for elevating the refractive index of the hard-coat layer, and a $TiO_2$ fine particle is most preferred as a particle for the high refractive index layer and the medium refractive index layer. In the present invention, when two or more of these high refractive index-containing layers are simultaneously coated as the upper layer, from the standpoint of preventing diffusion to the adjacent layer, the average particle diameter of the particle is preferably from 30 to 150 nm, more preferably from 35 to 80 nm (the particle diameter here indicates the secondary particle size).

The $TiO_2$ particle is preferably an inorganic particle comprising $TiO_2$ as the main component and containing at least one element selected from cobalt, aluminum and zirconium. The "main component" means a component of which content (mass %) is largest among the components constituting the particle.

The particle comprising $TiO_2$ as the main component, for use in the present invention, preferably has a refractive index of 1.90 to 2.80, more preferably from 2.10 to 2.80, and most preferably from 2.20 to 2.80.

The mass average primary particle diameter of the particle comprising $TiO_2$ as the main component is preferably from 1 to 200 nm, more preferably from 1 to 150 nm, still more preferably from 1 to 100 nm, yet still more preferably from 1 to 80 nm.

As for the crystal structure of the particle comprising $TiO_2$ as the main component, the main component is preferably a rutile, rutile/anatase mixed crystal, anatase or amorphous structure, more preferably a rutile structure. The "main component" means a component of which content (mass %) is largest among the components constituting the particle.

By virtue of incorporating at least one element selected from Co (cobalt), Al (aluminum) and Zr (zirconium) into the particle comprising $TiO_2$ as the main component, the photocatalytic activity of $TiO_2$ can be suppressed and the weather resistance of the film of the present invention can be improved.

The element is preferably Co (cobalt). The combination use of two or more kinds of elements is also preferred.

The inorganic particle comprising $TiO_2$ as the main component of the present invention may be surface-treated to have a core/shell structure as described in JP-A-2001-166104.

The amount of the monomer or inorganic particle added in the layer is preferably from 10 to 90 mass %, more preferably from 20 to 80 mass %, based on the entire mass of the binder. Two or more kinds of inorganic particles may be used in the layer.

<Low Refractive Index Particle>

The inorganic particle incorporated into the low refractive index layer preferably has a low refractive index, and examples thereof include fine particles of magnesium fluoride and silica. In the case of using the inorganic particle in the low refractive index layer and simultaneously coating the low refractive index layer with other layers, in order to reduce the diffusibility, the average particle size is preferably from 30 to 150 nm, more preferably from 35 to 80 nm.

Among these particles, a silica fine particle is preferred in view of refractive index, dispersion stability and cost.

The average particle diameter of the silica fine particle is preferably from 30 to 150%, more preferably from 35 to 80%, still more preferably from 40 to 60%, of the thickness of the low refractive index layer. In other words, when the thickness of the low refractive index layer is 100 nm, the particle diameter of the silica fine particle is preferably from 30 to 150 nm, more preferably from 35 to 80 nm, still more preferably from 40 to 60 nm.

The average particle diameter of the inorganic particle is measured by a Coulter counter.

If the particle diameter of the silica fine particle is too small, the effect of improving the scratch resistance decreases, whereas if it is excessively large, fine irregularities are generated on the low refractive index layer surface and the appearance (e.g., real black) or integrated reflectance may be deteriorated.

The silica fine particle may be either crystalline or amorphous and may be a monodisperse particle or may be even an aggregated particle as long as the predetermined particle diameter is satisfied. The shape is most preferably spherical but even if amorphous, there arises no problem.

At least one species of a silica fine particle having an average particle size of less than 25% of the thickness of the low refractive index layer (this fine particle is referred to as a "small particle-diameter silica fine particle") is preferably used in combination with the silica fine particle having the above-described particle diameter (this fine particle is referred to as a "large particle-diameter silica fine particle").

The small particle-diameter silica fine particle can be present in a space between large particle-diameter silica fine particles and therefore, can contribute as a holding agent for the large particle-diameter silica fine particle.

The average particle diameter of the small particle-diameter silica fine particle when the thickness of the low refractive index layer is 100 nm is preferably from 1 to 20 nm, more preferably from 5 to 15 nm, still more preferably from 10 to 15 nm. Use of such a silica fine particle is preferred in view of the raw material cost and the holding agent effect.

The amount of the low refractive index particle coated is preferably from 1 to 100 mg/m$^2$, more preferably from 5 to 80 mg/m$^2$, still more preferably from 10 to 60 mg/m$^2$. If the amount coated is too small, the effect of improving the scratch resistance decreases, whereas if it is excessively large, fine irregularities are generated on the low refractive index layer surface and the appearance (e.g., real black) or integrated reflectance may be deteriorated.

<Hollow Silica Particle>

For the purpose of more decreasing the refractive index, a hollow silica fine particle is preferably used.

The refractive index of the hollow silica fine particle is preferably from 1.15 to 1.40, more preferably from 1.17 to 1.35, and most preferably from 1.17 to 1.30. The refractive index used here indicates a refractive index of the particle as a whole and does not indicate a refractive index of only silica as an outer shell forming the hollow silica particle. At this time, assuming that the radius of the cavity inside the particle is a and the radius of the outer shell of the particle is b, the porosity x calculated according the following mathematical formula (VIII) is preferably from 10 to 60%, more preferably from 20 to 60%, and most preferably from 30 to 60%.

$$x=(4\pi a^3/3)/(4\pi b^3/3)\times 100 \qquad \text{Mathematical formula (VIII)}$$

If the hollow silica particle is intended to have a lower refractive index and a higher porosity, the thickness of the outer shell becomes small and the strength as a particle decreases. Therefore, in view of scratch resistance, a particle having a refractive index of less than 1.15 is not preferred.

The production method of the hollow silica is described, for example, in JP-A-2001-233611 and JP-A-2002-79616. In particular, a particle where a cavity is present inside the shell and pores of the shell are closed is preferred. Incidentally, the refractive index of such a hollow silica particle can be calculated by the method described in JP-A-2002-79616.

The amount of the hollow silica coated is preferably from 1 to 100 mg/m$^2$, more preferably from 5 to 80 mg/m$^2$, still more preferably from 10 to 60 mg/m$^2$. When the amount coated is 1 mg/m$^2$, an effect of decreasing the refractive index or improving the scratch resistance is obtained, and when the amount coated is 100 mg/m$^2$ or less, generation of fine irregularities on the low refractive index layer surface is prevented, and the appearance (e.g., real black) or integrated reflectance is enhanced.

The average particle diameter of the hollow silica is preferably from 30 to 150%, more preferably from 35 to 80%, still more preferably from 40 to 60%, of the thickness of the low refractive index layer. In other words, when the thickness of the low refractive index layer is 100 nm, the particle diameter of the hollow silica is preferably from 30 to 150 nm, more preferably from 35 to 100 nm, still more preferably from 40 to 65 nm.

If the particle diameter of the silica fine particle is too small, the proportion of the cavity part decreases and reduction of the refractive index cannot be expected, whereas if it is excessively large, fine irregularities are generated on the low refractive index layer surface and the appearance (e.g., real black) or integrated reflectance may be deteriorated. The silica fine particle may be crystalline or amorphous and is preferably a monodisperse particle. The shape is most preferably spherical but even if amorphous, there arises no problem.

Two or more kinds of hollow silica particles differing in the average particle size may be used in combination. The average particle diameter of the hollow silica can be determined from an electron microphotograph.

In the present invention, the specific surface area of the hollow silica is preferably from 20 to 300 m$^2$/g, more preferably from 30 to 120 m$^2$/g, and most preferably from 40 to 90 m$^2$/g. The surface area can be determined by the BET method using nitrogen.

In the present invention, a cavity-free silica particle may be used in combination with the hollow silica. The particle size of the cavity-free silica is preferably from 30 to 150 nm, more preferably from 35 to 100 nm, and most preferably from 40 to 80 nm.

(Electrically Conducting Particle)

In the film of the present invention, various electrically conducting particles may be used so as to impart electrical conductivity.

The electrically conducting particle is preferably formed of an oxide or nitride of metal. Examples of the oxide or nitride of metal include tin oxide, indium oxide, zinc oxide and titanium nitride, with tin oxide and indium oxide being preferred. The electrically conducting inorganic particle comprises such an oxide or nitride of metal as the main component and may further contain other elements. The "main component" means a component of which content (mass %) is largest among the components constituting the particle. Examples of the other element include Ti, Zr, Sn, Sb, Cu, Fe, Mn, Pb, Cd, As, Cr, Hg, Zn, Al, Mg, Si, P, S, B, Nb, In, V and a halogen atom. In order to enhance the electrical conductivity of tin oxide or indium oxide, addition of Sb, P, B, Nb, In, V or a halogen atom is preferred. An Sb-containing tin oxide (ATO) and an Sn-containing indium oxide (ITO) are particularly preferred. The proportion of Sb in ATO is preferably from 3 to 20 mass %, and the proportion of Sn in ITO is preferably from 5 to 20 mass %.

As long as the refractive index is in the objective range, such a particle may be used in the medium refractive index layer or the high refractive index layer, similarly to the above-described high refractive index particle.

The average primary particle diameter of the electrically conducting inorganic particle for use in the antistatic layer is preferably from 1 to 150 nm, more preferably from 5 to 100 nm, and most preferably from 5 to 70 nm. The average particle diameter of the electrically conducting inorganic particle in the antistatic layer formed is from 1 to 200 nm, preferably from 5 to 150 nm, more preferably from 10 to 100 nm, and most preferably from 10 to 80 nm. The average particle diameter of the electrically conducting particle is an average diameter weighed by the mass of particle and can be measured by a light scattering method or an electron microphotograph.

The specific surface area of the electrically conducting inorganic particle is preferably from 10 to 400 $m^2/g$, more preferably from 20 to 200 $m^2/g$, and most preferably from 30 to 150 $m^2/g$.

The electrically conducting inorganic particle may be surface-treated. The surface treatment is performed using an inorganic compound or an organic compound. Examples of the inorganic compound for use in the surface treatment include alumina and silica. A silica treatment is preferred. Examples of the organic compound for use in the surface treatment include a polyol, an alkanolamine, a stearic acid, a silane coupling agent and a titanate coupling agent, with a silane coupling agent being most preferred. Two or more kinds of surface treatments may be practiced in combination.

The shape of the electrically conducting inorganic particle is preferably rice grain-like, spherical, cubic, spindle-like or amorphous.

Two or more kinds of electrically conducting particles may be used in combination in a specific layer or as a film.

The proportion of the electrically conducting inorganic particle in the antistatic layer is preferably from 20 to 90 mass %, more preferably from 25 to 85 mass %, still more preferably from 30 to 80 mass %.

The electrically conducting inorganic particle can be used in a dispersion state for the formation of the antistatic layer.
(Surface-Treating Agent)

For the purpose of stabilizing the dispersion in a liquid dispersion or coating solution or enhancing the affinity for or binding property with the binder component, the inorganic particle for use in the present invention may be subjected to a physical surface treatment such as plasma discharge treatment and corona discharge treatment, or a chemical surface treatment with a surfactant, a coupling agent or the like.

The surface treatment may be performed using an inorganic compound or an organic compound as the surface-treating agent. Examples of the inorganic compound for use in the surface treatment include a cobalt-containing inorganic compound (e.g., $CoO_2$, $Co_2O_3$, $Co_3O_4$), an aluminum-containing inorganic compound (e.g., $Al_2O_3$, $Al(OH)_3$), a zirconium-containing inorganic compound (e.g., $ZrO_2$, $Zr(OH)_4$), a silicon-containing inorganic compound (e.g., $SiO_2$) and an iron-containing inorganic compound (e.g., $Fe_2O_3$).

Among these, a cobalt-containing inorganic compound, an aluminum-containing inorganic compound and a zirconium-containing inorganic compound are preferred, and a cobalt-containing inorganic compound, $Al(OH)_3$ and $Zr(OH)_4$ are most preferred.

Examples of the organic compound for use in the surface treatment include a polyol, an alkanolamine, a stearic acid, a silane coupling agent and a titanate coupling agent, with a silane coupling agent being most preferred. In particular, the inorganic particle is preferably surface-treated with at least one species of a silane coupling agent (organosilane compound), a partial hydrolysate thereof, and a condensate thereof.

Examples of the titanate coupling agent include a metal alkoxide such as tetramethoxy titanium, tetraethoxy titanium and tetraisopropoxy titanium, and PRENACT (e.g., KR-TTS, KR46B, KR-55, KR41B, produced by Ajinomoto Co., Inc.).

Preferred examples of the organic compound for use in the surface treatment include a polyol, an alkanolamine and an organic compound having an anionic group. In particular, an organic compound having a carboxyl group, a sulfonic acid group or a phosphoric acid group is preferred. A stearic acid, a lauric acid, an oleic acid, a linoleic acid, a linolenic acid and the like may be preferably used.

The organic compound for use in the surface treatment preferably further has a crosslinking or polymerizable functional group. Examples of the crosslinking or polymerizable functional group include an ethylenically unsaturated group (e.g., (meth)acryloyl, allyl, styryl, vinyloxy) capable of causing an addition reaction/a polymerization reaction by the effect of a radical species; a cationic polymerizable group (e.g., epoxy, oxatanyl, vinyloxy); and a polycondensation reactive group (e.g., hydrolyzable silyl, N-methylol). Among these, a group having an ethylenically unsaturated group is preferred.

Two or more kinds of these surface treatments may be used in combination and it is particularly preferred to use an aluminum-containing inorganic compound and a zirconium-containing inorganic compound in combination.

In the case where the inorganic particle is silica, use of a coupling agent is particularly preferred. As for the coupling agent, an alkoxymetal compound (for example, a titanium coupling agent or a silane coupling agent) is preferably used. A silane coupling agent is particularly preferred.

The coupling agent is used as a surface-treating agent for previously applying a surface treatment to the inorganic filler of the low refractive index layer before the coating solution for the layer is prepared, but the coupling agent is preferably further added as an additive during the preparation of the coating solution for the layer and thereby incorporated into the layer.

In order to reduce the load of surface treatment, the silica fine particle is preferably previously dispersed in a medium before the surface treatment.

In the present invention, as regards the low refractive index particle, high refractive index particle and electrically conducting particle, two or more layers containing such a particle may be simultaneously coated as the upper layer. In view of (C) preventing mixing of two layers, the low refractive index particle is preferably surface-treated. The particle is preferably surface-treated by using a compound containing an alkyl group or a fluorine-containing alkyl group.

As for the surface-treating agent and the catalyst for surface treatment, specific examples of the compound which can be preferably used in the invention include organosilane compounds and catalysts described in WO 2004/017105. In particular, a fluorine-containing silane coupling agent represented by the following formula [1] is preferred.

$$(Rf-L_1)_n-Si(R^{11})_{n-4} \quad \text{Formula [1]}$$

In the formula, Rf represents a linear, branched or cyclic fluorine-containing alkyl group having a carbon number of 1 to 20 or a fluorine-containing aromatic group having a carbon number of 6 to 14. Rf is preferably a linear, branch or cyclic fluoroalkyl group having a carbon number of 3 to 10, more preferably a linear fluoroalkyl group having a carbon number of 4 to 14. Rf may further have a substituent.

$L_1$ represents a divalent linking group having a carbon number of 10 or less, preferably an alkylene group having a carbon number of 1 to 10, more preferably an alkylene group having a carbon number of 1 to 5. The alkylene group is a linear or branched, substituted or unsubstituted alkylene group which may have a linking group (e.g., ether, ester, amide) in the inside thereof. The alkylene group may have a substituent and in this case, preferred examples of the substituent include a halogen atom, a hydroxyl group, a mercapto group, a carboxyl group, an epoxy group, an alkyl group and an aryl group.

$R^{11}$ represents a hydroxyl group or a hydrolyzable group, preferably an alkoxy group having a carbon number of 1 to 5 or a halogen atom, more preferably a methoxy group, an ethoxy group or a chlorine atom.

n represents an integer of 1 to 3.

Specific examples of the fluorine-containing silane coupling agent represented by formula [1] are set forth below, but the present invention is not limited thereto.

| | |
|---|---|
| $C_6F_{13}CH_2CH_2Si(OCH_3)_3$ | A-1 |
| $C_4F_9CH_2CH_2Si(OCH_3)_3$ | A-2 |
| $C_8F_{17}CH_2CH_2Si(OCH_3)_3$ | A-3 |
| $C_6F_{13}CH_2CH_2Si(OC_2H_5)_3$ | A-4 |
| $C_8F_{17}CH_2CH_2Si(OC_2H_5)_3$ | A-5 |
| $C_4F_9CH_2CH_2Si(OC_2H_5)_3$ | A-6 |
| $C_6F_{13}CH_2CH_2SiCl_3$ | A-7 |
| $C_8F_{17}CH_2CH_2SiCl_3$ | A-8 |
| $C_4F_9CH_2CH_2SiCl_3$ | A-9 |
| $C_6F_{13}CH_2CH_2Si(OCH_3)_2CH_3$ | A-10 |
| $C_6F_{13}CH_2CH_2CH_2Si(OCH_3)_3$ | A-11 |
| $C_4F_9CH_2CH_2CH_2Si(OCH_3)_3$ | A-12 |
| $C_8F_{17}CH_2CH_2CH_2Si(OCH_3)_3$ | A-13 |
| $C_6F_{13}CH_2Si(OC_2H_5)_3$ | A-14 |
| $C_8F_{17}CH_2CH_2Si(OC_4H_9)_3$ | A-15 |
| $C_4F_9CH_2CH_2CH_2Si(OCH_3)_3$ | A-16 |
| $C_6F_{13}CH_2CH_2Si(OCH_3)_2Br$ | A-17 |
| $C_8F_{17}CH_2CH_2CH_2Si(OCH_3)_2Cl$ | A-18 |
| $C_4F_9CH_2CH_2Si(CH_3)_2OCH_3$ | A-19 |
| $C_6F_{13}CH_2CH_2Si(OCH_3)Cl_2$ | A-20 |
| $(CF_3)_2CFCF_2CF_2CH_2CH_2Si(OCH_3)_3$ | A-21 |
| $(C_4F_9)_2CFCH_2CH_2Si(OCH_3)_3$ | A-22 |
| $(C_6F_{13})_2CFCH_2CH_2Si(OCH_3)_3$ | A-23 |
| $(CF_3)_3CCF_2CH_2CH_2Si(OCH_3)_3$ | A-24 |
| $(C_4F_9)_3CCH_2CH_2Si(OCH_3)_3$ | A-25 |
| $(CF_3)_2CFOCH_2CH_2CH_2Si(OC_2H_5)_3$ | A-26 |
| $(CF_3)_2CFOCH_2CH_2CH_2SiCl_3$ | A-27 |

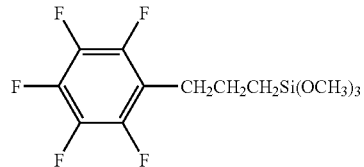

A-28

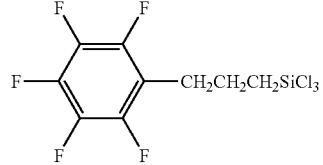

A-29

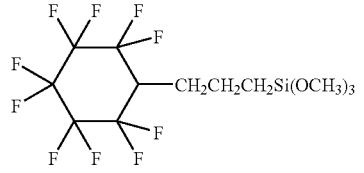

A-30

| | |
|---|---|
| $H(CF_2)_6CH_2Si(OCH_3)_3$ | A-31 |
| $H(CF_2)_4CH_2Si(OCH_3)_3$ | A-32 |
| $H(CF_2)_8CH_2Si(OCH_3)_3$ | A-33 |
| $(CH_3O)_3SiCH_2CH_2(CF_2)_6CH_2CH_2Si(OCH_3)_3$ | A-34 |
| $(CH_3O)_3SiCH_2CH_2(CF_2)_4CH_2CH_2Si(OCH_3)_3$ | A-35 |
| $(CH_3O)_3SiCH_2CH_2(CF_2)_8CH_2CH_2Si(OCH_3)_3$ | A-36 |
| $(C_2H_5O)_3SiCH_2CH_2(CF_2)_6CH_2CH_2Si(OC_2H_5)_3$ | A-37 |
| $(C_2H_5O)_3SiCH_2CH_2(CF_2)_4CH_2CH_2Si(OCH_3)_3$ | A-38 |
| $Cl_3SiCH_2CH_2(CF_2)_6CH_2CH_2SiCl_3$ | A-39 |
| $(CH_3O)_2CH_3SiCH_2CH_2(CF_2)_6CH_2CH_2Si(OCH_3)_2CH_3$ | A-40 |

Among the compounds above, preferred are A-1, A-3, A-31 and A-33. These compounds can be synthesized, for example, by the method described in JP-A-11-189599.

The fluorine-containing silane coupling agent represented by formula [1] is preferably used in an amount of 1 to 100 mass %, more preferably from 2 to 80 mass %, still more preferably from 5 to 50 mass %, based on the inorganic oxide fine particle.

Also, two or more kinds of fluorine-containing silane coupling agents may be used in combination, and the total of the amounts added is preferably from 1 to 100 mass %, more preferably from 2 to 80 mass %, still more preferably from 5 to 50 mass %.

(Dispersant)

For dispersing the particle used in the present invention, various dispersants can be used.

The dispersant preferably further contains a crosslinking or polymerizable functional group. Examples of the crosslinking or polymerizable functional group include an ethylenically unsaturated group (e.g., (meth)acryloyl, allyl, styryl, vinyloxy) capable of causing an addition reaction/a polymerization reaction by the effect of a radical species; a cationic polymerizable group (e.g., epoxy, oxatanyl, vinyloxy); and a polycondensation reactive group (e.g., hydrolyzable silyl, N-methylol). Among these, a functional group having an ethylenically unsaturated group is preferred.

In dispersing the inorganic particle, particularly, the inorganic particle comprising $TiO_2$ as the main component, a dispersant having an anionic group is preferably used. A dispersant having an anionic group and a crosslinking or polymerizable functional group is more preferred, and a dispersant having a crosslinking or polymerizable functional group in the side chain is still more preferred.

As for the anionic group, a group having an acidic proton, such as carboxyl group, sulfonic acid group (sulfo), phosphoric acid group (phosphono) and sulfonamide group, or a salt thereof is effective. In particular, a carboxyl group, a sulfonic acid group, a phosphonic acid group, and a salt thereof are preferred, and a carboxyl group and a phosphoric acid group are more preferred. A plurality of species may be contained in one molecule, and the average number of anionic groups contained per one molecule of the dispersant is preferably 2 or more, more preferably 5 or more, still more preferably 10 or more. Also, plural kinds of anionic groups may be contained in one molecule of the dispersant.

In the dispersant having an anionic group in the side chain, the proportion of the anionic group-containing repeating unit is from $10^{-4}$ to 100 mol %, preferably from 1 to 50 mol %, more from 5 to 20 mol %, based on all repeating units.

The dispersant preferably further contains a crosslinking or polymerizable functional group. Examples of the crosslinking or polymerizable functional group include an ethylenically unsaturated group {e.g., (meth)acryloyl, allyl, styryl, vinyloxy) capable of undergoing a crosslinking reaction/a polymerization reaction by the effect of a radical species; a cationic polymerizable group (e.g., epoxy, oxatanyl, vinyloxy); and a polycondensation reactive group (e.g., hydrolyzable silyl, N-methylol). Among these, a functional group having an ethylenically unsaturated group is preferred.

The average number of crosslinking or polymerizable functional groups contained per molecule of the dispersant is preferably 2 or more, more preferably 5 or more, still more preferably 10 or more. A plurality of kinds of crosslinking or polymerizable functional groups may be contained in one molecule of the dispersant.

As regards the dispersant preferably used in the present invention, examples of the repeating unit having an ethylenically unsaturated group in the side chain include poly-1,2-butadiene and poly-1,2-isoprene structures, and a (meth) acrylic acid ester or amide repeating unit to which a specific residue (R group in —COOR or —CONHR) is connected. Examples of the specific residue (R group) include —$(CH_2)_n$—$CR^{21}$=$CR^{22}R^{23}$, —$(CH_2O)_n$—$CH_2CR^{21}$=$CR^{22}R^{23}$, —$(CH_2CH_nO)_n$—$CH_2CR^{21}$=$CR^{22}R^{23}$, —$(CH_2)_n$—NH—CO—O—$CH_2CR^{21}$=$CR^{22}R^{23}$, —$(CH_2)_n$—O—CO—$CR^{21}$=$CR^{22}R^{23}$ and —$(CH_2CH_2O)_2$—X (wherein $R^{21}$ to $R^{23}$ each represents a hydrogen atom, a halogen atom, an alkyl group having a carbon number of 1 to 20, an aryl group, an alkoxy group or an aryloxy group, $R^{21}$ and $R^{22}$ or $R^{23}$ may combine with each other to form a ring, n represents an integer of 1 to 10, and X is a dicyclopentadienyl residue). Specific examples of R in the ester residue include —$CH_2CH$=$CH_2$ (corresponding to the polymer of allyl (meth)acrylate described in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NHCOO—$CH_2CH$=$CH_2$ and —$CH_2CH_2O$—X (wherein X is a dicyclopentadienyl residue). Specific examples of R in the amide residue include —$CH_2CH$=$CH_2$, —$CH_2CH_2$—Y (wherein Y is a 1-cyclohexenyl residue), —$CH_2CH_2$—OCO—CH=$CH_2$ and —$CH_2CH_2$—OCO—$C(CH_3)$=$CH_2$.

In the dispersant having an ethylenically unsaturated group, a free radical (a polymerization initiating radical or a radical growing during the polymerization process of polymerizable compound) is added to the unsaturated bond group to cause an addition polymerization between molecules directly or through a polymerization chain of polymerizable compound, whereby crosslinking is formed between molecules and curing is effected. Alternatively, an atom (for example, a hydrogen atom on the carbon atom adjacent to the unsaturated bond group) in the molecule is withdrawn by a free radical to produce a polymer radical and the polymer radicals are then bonded to each other, whereby crosslinking is formed between molecules and curing is effected.

The mass average molecular weight (Mw) of the dispersant having an anionic group and a crosslinking or polymerizable functional group and having the crosslinking or polymerizable functional group in the side chain is not particularly limited but is preferably 1,000 or more. The mass average molecular weight (Mw) of the dispersant is more preferably from 2,000 to 1,000,000, still more preferably from 5,000 to 200,000, yet still more preferably from 10,000 to 100,000.

The crosslinking or polymerizable functional group-containing unit may constitute all repeating units except for the anionic group-containing repeating unit, but the proportion thereof is preferably from 5 to 50 mol %, more preferably from 5 to 30 mol %, based on all crosslinked or repeating units.

The dispersant may also be a copolymer with an appropriate monomer other than the monomer having a crosslinking or polymerizable functional group and an anionic group. The copolymerization component is not particularly limited but may be selected from various aspects such as dispersion stability, compatibility with other monomer components and strength of film formed. Preferred examples thereof include methyl(meth)acrylate, n-butyl(meth)acrylate, tert-butyl (meth)acrylate, cyclohexyl(meth)acrylate and styrene.

The form of the dispersant is not particularly limited but is preferably a block copolymer or a random copolymer, more preferably a random copolymer in view of cost and ease of synthesis.

The amount of the dispersant used is preferably from 1 to 50 mass %, more preferably from 5 to 30 mass %, and most preferably from 5 to 20 mass %, based on the inorganic particle. Two or more kinds of dispersants may be used in combination.

(Antifouling Agent)

In the film of the present invention, particularly, in the uppermost layer of the film, an appropriate known silicon-based or fluorine-based antifouling agent, slipping agent or the like is preferably added for the purpose of imparting properties such as antifouling property, water resistance, chemical resistance and slipperiness.

In the case of adding such an additive, the additive is preferably added in an amount of 0.01 to 20 mass %, more preferably from 0.05 to 10 mass %, still more preferably from 0.1 to 5 mass %, based on the entire solid content of the low refractive index layer.

Preferred examples of the silicone-based compound include those containing a plurality of dimethylsilyloxy repeating units and having a substituent at the chain terminal and/or in the side chain. In the chain of the compound containing dimethylsilyloxy repeating units, a structural unit other than dimethylsilyloxy may be contained. A plurality of substituents, which may be the same or different, are preferably present. Preferred examples of the substituent include a group containing an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group. The molecular weight is not particularly limited but is preferably 100,000 or less, more preferably 50,000 or less, still more preferably from 3,000 to 30,000, and most preferably from 10,000 to 20,000. The silicone atom content of the silicone-based compound is not particularly limited but is preferably 18.0 mass % or more, more preferably from 25.0 to 37.8 mass %, and most preferably from 30.0 to 37.0 mass %. Preferred examples of the silicone-based compound include, but are not limited to, X-22-174DX, X-22-2426, X-22-164B, X-22-164C, X-22-170DX, X-22-176D and X-22-1821 (all trade names) produced by Shin-Etsu Chemical Co., Ltd.; FM-0725, FM-7725, FM-4421, FM-5521, FM6621 and FM-1121 produced by Chisso Corporation; and DMS-U22, RMS-033, RMS-083, UMS-182, DMS-H21, DMS-H31, HMS-301, FMS121, FMS123, FMS131, FMS141 and FMS221 (all trade names) produced by Gelest.

The fluorine-based compound is preferably a compound having a fluoroalkyl group. The fluoroalkyl group preferably has a carbon number of 1 to 20, more preferably from 1 to 10, and may be linear (e.g., —CF$_2$CF$_3$, —CH$_2$(CF$_2$)$_4$H, —CH$_2$(CF$_2$)$_8$CF$_3$, —CH$_2$CH$_2$(CF$_2$)$_4$H), may have a branched structure (e.g., CH(CF$_3$)$_2$, CH$_2$CF(CF$_3$)$_2$, CH(CH$_3$)CF$_2$CF$_3$, CH(CH$_3$)(CF$_2$)$_5$CF$_2$H) or an alicyclic structure (preferably a 5- or 6-membered ring, for example, a perfluorocyclohexyl group, a per-fluorocyclopentyl group or an alkyl group substituted by such a group) or may have an ether bond (e.g., CH$_2$OCH$_2$CF$_2$CF$_3$, CH$_2$CH$_2$OCH$_2$C$_4$F$_8$H, CH$_2$CH$_2$OCH$_2$CH$_2$C$_8$F$_{17}$, CH$_2$CH$_2$OCF$_2$CF$_2$OCF$_2$CF$_2$H). A plurality of the fluoroalkyl groups may be contained within the same molecule.

The fluorine-based compound preferably further has a substituent which contributes to the bond formation or compatibility with the low refractive index layer film. A plurality of substituents, which may be the same or different, are preferably present. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group and an amino group. The fluorine-based compound may be a polymer or oligomer with a compound containing no fluorine atom, and the molecular weight is not particularly limited. The fluorine atom content of the fluorine-based compound is not particularly limited but is preferably 20 mass % or more, more preferably from 30 to 70 mass %, and most preferably from 40 to 70 mass %. Preferred examples of the fluorine-based compound include, but are not limited to, R-2020, M-2020, R-3833 and M-3833 (all trade names) produced by Daikin Kogyo Co., Ltd.; and Megafac F-171, F-172, F-179A and DYFENSA MCF-300 (all trade names) produced by Dai-Nippon Ink & Chemicals, Inc.

For the purpose of imparting properties such as dust protection and antistatic property, a known dust inhibitor, antistatic agent or the like, such as cationic surfactant or polyoxyalkylene-based compound, may be appropriately added. A structural unit of such a dust inhibitor or antistatic agent may be contained as a part of the function in the above-described silicone-based compound or fluorine-based compound. In the case of adding such an additive, the additive is preferably added in an amount of 0.01 to 20 mass %, more preferably from 0.05 to 10 mass %, still more preferably from 0.1 to 5 mass %, based on the entire solid content of the low refractive index layer. Preferred examples of the compound include, but are not limited to, Megafac F-150 (trade name) produced by Dai-Nippon Ink & Chemicals, Inc.; and SH-3748 (trade name) produced by Toray Dow Corning.

(Surfactant)

In the film of the present invention, the coating composition for forming the light-diffusing layer preferably contains either one or both of a fluorine-containing surfactant and a silicone-containing surfactant particularly for ensuring the surface uniformity free of coating unevenness, drying unevenness, point defect or the like. Of these, a fluorine-containing surfactant can be preferably used, because the effect of improving surface failures such as coating unevenness, drying unevenness and point defect can be brought out with a smaller amount of the surfactant added. Suitability for high-speed coating is imparted while enhancing the surface uniformity, whereby the productivity can be elevated.

Preferred examples of the fluorine-containing surfactant include a fluoroaliphatic group-containing copolymer (sometimes simply referred to as a "fluorine-based polymer"). The useful fluorine-based polymer is a copolymer of an acrylic or methacrylic resin comprising a repeating unit corresponding to the monomer of (i) below or comprising a repeating unit corresponding to the monomer of (ii) below, and a vinyl-based monomer copolymerizable therewith.

(i) Fluoroaliphatic Group-Containing Monomer Represented by the Following Formula (a)

Formula (a):

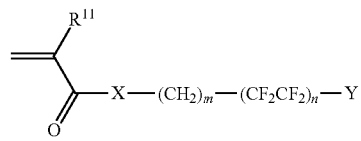

In formula (a), $R^{11}$ represents a hydrogen atom or a methyl group, X represents an oxygen atom, a sulfur atom, or —N($R^{12}$)—, m represents an integer of 1 to 6, and n represents an integer of 2 to 4. $R^{12}$ represents a hydrogen atom or an alkyl group having a carbon number of 1 to 4 and (specifically, a methyl group, an ethyl group, a propyl group or a butyl group), preferably a hydrogen atom or a methyl group. X is preferably an oxygen atom. Y represents a fluorine atom or a hydrogen atom.

(ii) Monomer Represented by the Following Formula (b), which is Copolymerizable with Monomer of (i)

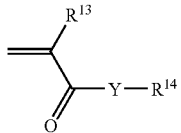

Formula (b):

In formula (b), $R^{13}$ represents a hydrogen atom or a methyl group, and Y represents an oxygen atom, a sulfur atom or —N($R^{15}$)—. $R^{15}$ represents a hydrogen atom or alkyl group having a carbon number of 1 to 4 (specifically, a methyl group, an ethyl group, a propyl group or a butyl group), preferably a hydrogen atom or a methyl group. Y is preferably an oxygen atom, —N(H)— or —N($CH_3$)—.

$R^{14}$ represents a linear, branched or cyclic alkyl group having a carbon number of 4 to 20, which may have a substituent. Examples of the substituent of the alkyl group as $R^{14}$ include, but are not limited to, a hydroxy group, an alkylcarbonyl group, an arylcarbonyl group, a carboxyl group, an alkyl ether group, an aryl ether group, a halogen atom (e.g., fluorine, chlorine, bromine), a nitro group, a cyano group and an amino group. Suitable examples of the linear, branched or cyclic alkyl group having a carbon number of 4 to 20 include a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group and an eicosanyl group, which may be linear or branched, and further include a monocyclic cycloalkyl group such as cyclohexyl group and cycloheptyl group, and a polycyclic cycloalkyl group such as bicycloheptyl group, bicyclodecyl group, tricycloundecyl group, tetracyclododecyl group, adamantyl group, norbornyl group and tetracyclodecyl group.

The amount of the fluoroaliphatic group-containing monomer represented by formula (a) for use in the fluorine-based polymer used in the present invention is 10 mol % or more, preferably from 15 to 70 mol %, more preferably 20 to 60 mol %, based on each monomer of the fluorine-based polymer.

The mass average molecular weight of the fluorine-based polymer for use in the present invention is preferably from 3,000 to 100,000, more preferably from 5,000 to 80,000. Furthermore, the amount added of the fluorine-based polymer for use in the present invention is preferably from 0.001 to 5 mass %, more preferably from 0.005 to 3 mass %, still more preferably from 0.01 to 1 mass %, based on the coating solution. When the amount of the fluorine-based polymer added is within this range, the coating film can have satisfactorily drying property and good performance (e.g., reflectance, scratch resistance) as the coating film.

(Thickening Agent)

In the film of the present invention, a thickening agent may be used for adjusting the viscosity of the coating solution. The thickening agent as used herein means a substance capable of increasing the viscosity of a solution when added. The increment of viscosity of the coating solution, which is brought about by the addition, is preferably from 0.05 to 50 cP, more preferably from 0.10 to 30 cP, and most preferably from 0.10 to 20 cP.

Examples of the thickening agent include, but are not limited to, the followings:
poly-∈-caprolactone,
poly-∈-caprolactone diol,
poly-∈-caprolactone triol,
polyvinyl acetate,
poly(ethylene adipate),
poly(1,4-butylene adipate),
poly(1,4-butylene glutarate),
poly(1,4-butylene succinate),
poly(1,4-butylene terephthalate),
poly(ethylene terephthalate),
poly(2-methyl-1,3-propylene adipate),
poly(2-methyl-1,3-propylene glutarate),
poly(neopentyl glycol adipate),
poly(neopentyl glycol sebacate),
poly(1,3-propylene adipate),
poly(1,3-propylene glutarate),
polyvinylbutyral,
polyvinylformal,
polyvinylacetal,
polyvinylpropanal,
polyvinylhexanal,
polyvinyl pyrrolidone,
polyacrylic acid ester,
polymethacrylic acid ester,
cellulose acetate,
cellulose propionate, and
cellulose acetate butyrate.

Other than these, a known viscosity adjusting agent or thixotropy imparting agent, such as smectite, fluorotetrasilicon mica, bentonite, silica, montmorillonite and sodium polyacrylate described in JP-A-8-325491, and ethyl cellulose, polyacrylic acid and organic clay describe in JP-A-10-219136, may be used.

(Coating Solvent)

As for the solvent used in the coating composition for forming each layer of the present invention, various solvents selected from the standpoint, for example, that the solvent can dissolve or disperse each component, readily provides a uniform surface state in the coating step and drying step, can ensure liquid storability or has an appropriate saturated vapor pressure, may be used.

Two or more kinds of solvents may be used as a mixture. In view of the drying load, it is preferred to contain a solvent having a boiling point of 100° C. or less at room temperature under atmospheric pressure as the main component and contain a small amount of a solvent having a boiling point of 100° C. or more for adjusting the drying speed.

Examples of the solvent having a boiling point of 100° C. or less include hydrocarbons such as hexane (boiling point: 68.7° C.), heptane (98.4° C.), cyclohexane (80.7° C.) and benzene (80.1° C.); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.) and tetrahydrofuran (66° C.); esters such as ethyl formate (54.2° C.), methyl acetate (57.8° C.), ethyl acetate (77.1° C.) and isopropyl acetate (89° C.); ketones such as acetone (56.1° C.) and 2-butanone (same as methyl ethyl ketone, 79.6° C.); alcohols such as methanol (64.5° C.), ethanol (78.3° C.), 2-propanol (82.4° C.) and I-propanol (97.2° C.); cyano compounds such as acetonitrile (81.6° C.) and propionitrile (97.4° C.); and carbon disulfide (46.2° C.). Among these, ketones and esters are preferred, and ketones are more preferred. Out of ketones, 2-butanone is preferred.

Examples of the solvent having a boiling point of 100° C. or more include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as MIBK, 115.9° C.), 1-butanol (117.7° C.), N,N-dimethylformamide (153° C.), N,N-dimethylacetamide (166° C.) and dimethyl sulfoxide (189° C.). Among these, cyclohexanone and 2-methyl-4-pentanone are preferred.

(Others)

In the film of the present invention, a resin, a coupling agent, a coloration inhibitor, a coloring agent (e.g., pigment, dye), a defoaming agent, a leveling agent, a flame retardant, an ultraviolet absorbent, an infrared absorbent, an adhesion-imparting agent, a polymerization inhibitor, an antioxidant, a surface modifier and the like may be added in addition to the components described above.

(Support)

The support of the film of the present invention is not particularly limited and may be a transparent resin film, a transparent resin plate, a transparent resin sheet or a transparent glass. Examples of the transparent resin film which can be used include a cellulose acylate film (e.g., cellulose triacetate film (refractive index: 1.48), cellulose diacetate film, cellulose acetate butyrate film, cellulose acetate propionate film), a polyethylene terephthalate film, a polyethersulfone film, polyacrylic resin film, a polyurethane-based resin film, a polyester film, a polycarbonate film, a polysulfone film, a polyether film, a polymethylpentene film, a polyether ketone film and a (meth)acrylonitrile film.

The thickness of the support is usually on the order of 25 to 1,000 µm, preferably from 25 to 250 µm, more preferably from 30 to 90 µm.

The support may have an arbitrary width but in view of handling, yield ratio and productivity, the width is usually from 100 to 5,000 mm, preferably from 800 to 3,000 mm, more preferably from 1,000 to 2,000 mm.

The support surface is preferably smooth, and the average roughness Ra value is preferably 1 µm or less, more preferably from 0.0001 to 0.5 µm, still more preferably from 0.001 to 0.1 µm.

(Cellulose Acylate Film)

Among those various films, a cellulose acylate film assured of high transparency, less optical birefringence and easy production and generally used as a protective film of polarizing plate is preferred.

As for the cellulose acylate film, various techniques for improving mechanical property, transparency, flatness and the like are known, and the technique described in J111 Journal of Technical Disclosure, No. 2001-1745 can be used in the present invention as a known art.

In the present invention, among cellulose acylate films, a cellulose triacetate film is preferred, and a cellulose acetate having an acetylation degree of 59.0 to 61.5% is preferably used for the cellulose acylate film. The acetylation degree means the amount of acetic acid bonded per unit mass of cellulose. The acetylation degree is determined according to the measurement and calculation of acetylation degree in ASTM:D-817-91 (Test Method of Cellulose Acetate, etc.).

The viscosity average polymerization degree (DP) of the cellulose acylate is preferably 250 or more, more preferably 290 or more.

Also, in the cellulose acylate for use in the present invention, the Mw/Mn (Mw is the mass average molecular weight and Mn is the number average molecular weight) value by gel permeation chromatography is preferably close to 1.0, in other words, the molecular weight distribution is preferably narrow. Specifically, the Mw/Mn value is preferably from 1.0 to 1.7, more preferably from 1.3 to 1.65, and most preferably from 1.4 to 1.6.

In general, the hydroxyl groups at the 2-, 3- and 6-positions of the cellulose acylate are not equally 1/3 distributed, but the substitution degree of 6-position hydroxyl group tends to be small. In the present invention, the substitution degree of 6-position hydroxyl group of the cellulose acylate is preferably larger as compared with the 2- or 3-position.

The hydroxyl group at the 6-position is preferably substituted by an acyl group in a proportion of 32% or more, more preferably 33% or more, still more preferably 34% or more, based on the entire substitution degree. Furthermore, the substitution degree for the 6-position acyl group of cellulose acylate is preferably 0.88 or more. The 6-position hydroxyl group may be substituted, in addition to the acetyl group, by an acyl group having a carbon number of 3 or more, such as propionyl group, butyroyl group, valeroyl group, benzoyl group or acryloyl group. The substitution degree at each position can be measured by NMR.

As for the cellulose acylate used in the present invention, cellulose acetates synthesized by the methods disclosed in JP-A-11-5851, "Example" and "Synthesis Example 1" of paragraphs [0043] and [0044], "Synthesis Example 2" of paragraphs [0048] and [0049], and "Synthesis Example 3" of paragraphs [0051] and [0052], can be used.

(Polyethylene Terephthalate Film)

In the present invention, a polyethylene terephthalate film may also be preferably used, because this is excellent in all of transparency, mechanical strength, flatness, chemical resistance and moisture resistance and moreover, is inexpensive.

The transparent plastic film is more preferably subjected to an easy adhesion treatment so as to further enhance the adhesion strength between the transparent plastic film and the hardcoat layer provided thereon.

Examples of the commercially available optical PET film with an easy adhesion layer include COSMOSHINE A4100 and A4300 produced by Toyobo Co., Ltd.

2. Layers Constituting Film

The film of the present invention is obtained by mixing various compounds described above and coating the solution, and the layers constituting the film of the present invention are described below.

2-(1) Hardcoat Layer

In the case where the laminate of the present invention is a film, a hardcoat layer is preferably provided on one surface of the transparent support of the film so as to impart physical strength to the film. A low refractive index layer is preferably provided thereon, and a medium refractive layer and a high refractive layer are more preferably provided between the hardcoat layer and the low refractive index layer, whereby an antireflection layer is constituted. The hardcoat layer may be composed of a stack of two or more layers.

In the present invention, in view of optical design for obtaining an antireflection film, the refractive index of the hardcoat layer is preferably from 1.48 to 2.00, more preferably from 1.5 to 1.90, still more preferably from 1.5 to 1.6. In the present invention, at least one low refractive index is present on the hardcoat layer and therefore, if the refractive index is too smaller than the above-described range, the antireflection property may decrease, whereas if it is excessively large, the color tint of reflected light tends to be intensified.

From the standpoint of imparting satisfactory durability and impact resistance to the film, the thickness of the hardcoat layer is usually on the order of 0.5 to 50 µm, preferably from 1 to 30 µm, more preferably from 2 to 20 µm.

The hardness of the hardcoat layer is preferably H or more, more preferably 2H or more, and most preferably 3H or more, in the pencil hardness test.

Furthermore, in the Taber test according to JIS K5400, the abrasion loss of the specimen between before and after test is preferably smaller.

The hardcoat layer is preferably formed through a crosslinking or polymerization reaction of a radical polymerizable compound. For example, a coating composition containing an ionizing radiation-curable polyfunctional monomer or oligomer is coated on a transparent support, and a crosslinking or polymerization reaction of the polyfunctional monomer or oligomer is brought about, whereby the hardcoat layer can be formed.

The functional group in the ionizing radiation-curable polyfunctional monomer or oligomer is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred.

In the binder of the hardcoat layer, either one or both of a high refractive index monomer and an inorganic particle may be added for the purpose of controlling the refractive index of the hardcoat layer. The inorganic particle has an effect of suppressing the curing shrinkage due to crosslinking reaction, in addition to the effect of controlling the refractive index. In the present invention, the term "binder" is used including the polymer produced by the polymerization of the polyfunctional monomer and/or high refractive index monomer or the like after the formation of the hardcoat layer and the inorganic particle dispersed therein.

The haze of the hardcoat layer varies depending on the function imparted to the antireflection film.

In the case of maintaining the clearness of image, suppressing the surface reflectance and not imparting a function of scattering light in the inside and on the surface of the hardcoat layer, the haze value is preferably lower and specifically, the haze value is preferably 10% or less, more preferably 5% or less, and most preferably 2% or less.

On the other hand, in the case of imparting an antiglare function utilizing surface scattering of the hardcoat layer in addition to the function of suppressing the surface reflectance, the surface haze is preferably from 0.5 to 15%, more preferably from 1 to 7%.

Also, in the case of imparting a function of making less perceivable the liquid crystal panel pattern, color unevenness, brightness unevenness or glaring by the effect of internal scattering of the hardcoat layer or a function of enlarging the viewing angle by the effect of scattering, the internal haze value (a value obtained by subtracting the surface haze value from the entire haze value) is preferably from 1 to 90%, more preferably form 2 to 50%, and most preferably from 3 to 30%.

In the film of the present invention, the surface haze and internal haze may be freely set according to the purpose.

As for the surface irregularity shape of the hardcoat layer, out of properties indicating the surface roughness, for example, the centerline average roughness (Ra) is preferably set to 0.10 μm or less so as to maintain the clearness of image and obtain a clear surface. Ra is more preferably 0.09 μm or less, still more preferably 0.08 μm. In the film of the present invention, the surface irregularities of the film are mainly governed by the surface irregularities of the hardcoat layer and by adjusting the centerline average roughness of the hardcoat layer, the antireflection film can be made to have a centerline average roughness within the above-described range.

For the purpose of maintaining the clearness of image, the transmitted image clarity is preferably adjusted in addition to the adjustment of surface irregularity shape. The transmitted image clarity of a clear antireflection film is preferably 60% or more. The transmitted image clarity is generally an index showing the degree of blurring of image transmitted through and reflected on the film and as this value is larger, the image viewed through the film is clearer and better. The transmitted image clarity is preferably 70% or more, more preferably 80% or more.

2-(2) Antiglare Layer

The antiglare layer is formed for the purpose of giving the film an antiglare property by surface scattering and a hardcoat property for enhancing scratch resistance of the film.

Known examples of the method for forming an antiglare layer include a formation method of laminating a mat shaped film having fine irregularities on the surface described in JP-A-6-16851; a formation method of varying the irradiation dose of ionizing radiation and thereby bringing out curing shrinkage of an ionizing radiation-curable resin described in JP-A-2000-206317; a formation method of causing decrease in the ratio by mass of good solvent to light-transparent resin during drying and thereby gelling and solidifying a light-transparent fine particle and a light-transparent resin to form irregularities on the coating film surface described in JP-A-2000-338310; and a method of imparting surface irregularities by applying an external pressure described in JP-A-2000-275404. These known methods can be utilized.

The antiglare layer which can be used in the present invention preferably a layer containing, as essential components, a binder capable of imparting hardcoat property, a light-transparent particle for imparting antiglare property, and a solvent, in which surface irregularities are formed by protrusion of the light-transparent particle itself or protrusion formed by an aggregate of a plurality of particles.

The antiglare layer formed by the dispersion of mat particles comprises a binder and a light-transparent particle dispersed in the binder. The antiglare layer having antiglare property preferably has both antiglare property and hardcoat property.

Specific preferred examples of the mat particle include an inorganic compound particle such as silica particle and $TiO_2$ particle; and a resin particle such as acryl particle, crosslinked acryl particle, polystyrene particle, crosslinked styrene particle, melamine resin particle and benzoguanamine resin particle. Among these, a crosslinked styrene particle, a crosslinked acryl particle and a silica particle are more preferred.

The shape of the mat particle may be either spherical or amorphous.

Also, two or more kinds of mat particles differing in the particle diameter may be used in combination. The mat particle having a larger particle diameter can impart antiglare property and the mat particle having a smaller particle diameter can impart another optical property. For example, when an antiglare antireflection film is laminated on a high definition display of 133 ppi or more, a trouble in view of display image grade, called "glaring", is sometimes generated. The "glaring" is ascribable to loss of brightness uniformity resulting from enlargement or shrinkage of a pixel due to irregularities present on the antiglare antireflection film surface, but this can be greatly improved by using together a mat particle having a particle diameter smaller than that of the antiglare property-imparting mat particle and having a refractive index differing from that of the binder.

2-(3) High Refractive Index Layer, Medium Refractive Index Layer

In the film of the present invention, a high refractive index layer and a medium refractive index layer may be provided to enhance the antireflection property.

In the following, these high refractive index layer and medium refractive index layer are sometimes collectively referred to as a high refractive index layer. Incidentally, in the present invention, the terms "high", "medium" and "low" in the high refractive index layer, medium refractive index layer and low refractive index indicate the relative size of refractive index among layers. In terms of relationship with the transparent support, the refractive index preferably satisfies the relationships of transparent support>low refractive index layer, and high refractive index layer>transparent support.

In the present invention, the high refractive layer, medium refractive layer and low refractive index layer are sometimes collectively referred to as an antireflection layer.

For producing an antireflection film by forming a low refractive index layer on a high refractive index layer, the refractive index of the high refractive index layer is preferably from 1.55 to 2.40, more preferably from 1.60 to 2.20, still more preferably from 1.65 to 2.10, and most preferably from 1.80 to 2.00.

In the case of producing an antireflection film by providing a medium refractive index layer, a high refractive index layer and a low refractive index layer in this order from the support side, the refractive index of the high refractive index layer is preferably from 1.65 to 2.40, more preferably from 1.70 to 2.20. The refractive index of the medium refractive index layer is adjusted to a value between the refractive index of the low refractive index layer and the refractive index of the high refractive index layer. The refractive index of the medium refractive index layer is preferably from 1.55 to 1.80.

The inorganic particle comprising $TiO_2$ as the main component for use in the high refractive index layer and medium refractive index layer is used in a dispersion state for the formation of the high refractive index layer and medium refractive index layer.

In dispersing the inorganic particle, the inorganic particle is dispersed in a dispersion medium in the presence of a dispersant.

The high refractive index layer and the medium refractive index layer for use in the present invention each is preferably formed as follows. A coating composition for the formation of the high or medium refractive index layer is prepared by dispersing the inorganic particle in a dispersion medium and preferably further adding a binder precursor (for example, an ionizing radiation-curable polyfunctional monomer or oligomer described later) necessary for the matrix formation, a photopolymerization initiator and the like to the resulting liquid dispersion, and the obtained coating composition for the formation of the high or medium refractive index layer is coated on a transparent support and cured through a crosslinking or polymerization reaction of the radical polymerizable compound (for example, a polyfunctional monomer or oligomer).

Simultaneously with or after the coating of the high or medium refractive index layer, the binder of the layer is preferably crosslinked or polymerized with the dispersant.

The binder of the thus-produced high or medium refractive index layer takes a form such that the anionic group of the dispersant is taken into the binder as a result of crosslinking or polymerization reaction between the above-described preferred dispersant and the ionizing radiation-curable polyfunctional monomer or oligomer. The anionic group taken into the binder of the high or medium refractive index layer has a function of maintaining the dispersed state of the inorganic fine particle, and the crosslinked or polymerized structure imparts a film-forming ability to the binder, whereby the high or medium refractive index layer containing the inorganic fine particle is improved in the physical strength, chemical resistance and weather resistance.

The binder of the high refractive index layer is added in an amount of 5 to 80 mass % based on the solid content of the coating composition for the layer.

The content of the inorganic particle in the high refractive index layer is preferably from 10 to 90 mass %, more preferably from 15 to 80 mass %, still more preferably from 15 to 75 mass %, based on the mass of the high refractive index layer. Two or more kinds of inorganic particles may be used in combination in the high refractive index layer.

In the case of having a low refractive index layer on the high refractive index layer, the refractive index of the high refractive index layer is preferably higher than the refractive index of the transparent support.

In the high refractive index layer, a binder obtained by a crosslinking or polymerization reaction of an aromatic ring-containing radical polymerizable compound, a radical polymerizable compound containing a halogen element (e.g., Br, I, Cl) except for fluorine, a radical polymerizable compound containing an atom such as S, N and P, or the like may also be preferably used.

The film thickness of the high refractive index layer may be appropriately designed according to the usage. In the case of using the high refractive index layer as an optical interference layer described later, the film thickness is preferably from 30 to 200 nm, more preferably from 50 to 170 nm, still more preferably from 60 to 150 nm.

In the case of not containing a particle imparting an anti-glare function, the haze of the high refractive index layer is preferably lower. The haze is preferably 5% or less, more preferably 3% or less, still more preferably 1% or less. The high refractive index layer is preferably formed on the transparent layer directly or through another layer.

2-(4) Low Refractive Index Layer

A low refractive index layer is sometimes used for reducing the reflectance of the film of the present invention. The refractive index of the low refractive index layer is preferably from 1.20 to 1.46, more preferably from 1.25 to 1.46, still more preferably from 1.30 to 1.46.

The thickness of the low refractive index layer is preferably from 50 to 200 nm, more preferably from 70 to 100 nm. The haze of the low refractive index layer is preferably 3% or less, more preferably 2% or less, and most preferably 1% or less. The strength of the low refractive index layer is specifically, in the pencil hardness test with a load of 500 g, preferably H or more, more preferably 2H or more, and most preferably 3H or more.

In order to improve the antifouling performance of the optical film, the contact angle with water of the surface is preferably 90° or more, more preferably 95° or more, still more preferably 100° or more.

The curable composition for forming the low refractive index layer preferably comprises (A) the fluorine-containing polymer, (B) the inorganic particle and (C) the organosilane compound, which are described above.

In the low refractive index layer, a binder is used for dispersing and immobilizing the fine particle of the present invention. As for the binder, the binder described above for the hardcoat layer may be used, but a fluorine-containing polymer or fluorine-containing sol/gel material ensuring the low refractive index of the binder itself is preferably used. The fluorine-containing polymer or fluorine-containing sol/gel material is crosslinked by the effect of heat or ionizing radiation. A material allowing for formation of a low refractive index layer with the surface having a dynamic friction coefficient of 0.03 to 0.30 and a contact angle with water of 85 to 1200 is preferred.

2-(5) Antistatic Layer, Electrically Conducting Layer

In the present invention, an antistatic layer is preferably provided for preventing electrostatic charging on the film surface. Examples of the method for forming an antistatic layer include conventionally known methods such as a method of coating an electrically conducting coating solution containing an electrically conducting fine particle and a reactive curable resin, and a method of vapor-depositing or sputtering a transparent film-forming metal or metal oxide or the like to form an electrically conducting thin film. The antistatic layer may be formed on the support directly or through a primer layer ensuring firm adhesion to the support. Also, the antistatic layer may be used as a part of the antireflection film. In this case, when used as a layer closer to the outermost surface layer, a sufficiently high antistatic property can be obtained even with a small film thickness.

The thickness of the antistatic layer is preferably from 0.01 to 10 μm, more preferably from 0.03 to 7 μm, still more preferably from 0.05 to 5 μm. The surface resistance of the antistatic layer is preferably from $10^5$ to $10^{12}$ Ω/sq, more preferably from $10^5$ to $10^9$ Ω/sq, and most preferably from $10^5$ to $10^8$ Ω/sq. The surface resistance of the antistatic layer may be measured by the four-probe method.

The antistatic layer is preferably transparent in substance. Specifically, the haze of the antistatic layer is preferably 10% or less, more preferably 5% or less, still more preferably 3% or less, and most preferably 1% or less. The transmittance for light at a wavelength of 550 nm is preferably 50% or more, more preferably 60% or more, still more preferably 65% or more, and most preferably 70% or more.

The antistatic layer of the present invention has excellent strength. Specifically, the strength of the antistatic layer is, in terms of the pencil hardness with a load of 1 kg, preferably H or more, more preferably 2H or more, still more preferably 3H or more, and most preferably 4H or more.

2-(6) Antifouling Layer

An antifouling layer may be provided on the outermost surface layer of the film of the present invention. The antifouling layer decreases the surface energy of the antireflection layer and hardly allows for hydrophilic or lipophilic contamination.

The antifouling layer may be formed using a fluorine-containing polymer or an antifouling agent.

The thickness of the antifouling layer is preferably from 2 to 100 nm, more preferably from 5 to 30 nm.

2-(7) Interference Unevenness (Rainbow Unevenness)—Preventing Layer

In the case where a substantial difference in the refractive index (the difference of refractive index is 0.03 or more) is present between the transparent support and the hardcoat layer or between the transparent support and the antiglare layer, reflected light is generated on the transparent support/hardcoat layer interface or the transparent support/antiglare layer interface. This reflected light interferes with reflected light on the antireflection layer surface and sometimes brings about interference unevenness due to fine thickness unevenness of the hardcoat layer (or antiglare layer). In order to prevent such interference unevenness, for example, an interference unevenness-preventing layer having a medium refractive index $n_P$ and having a film thickness $d_P$ satisfying the following formula may be provided between the transparent support and the hardcoat layer (or antiglare layer).

$$d_P = (2N-1) \times \lambda/(4n_P)$$

wherein λ is the wavelength of visible light and is a value in the range from 450 to 650 nm, and N is a natural number.

In the case of laminating an antireflection film on an image display or the like, a pressure-sensitive adhesive layer (or an adhesive layer) is sometimes stacked on the transparent support on the side where the antireflection layer is not stacked. In such an embodiment, when a substantial difference in the refractive index (0.03 or more) is present between the transparent support and the pressure-sensitive adhesive layer (or adhesive layer), reflected light is generated on the transparent support/pressure-sensitive adhesive layer (or adhesive layer) interface, and this reflected light interferes with reflected light on the antireflection layer surface and sometimes brings about interference unevenness similarly due to thickness unevenness of the support or hardcoat layer. For the purpose of preventing such interference unevenness, the same interference unevenness-preventing layer as above may be provided on the transparent support on the side where the antireflection layer is not stacked.

Such an interference unevenness-preventing layer is described in detail in JP-A-2004-345333, and the interference unevenness-preventing layer described in this publication may also be used in the present invention.

2-(8) Easy Adhesion Layer

In the film of the present invention, an easy adhesion layer may also be provided by coating. The easy adhesion layer is a layer imparting a function of enabling easy adhesion between the protective film for polarizing plate and a layer adjacent thereto or between the hardcoat layer and the support.

Examples of the easy adhesion treatment include a treatment of providing an easy adhesion layer on a transparent plastic film by using an easy adhesive comprising a polyester, an acrylic acid ester, a polyurethane, a polyethyleneimine, a silane coupling agent or the like.

Examples of the easy adhesion layer preferably used in the present invention include a layer containing a polymer compound having a —COOM (M represents a hydrogen atom or a cation) group. In a more preferred embodiment, a layer containing a polymer compound having a —COOM group is provided on the film substrate side, and a layer mainly comprising a hydrophilic polymer compound is provided on the polarizing film side to come adjacent thereto. Examples of the polymer compound having a —COOM group include a styrene-maleic acid copolymer having a —COOM group, a vinyl acetate-maleic acid copolymer having a —COOM group, and a vinyl acetate-maleic acid-maleic acid anhydride copolymer. In particular, a vinyl acetate-maleic acid copolymer having a —COOM group is preferred. One of these polymer compounds may be used alone, or two or more species thereof may be used in combination. The mass average molecular weight is preferably on the order of 500 to 500,000. Particularly preferred examples of the polymer compound having a —COOM group include those described in JP-A-6-094915 and JP-A-7-333436.

Preferred examples of the hydrophilic polymer compound include a hydrophilic cellulose derivative (e.g., methyl cellulose, carboxymethyl cellulose, hydroxy cellulose), a polyvinyl alcohol derivative (e.g., polyvinyl alcohol, vinyl acetate-vinyl alcohol copolymer, polyvinyl acetal, polyvinyl formal, polyvinyl benzal), a natural polymer compound (e.g., gelatin, casein, gum arabic), a hydrophilic polyester derivative (e.g., partially sulfonated polyethylene terephthalate), and a hydrophilic polyvinyl derivative (e.g., poly-N-vinylpyrrolidone, polyacrylamide, polyvinyl indazole, polyvinyl pyrazole). One of these may be used alone, or two or more species thereof may be used in combination.

The thickness of the easy adhesion layer is preferably from 0.05 to 1.0 μm. When the thickness is 0.05 μm or more, satisfactory adhesive property is obtained. Incidentally, even if the thickness exceeds 1.0 μm, the adhesive effect is saturated.

2-(9) Anti-Curl Layer

The film of the present invention may be subjected to anti-curl processing. The anti-curl processing is processing of imparting a function of tending to curl up with the anti-curl processed surface being inside. By virtue of this processing, when some surface fabrication is applied to one surface of the transparent resin film and surface fabrication of different degree and type is applied to both surfaces, the fabricated surface can be prevented from curling with the surface being inside.

The embodiment of the anti-curl layer includes an embodiment where the anti-curl layer is provided on the side opposite the side having an anti-glare layer or antireflection layer, and an embodiment where, for example, an easy adhesion layer is provided on one surface of the transparent resin film and the anti-curl layer is provided on the opposite surface.

Specific examples of the method for the anti-curl processing include solvent coating and coating of a solvent and a transparent resin layer such as cellulose triacetate, cellulose diacetate and cellulose acetate propionate. The solvent coating is specifically performed by coating a composition containing a solvent that dissolves or swells the cellulose acylate film used as a protective film for polarizing plate. Accordingly, the coating solution for the layer having the anti-curl function preferably contains a ketone- or ester-based organic solvent. Preferred examples of the ketone-based organic solvent include acetone, methyl ethyl ketone, methyl isobutyl ketone, cyclohexanone, ethyl lactate, acetyl acetone, diacetone alcohol, isophorone, ethyl-n-butyl ketone, diisopropyl ketone, diethyl ketone, di-n-propyl ketone, methyl cyclohexanone, methyl-n-butyl ketone, methyl-n-propyl ketone, methyl-n-hexyl ketone and methyl-n-heptyl ketone. Preferred examples of the ester-based organic solvent include methyl acetate, ethyl acetate, butyl acetate, methyl lactate and ethyl lactate. However, the solvent used sometimes further contains a solvent incapable of dissolving the film in addition to a mixture of a solvent capable of dissolving the film and/or a solvent capable of swelling the film. In performing the coating, a composition and a coating amount prepared and determined by mixing these solvents at an appropriate ratio according to the curl degree of the transparent resin film and the kind of the resin are used. Other than these, even when transparent hard processing or anti-static processing is applied, the anti-curl function can be brought out.

2-(10) Water-Absorbing Layer

In the film of the present invention a water absorbent can be used. The water absorbent can be selected from compounds having a water-absorbing function, mainly from alkaline earth metals. Examples thereof include BaO, SrO, CaO and MgO. Furthermore, the water absorbent may also be selected from metal elements such as Ti, Mg, Ba and Ca. The particle size of the water absorbent used is preferably 100 nm or less, more preferably 50 nm or less.

The layer containing such a water absorbent may be formed by vacuum vapor deposition or the like similarly to the barrier layer above, or a nanoparticle formed by various methods may be used. The thickness of the layer is preferably from 1 to 100 nm, more preferably from 1 to 10 nm. The layer containing a water absorbent may be added between the support and the laminate (a laminate of barrier layer and organic layer), as the uppermost layer of the laminate, between laminates, or in the organic layer or barrier layer of the laminate. In the case of addition to the barrier layer, a vapor co-deposition method is preferably used.

2-(11) Primer Layer/Inorganic Thin Film Layer

In the film of the present invention, the gas barrier property can be enhanced by disposing a known primer layer or inorganic thin film layer between the support and the laminate.

As for the primer layer, for example, an acrylic resin, an epoxy resin, a urethane resins or a silicone resin may be used, but in the present invention, the primer layer is preferably an organic-inorganic hybrid layer and the inorganic thin film layer is preferably an inorganic vapor-deposited layer or a dense inorganic coating thin film formed by a sol-gel method. As for the inorganic vapor-deposited layer, a vapor-deposited layer of silica, zirconia, alumina or the like is preferred. The inorganic vapor-deposited layer can be formed, for example, by a vacuum vapor deposition method or a sputtering method.

3. Layer Construction of Film

Figure 2:
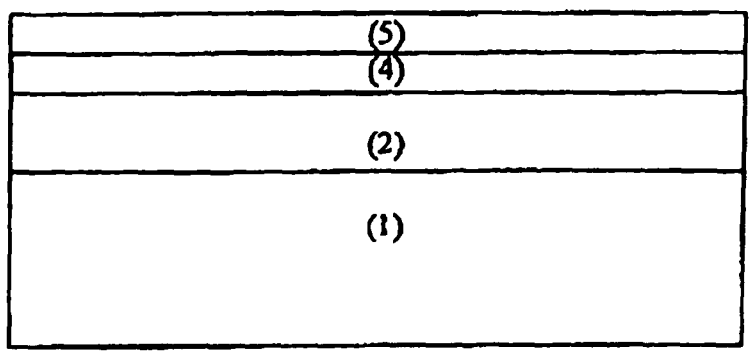
FIG. 2 illustrates a cross-sectional view schematically showing a representative layer construction of the laminate (antireflection film) of the present invention.
Figure 3:
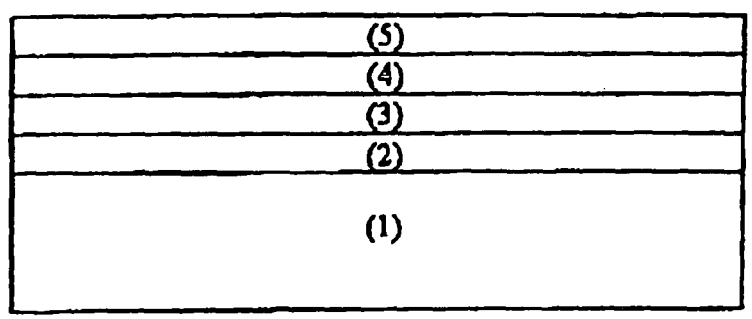
FIG. 3 illustrates a cross-sectional view schematically showing a representative layer construction of the laminate (antireflection film) of the present invention.

In the film of the present invention, the following known layer constructions can be employed by using the above-described layers. Representative examples of the layer construction include:

b. support/hardcoat layer/low refractive index layer (FIG. 1), c. support/hardcoat layer/high refractive index layer/low refractive index layer (FIG. 2), and d. support/hardcoat layer/medium refractive index layer/high refractive index layer/low refractive index layer (FIG. 3).

A film where as in b (FIG. 1), a hardcoat layer (2) is coated on a support (1) and a low refractive index layer (5) is stacked thereon can be suitably used as the antireflection film. When the low refractive index layer (5) is formed on the hardcoat layer (2) to a thickness of around ¼ of the light wavelength, the low refractive index layer (5) can reduce the surface reflection by the principle of thin-film interference.

Furthermore, a film where as in c (FIG. 2), a hardcoat layer (2) is coated on a support (1) and a high refractive index layer (4) and a low refractive index layer (5) are stacked thereof can also be suitably used as the antireflection film. In addition, when as in d (FIG. 3), a layer construction is established in the order of a support (1), a hardcoat layer (2), a medium refractive index layer (3), a high refractive index layer (4) and a low refractive index layer (5), the reflectance can be made to be 1% or less.

Figure 4:
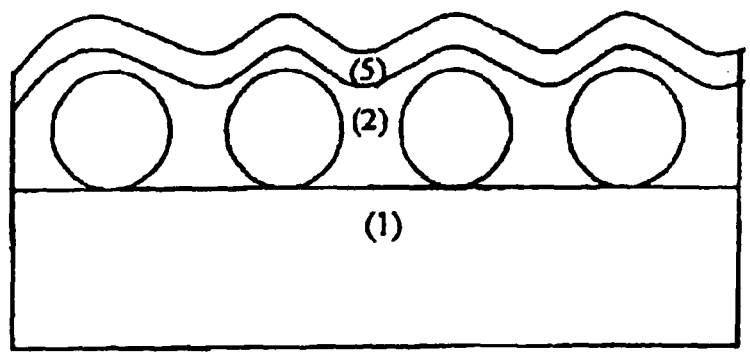
FIG. 4 illustrates a cross-sectional view schematically showing a representative layer construction of the laminate (antireflection film) of the present invention.
Figure 5:
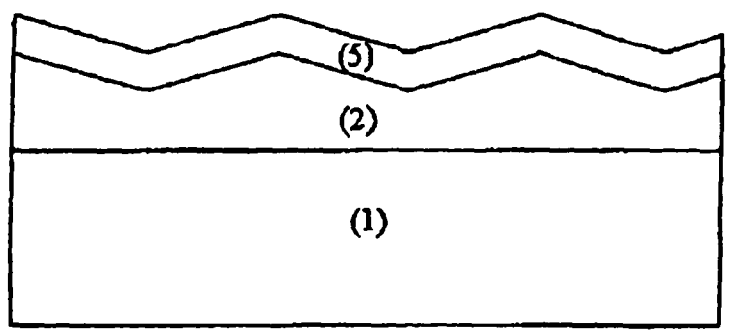
FIG. 5 illustrates a cross-sectional view schematically showing a representative layer construction of the laminate (antireflection film) of the present invention.

In the constructions of b to d, the hardcoat layer (2) may be an antiglare layer having antiglare property. The antiglare property may be obtained by the dispersion of a mat particle (6) as shown in FIG. 4 or by the surface shaping such as embossing as shown in FIG. 5. The antiglare layer formed by the dispersion of a mat particle (6) comprises a binder and a light-transparent particle dispersed in the binder. The antiglare layer having antiglare property preferably has both antiglare property and hardcoat property and may be composed of a plurality of layers, for example, from two to four layers.

Examples of the layer which may be provided between the transparent support and a layer closer to the surface side than that or on the outermost surface include an interference unevenness (rainbow unevenness)-preventing layer, an anti-static layer (when, for example, reduction in the surface resistivity from the display side is required or attachment of dust to the surface or the like becomes a problem), another hardcoat layer (when hardness is insufficient only by one hardcoat layer or antiglare layer), a gas barrier layer, a water-absorbing layer (moisture-proofing layer), an adhesion-improving layer and an antifouling layer). The refractive indexes of the layers constituting the antiglare antireflection film having an antireflection layer of the present invention preferably satisfy the following relationship:

refractive index of hardcoat layer>refractive index of transparent support>refractive index of low refractive index layer.

As described above, in the use as an antireflection film, respective layers are preferably differing in the refractive index. The difference of refractive index between a certain layer and a layer adjacent thereto of the laminate is preferably 0.01 or more, more preferably 0.03 or more, and most preferably 0.05 or more.

4. Production Method

The film of the present invention may be formed by the following method, but the present invention is not limited thereto.

4-(1) Preparation of Coating Solution

<Preparation>

A coating solution containing components for forming each layer is prepared. At this time, the percentage of water content in the coating solution can be prevented from increasing by minimizing the volatilization volume of the solvent. The percentage of water content in the coating solution is preferably 5% or less, more preferably 2% or less. The volatilization volume of the solvent can be suppressed, for example, by enhancing the closeness at the stirring of materials charged into a tank or minimizing the contact area of the coating solution with air at the liquid transfer operation. Also, means for reducing the percentage of water content in the coating solution may be provided during, before or after the coating.

<Filtration>

The coating solution used for coating is preferably filtered before coating. The filtration is preferably preformed by using a filter having a pore size as small as possible within the range of not allowing for elimination of the components in the coating solution. In the filtration, a filter having an absolute filtration accuracy of 0.1 to 50 µm is used. A filter having an absolute filtration accuracy of 0.1 to 40 µm is more preferably. The filter thickness is preferably from 0.1 to 10 mm, more preferably from 0.2 to 2 mm. In this case, the filtration is preferably performed under a filtration pressure of 1.5 MPa or less, more preferably 1.0 MPa or less, still more preferably 0.2 MPa or less.

The filter member of filtration is not particularly limited as long as it does not affect the coating solution. Specific examples thereof are the same as those of the filtration member described above for the wet dispersion of an inorganic compound.

It is also preferred to ultrasonically disperse the filtered coating solution immediately before coating and assist in defoaming or keeping the dispersed state of the dispersion.

4-(2) Treatment Before Coating

The support for use in the present invention is preferably subjected to a surface treatment. The specific method therefor includes a corona discharge treatment, a glow discharge treatment, a flame treatment, an acid treatment, an alkali treatment and an ultraviolet irradiation treatment. It is also preferred to provide an undercoat layer as described in JP-A-7-333433.

Examples of the dedusting method for use in the dedusting step as a pre-step before coating include a dry dedusting method such as a method of pressing a nonwoven fabric, a blade or the like against the film surface described in JP-A-59-150571; a method of blowing air having a high cleanliness at a high speed to separate attached matters from the film surface, and sucking these matters via a proximate suction port described in JP-A-10-309553; and a method of blowing compressed air under ultrasonic vibration to separate attached matters, and sucking these matters described in JP-A-7-333613 (for example, NEW ULTRA-CLEANER manufactured by Shinko Co., Ltd.).

Also, a wet dedusting method may be used, such as a method of introducing the film into a washing tank, and separating attached matters by using an ultrasonic vibrator; a method of supplying a cleaning solution to the film, and blowing air at a high speed, followed by sucking described in JP-B-49-13020; and a method of continuously rubbing the web with a liquid-moistened roll, and jetting a liquid onto the rubbed face, thereby cleaning the web described in JP-A-2001-38306. Among these dedusting methods, an ultrasonic dedusting method and a wet dedusting method are preferred in view of the dedusting effect. Before performing such a dedusting step, the static electricity on the film support is preferably destaticized so as to elevate the dedusting efficiency and prevent attachment of dirt. As for the destaticizing method, an ionizer of corona discharge type, an ionizer of light irradiation type (e.g., UV, soft X-ray), and the like may be used. The voltage charged on the film support before and after dedusting and coating is preferably 1,000 V or less, more preferably 300 V or less, still more preferably 100 V or less.

From the standpoint of maintaining the flatness of the film, in these treatments, the temperature of the cellulose acylate film is preferably kept to be Tg of less, specifically 150° C. or less. In the case of laminating the cellulose acylate film to a polarizing film as in use of the film of the present invention as a protective film of a polarizing plate, in view of adhesive property to the polarizing film, an acid or alkali treatment, that is, a saponification treatment for cellulose acylate, is preferably performed. In view of adhesive property, the surface energy of the cellulose acylate film is preferably 55 mN/m or more, more preferably from 60 to 75 mN/m. The surface energy can be adjusted by the above-described surface treatment.

(Uncured Multilayer Coating (Superposition) Method)

In the present invention, the uncured multilayer coating (superposition) method is a concept in contrast with sequential multilayer coating (sequential superposition) and is defined as a method where "a layer having a solvent and solid contents is coated and while this layer is still in the state of not losing fluidity and the curing of the layer is not in progress, another layer is further coated on the layer". Also, the progress of curing is defined as a phenomenon that the curable functional group present in the solid contents of the layer is decreasing along the polymerization reaction. The state where the curing is not in progress means a state that 90% or more of the initial curable reactive group remains.

In the present invention, at least two kinds of coating compositions are coated in the uncured state on the support. The number of coating compositions which can be coated may be sufficient if it is at least 2, and the upper limit of the number is not particularly limited as long as the layers can be stacked, but from two to five kinds of coating compositions are preferred, from two to four kinds of coating compositions are more preferred, two or three kinds of coating compositions are still more preferred, and two kinds of coating compositions are yet still more preferred.

As for the coating method in the simultaneous multilayer coating, a known simultaneous superposition coating method may be appropriately selected. Also, according to the definition in the present invention, the so-called wet-on-wet coating method described, for example, in Japanese Patent 2849514 is one example of the simultaneous superposition and is preferably used. In the production method of a laminate of the present invention, in view of suitability for high-speed coating, the coating is preferably performed by the following coating system (a coating system using a die coater having at least one slide and at least one slot).

4-(3) Coating

Figure 6:
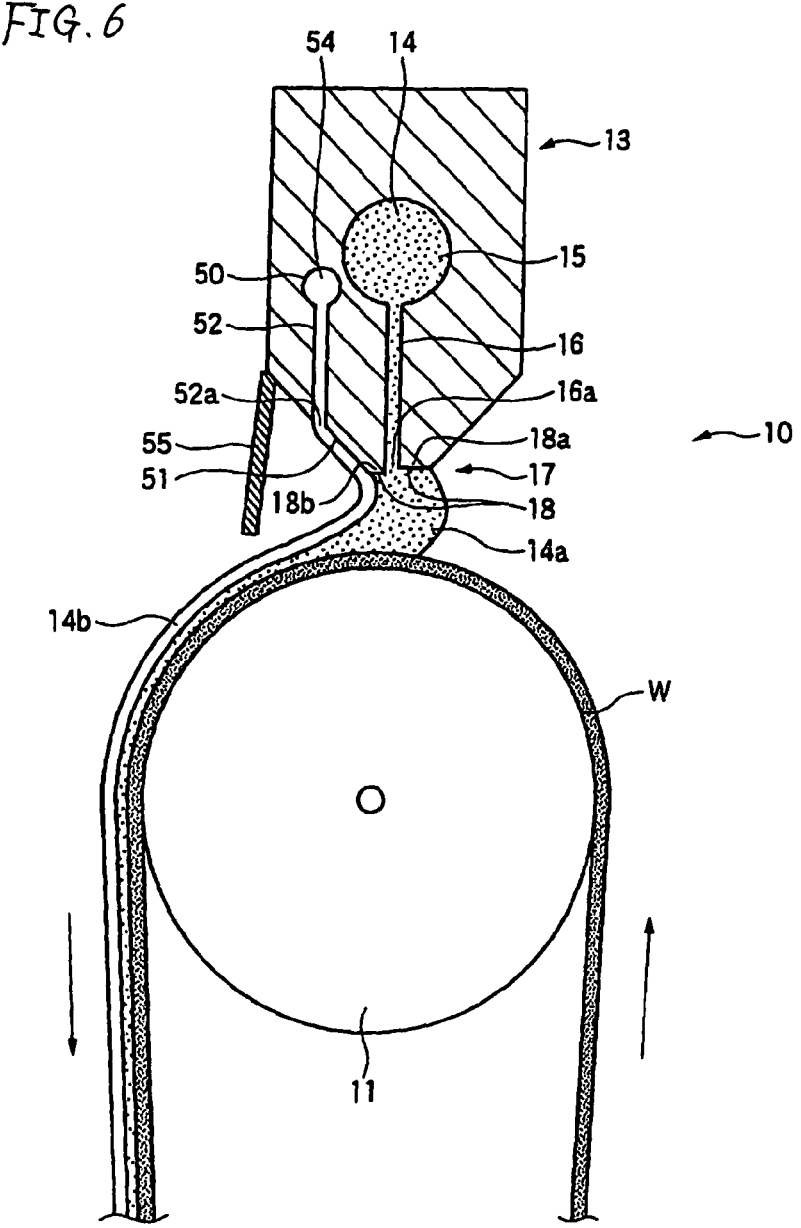
FIG. 6 illustrates a cross-sectional view showing one exemplary example of the coater which can be used in the present invention.

The coating method of a laminate of the present invention is described below by referring to the drawings. FIG. 6 is a cross-sectional view showing one example of the coater usable in the present invention. In FIG. 6, one slot die and one slide are disposed in the coater 10, but the number of slot dies or slides may be appropriately changed according to the layer construction required. For example, several layers of the laminate may be coated by the simultaneous superposition coating system, with the remaining layers being coated by another coating system, and the combination of coating systems is not particularly limited.

In the coater 10 of FIG. 6, a lower layer coating solution 14 formed into a bead 14a from a slot die 13 is coated on a continuously running transparent support web W supported by a backup roll 11. In the vicinity of the end part of the slot die 13 (in FIG. 6, the top surface of the slot die 13), a slide-type coating head is provided and an upper layer coating solution flows on the slide 51, whereby two layers including the lower layer are simultaneously coated on the web W and a coating film 14b is formed. Such a coating method is preferred particularly for forming an optical functional layer where the thickness after curing of the upper layer coating solution is less than 200 nm. The film thickness of the optical functional layer is more preferably from 50 to 170 nm.

Pockets 15 and 50 and slots 16 and 52 are formed inside the slot die 13. The cross section of the pockets 15 and 50 is constituted by a curve and a straight line and may have, for example, a nearly circular shape or a semicircular shape. The pockets 15 and 50 each is a liquid reservoir space for the coating solution and has a cross-sectional shape extended in the width direction of the slot die 13, and the length of its effective extension is generally set to be equal to or slightly longer than the coating width. The coating solution is supplied to the pocket 15 or 50 from the side surface of the slot die 13 or from the center of the surface opposite the slot opening 16a. Also, in the pockets 15 and 50, a stopper for preventing leakage of the coating solution is provided.

The slot 16 is a flow path of the coating solution 14 from the pocket 15 to the web W and, similarly to the pocket 15, has a cross-sectional shape extended in the width direction of the slot die 13, and the opening 16a positioned on the web side is generally adjusted to have nearly the same long width as the coating width by using a width regulating plate (not shown) or the like. The angle between the slot end of the slot 16 and the tangent line in the web running direction of a backup roller 11 is preferably from 30 to 90°.

The slot 52 is a flow path of the coating solution 54 from the pocket 50 to the slide 51 and, similarly to the pocket 15, has a cross-sectional shape extended in the width direction of the slot die 13, and the opening 52a positioned on the web side is generally adjusted to have nearly the same long width as the coating width by using a width regulating plate (not shown) or the like.

The end lip 17 of the slot die 13, where the opening 16a of the slot 16 is positioned, is tapered and the distal end thereof forms a flat part 18 called a land. In this land 18, the upstream side in the running direction of the web W with respect to the slot 16 is referred to as an upstream lip land 18a, and the downstream side is referred to as a downstream lip land 18b.

The slide 51 is present on the top surface of the slot die 13 and a coating solution flows thereon from the pocket 50. The slide 51 is generally adjusted to have nearly the same long width as the coating width by using and edge guide (not shown).

The length of the slide surface is preferably from 1.5 to 50 mm, more preferably from 1.5 to 20 mm, and most preferably from 2 to 10 mm. The length of the slide surface is preferably adjusted according to the viscosity of coating solution or the volatility of solvent used.

The coated amount flowed from the slide-type coating head is preferably 100 ml/m$^2$ or less, more preferably from 1 to 80 ml/m$^2$, still more preferably from 2 to 50 ml/m$^2$.

In order to prevent volatilization of the coating solution on the slide surface, a cover covering the entire slide surface is preferably provided. The cross-sectional area defined by the cover 55, the slide surfaces 51 and 53 and the backup roll W is preferably 550 mm$^2$ or less, more preferably 250 mm$^2$ or less, and most preferably 60 mm$^2$ or less. Incidentally, the slide-type coating head is known and disclosed, for example, in JP-A-2003-164788.

Figure 7A:
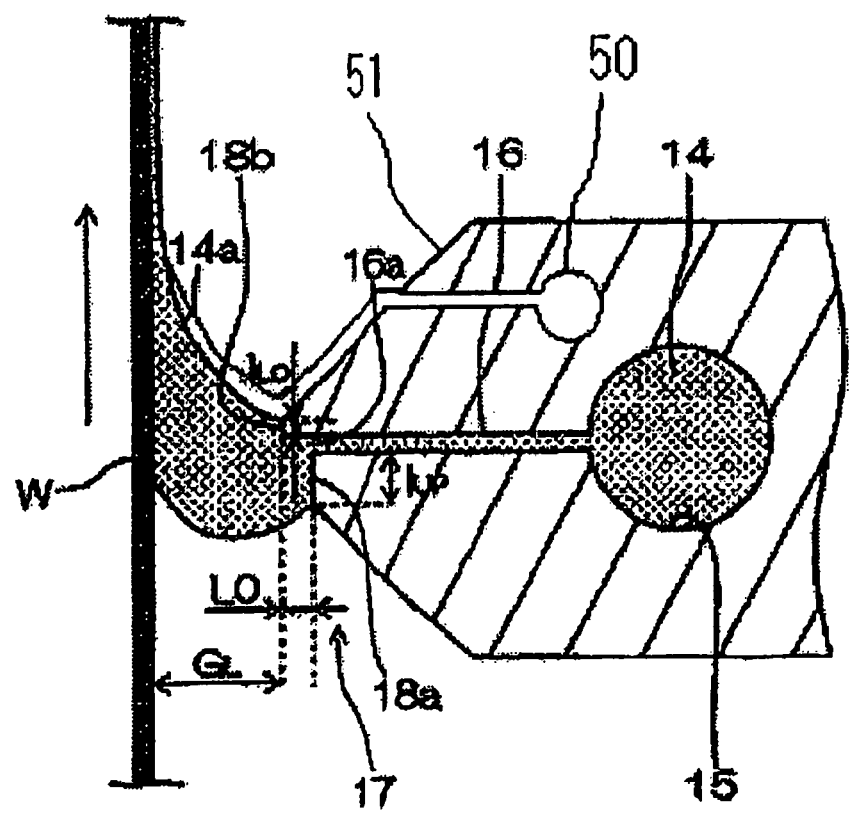
FIGS. 7A and 7B illustrate views showing the cross-sectional shapes of the slot dies.
Figure 7B:
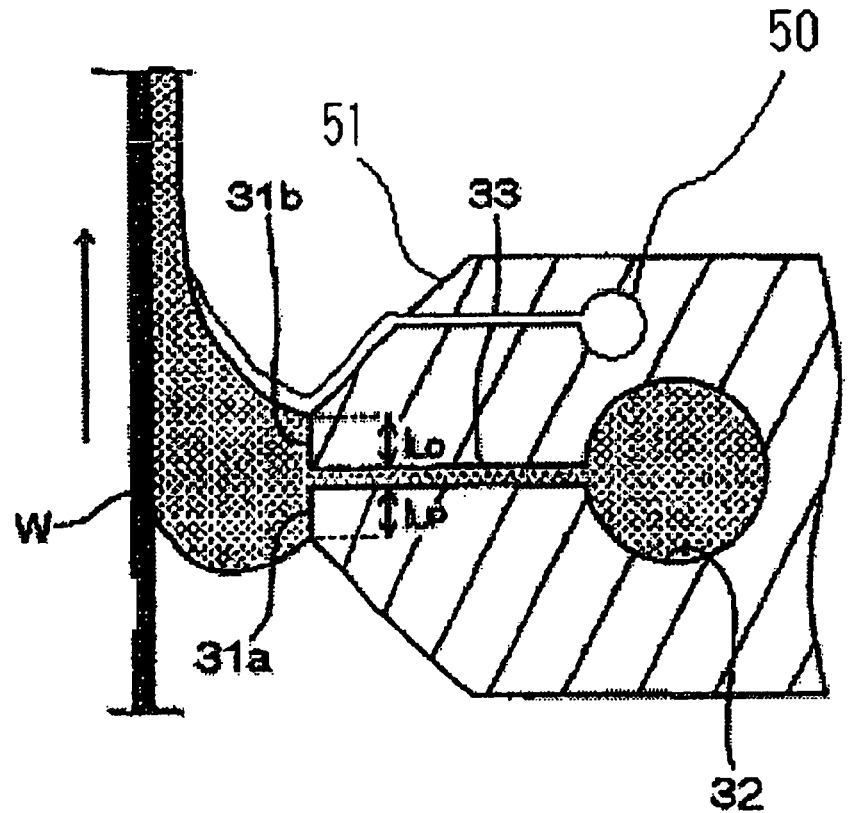

FIGS. 7A and 7B are views showing the cross-sectional shapes of the slot dies 13. In the slot die of FIG. 7B, the distances from the web W to the upstream lip land 31a and to the downstream lip land 31b are equal. Incidentally, the numeral 32 denotes a pocket, and 33 denotes a slot. On the other hand, in the slot die of FIG. 7A, the length $I_{LO}$ of the downstream lip land is made shorter and by virtue of this constitution, coating for a wet film thickness of 20 μm or less can be performed with good precision.

The land length $I_{UP}$ of the upstream lip land 18a in the running direction of the web W is not particularly limited but is preferably from 500 μm to 1 mm. The land length $I_{LO}$ of the downstream lip land 18b in the running direction of the web W is from 30 to 100 μm, preferably from 30 to 80 μm, more preferably from 30 to 60 μm. When the length $I_{LO}$ of the downstream lip land is 30 μm or more, chipping of the edge or land of the end lip and generation of streaks in the coating film can be prevented. Also, setting of the wet line position on the downstream side becomes easy and a problem that the coating solution is liable to spread on the downstream side does not occur. The wet spreading of the coating solution on the downstream side means that the wet line becomes non-uniform, and as conventionally known, this gives rise to a problem of incurring a defective profile such as streak on the coated surface. On the other hand, when the length $I_{LO}$ of the downstream lip land is 100 μm or less, good bead formability and good thin-layer coating can be achieved.

The downstream lip land 18b is in the overbite form and approaches closer to the web W than the upstream lip land 18a, so that the degree of reduced pressure can be made small and a bead suitable for thin-film coating can be formed. The difference between the distance from the web W to the downstream lip land 18b and the distance to the upstream lip land 18a (hereinafter, this difference is referred to as an "overbite length LO") is preferably from 0 to 120 μm, more preferably from 0 to 100 μm, and most preferably from 0 to 80 μm. When the slot die 13 has an overbite shape, the gap $G_L$ between the end lip 17 and the web W indicates the gap between the downstream lip land 18b and the web W.

<Coating Speed>

In the coating system preferably used in the present invention, high stability of the film thickness at high-speed coating can be achieved by using a thickening agent described above. Furthermore, this coating method is a pre-measurement system and therefore, a stable film thickness can be easily ensured even at high-speed coating. Also, this coating method can apply a low-amount coating solution at a high speed with good film thickness stability. The coating may be performed by other coating methods, but in a dip coating method, the coating solution in a liquid-receiving tank is inevitably vibrated and stepwise unevenness is readily generated. In a reverse roll coating method, stepwise unevenness is liable to occur due to eccentricity or deflection of a roll involved in the coating. Also, these coating methods are a post-measurement system and therefore, a stable film thickness can be hardly ensured. In view of productivity, the coating is preferably performed using the above-described die coating method at a rate of 25 m/min or more.

4-(4)<Drying>

After coating on the support directly or through another layer, the film of the present invention is preferably transferred in the form of a web to a heated zone for drying the solvent.

As for the method of drying the solvent, various known techniques may be utilized. Specific examples thereof include those described in JP-A-2001-286817, JP-A-2001-314798, JP-A-2003-126768, JP-A-2003-315505 and JP-A-2004-34002.

The temperature in the drying zone is preferably from 25 to 140° C. and it is preferred that the temperature in the first half of the drying zone is relatively low and the temperature in the second half is relatively high. However, the temperature is preferably not more than a temperature at which the components other than the solvent contained in the coating composition for each layer start volatilizing. For example, some commercially available photoradical generators used in combination with an ultraviolet curable resin volatilize by about several tens of percent within several minutes in warm air at 120° C., and some monofunctional or bifunctional acrylate monomers or the like allow progress of their volatilization in warm air at 100° C. In such a case, the drying zone temperature is preferably not more than a temperature at which the components other than the solvent contained in the coating composition for each layer start volatilizing.

In order to prevent uneven drying, the drying air after applying the coating composition for each layer on the support is preferably blown at a speed of 0.1 to 2 m/sec on the coating film surface when the solid content concentration of the coating composition is from 1 to 50%.

Also, after applying the coating composition for each layer on the support, the difference of temperature in the drying zone between the support and a transfer roll in contact with the surface opposite the coated surface of the support is preferably set to be from 0 to 20° C., because uneven drying due to uneven heat transfer on the transfer roll can be prevented.

4-(5) Curing

After drying the at least two kinds of coating compositions (preferably solvent), the film of the present invention is cured by passing it in the form of a web through a zone where the layers provided by coating at least two kinds of coating composition are cured by the irradiation of ionizing radiation and/or a heat treatment.

The species of the ionizing radiation for use in the present invention is not particularly limited and according to the kind of the curable composition for forming a film, the radiation may be appropriately selected from ultraviolet ray, electron beam, near ultraviolet ray, visible light, near infrared ray, infrared ray, X-ray and the like. Among these, ultraviolet ray and electron beam are preferred, and ultraviolet is more preferred because the handling is easy and a high energy can be easily obtained.

As for the light source of emitting ultraviolet ray which photopolymerizes an ultraviolet-reactive compound, any light source may be used as long as it emits ultraviolet ray. Examples of the light source which can be used include a low-pressure mercury lamp, a medium-pressure mercury lamp, a high-pressure mercury lamp, an ultrahigh-pressure mercury lamp, a carbon arc lamp, a metal halide lamp and a xenon lamp. Furthermore, an ArF excimer laser, a KrF excimer laser, an excimer lamp, a synchrotron radiation light and the like may also be used. Among these, an ultrahigh-pressure mercury lamp, a high-pressure mercury lamp, a low-pressure mercury lamp, a carbon arc, a xenon arc and a metal halide lamp can be preferably used.

An electron beam can also be similarly used. Examples of the electron beam include electron beams having an energy of 50 to 1,000 keV, preferably from 100 to 300 keV, emitted from various electron beam accelerators such as Cockroft-Walton type, Van de Graff type, resonance transformer type, insulating core transformer type, linear type, dynamitron type and high frequency type.

The irradiation conditions vary depending on individual lamps, but the amount of irradiation light is preferably 10 mJ/cm$^2$, more preferably from 50 to 10,000 mJ/cm$^2$, still more preferably from 50 to 2,000 mJ/cm$^2$. At this time, the irradiation dose distribution in the width direction of web is preferably, including both edges, from 50 to 100%, more preferably from 80 to 100%, based on the maximum irradiation dose in the center.

In the present invention, at least one layers out of layers stacked on the support is preferably cured by a step of irradiating ionizing radiation and at the same time, irradiating the ionizing radiation in an atmosphere having an oxygen concentration of 10 vol % or less for 0.5 seconds or more from the initiation of ionizing radiation irradiation in the state of the layer being heated at a film surface temperature of 60° C. or more.

It is also preferred that the film is heated simultaneously with and/or successively to the irradiation of ionizing radiation, in an atmosphere having an oxygen concentration of 3 vol % or less.

In particular, the low refractive index layer which is an outermost layer and has a small film thickness is preferably cured by this method. The curing reaction is accelerated by the heat, and a film excellent in the physical strength and chemical resistance can be formed.

The time for which ionizing radiation is irradiated is preferably from 0.7 to 60 seconds, more preferably from 0.7 to 10 seconds. If the irradiation time is less than 0.5 seconds, the curing reaction cannot be completed and satisfactory curing cannot be performed. Also, it is not preferred to keep the low oxygen condition for a long period of time, because large-scale equipment and a large amount of inert gas are required.

The crosslinking or polymerization reaction of the radical polymerizable compound is preferably formed in an atmosphere having an oxygen concentration of 6 vol % or less. The oxygen concentration is more preferably 4 vol % or less, still more preferably 2 vol % or less, and most preferably 1 vol % or less. Excessive reduction of the oxygen concentration requires use of a large amount of inert gas such as nitrogen and this is not preferred in view of production cost.

As for the means to reduce the oxygen concentration to 10 vol % or less, replacement of the atmosphere (nitrogen concentration: about 79 vol %, oxygen concentration: about 21 vol %) with another gas is preferred, and replacement with nitrogen (nitrogen purging) is more preferred.

When an inert gas is supplied to the ionizing radiation irradiating chamber and the conditions are set to allow the gas to somewhat blow out on the web inlet side of the irradiating chamber, not only the transport air carried over along with transportation of the web can be eliminated, thereby effectively reducing the oxygen concentration in the reaction chamber, but also the substantial oxygen concentration on the extreme surface subject to large curing inhibition by oxygen can be efficiently reduced. The inert gas flow direction in the web inlet side of the irradiating chamber can be controlled by adjusting the balance between supply and discharge of gas in the irradiating chamber.

Direct blowing of an inert has on the web surface is also preferably used as a method for removing the transport air.

By providing a pre-chamber before the above-described reaction chamber and previously eliminating oxygen on the web surface, the progress of curing can be more efficiently accelerated. In order to efficiently utilize the inert gas, the gap between a side surface constituting the web inlet side of the ionizing radiation reaction chamber or pre-chamber and the web surface is preferably from 0.2 to 15 mm, more preferably from 0.2 to 10 mm, and most preferably from 0.2 to 5 mm. However, for continuously producing the web, the webs need to be bonded and joined and for the bonding, a method using a bonding tape or the like is widely employed. Therefore, when the gap between the inlet surface of the ionizing radiation reaction chamber or pre-chamber and the web is too small, there arises a problem that the bonding member such as bonding tape is hung up. To solve this problem, at the time of forming a narrow gap, at least a part of the inlet surface of the ionizing radiation chamber or pr-chamber is preferably made movable, so that the gap can be enlarged by the thickness of the bonded part when the bonded part enters the chamber. This construction may be realized, for example, by a method where the inlet surface of the ionizing radiation reaction chamber or pre-chamber is made movable back and forth in the running direction and moved back and forth to enlarge the gap when the bonded part passes therethrough, or a method where the inlet surface of the ionizing radiation reaction chamber or pre-chamber is made movable perpendicularly to the web surface and moved vertically to enlarge the gap when the bonded part passes therethrough.

At the curing, the film surface is preferably heated at 60 to 170° C. When 60° C. or more, the effect of heating is obtained and when 170° C. or less, the problem such as deformation of substrate can be avoided. The heating temperature is more preferably from 60 to 100° C. The temperature on the film surface means a temperature on the surface of a layer intended to cure. Also, the time from the initiation of UV irradiation, in which the film reaches the above-described temperature, is preferably from 0.1 to 300 seconds, more preferably 10 seconds or less. When 0.1 second or more, the reaction of the curable composition for forming a film can be accelerated and when 300 seconds or less, there are caused no reduction in the optical performance and no problem in view of production, such as large equipment.

The heating method is not particularly limited but, for example, a method of contacting the film with a heated roll, a method of blowing heated nitrogen, or a method irradiating far infrared light or infrared light is preferred. A method of performing heating by flowing a medium such as warm water, steam or oil in a rotating metal roll described in Japanese Patent 2523574 may also be used. As for the heating means, a dielectric heating roll or the like may also be used.

The ultraviolet ray may be irradiated every time when a plurality of constituent layers each is formed or may be irradiated after the layers are stacked. Alternatively, some of these layers may be irradiated in combination. In view of productivity, the ultraviolet ray is preferably irradiated after stacking the multiple layers.

In the present invention, at least one layer stacked on the support may be cured by a plurality of ionizing radiation irradiations. In this case, at least twice ionizing radiation irradiations are preferably performed in continuous reaction chambers where the oxygen concentration does not exceed 3 vol %. By performing a plurality of ionizing radiation irradiations in reaction chambers having the same low oxygen concentration, the reaction time necessary for curing can be effectively ensured.

Particularly, in the case of elevating the production speed for high productivity, a plurality of ionizing radiation irradiations become necessary for ensuring an ionizing radiation energy necessary for the curing reaction.

Also, in the case where the curing percentage (100-residual functional group content) becomes a certain value less than 100%, when a layer is provided thereon and cured by means of ionizing radiation and/or heat, the curing percentage of the lower layer is preferably higher than that before providing the upper layer, because the adhesion property between the lower layer and the upper index layer is improved.

4-(6) Handling

In order to continuously produce the film of the present invention, a step of continuously feeding a rolled support film, a step of coating and drying the coating solution, a step of curing the coating film, and a step of taking up the support film having thereon the cured layer are performed.

A film support unrolled from a rolled film support is continuously fed to a clean room, static electricity charged to the film support is removed by a destaticizing apparatus in the clean room, and foreign matters adhering to the film support are then removed by a dedusting apparatus. Subsequently, a coating solution is coated on the film support in a coating part disposed in the clean room, and the coated film support is transported to a drying room and dried.

The film support having thereon the dried coating layer is fed from the drying room to a curing room where the monomer contained in the coating layer is polymerized, thereby effecting curing. The film support having thereon the cured layer is transported to a curing part where the curing is completed, and the film support having thereon the completely cured layer is taken up into a roll.

The above-described steps may be performed every time when each layer is formed, or a plurality of coating part-drying room-curing part lines may be provided to continuously perform the formation of respective layers.

In producing the film of the present invention, it is preferred that simultaneously with the above-described mirofiltration operation of the coating solution, the coating step in the coating part and the drying step in the drying room are performed in an air atmosphere having a high cleanliness and at the same time, before performing the coating, dirt and dust on the film are satisfactorily removed. The air cleanliness in the coating step and drying step is, according to the standard of air cleanliness in US Federal Standard 209E, preferably not lower than class 10 (the number of particles of 0.5 μm or more is 353 particles/(cubic meter) or less), more preferably not lower than class 1 (the number of particles of 0.5 μm or more is 35.5 particles/(cubic meter) or less). The air cleanliness is preferably high also in the parts other than the coating-drying steps, such as feeding part and take-up part.

(Polarizing Plate)

The polarizing plate mainly comprises a polarizing film and two protective films sandwiching the polarizing film from both sides. The laminate (preferably optical film, more preferably antireflection film) of the present invention is preferably used for at least one protective film out of two protective films sandwiching the polarizing film from both sides. By arranging the laminate of the present invention to serve also as a protective film, the production cost of the polarizing plate can be reduced. Furthermore, when the laminate of the present invention is used as an antireflection film for the outermost surface layer, a polarizing plate prevented from the projection or the like of outside light and excellent also in the scratch resistance, antifouling property and the like can be obtained.

As for the polarizing film, a known polarizing film or a polarizing film cut out from a lengthy polarizing film with the absorption axis of the polarizing film being neither parallel nor perpendicular to the longitudinal direction, may be used. The lengthy polarizing film with the absorption axis of the polarizing film being neither parallel nor perpendicular to the longitudinal direction is produced by the following method. This polarizing film is a stretched film obtained by applying a tension to a continuously fed polymer film while holding both edges of the film with holding means and can be produced according to a stretching method where the film is stretched to 11.1 to 20.0 times at least in the film width direction, the holding devices at both edges of the film are moved to create a difference in the travelling speed of 3% or less in the longitudinal direction, and the film travelling direction is bent, in the state of the film being held at both edges, such that the angle made by the film travelling direction at the outlet in the step of holding both edges of the film and the substantial stretching direction of the film inclines at 20 to 70°. Particularly, a polarizing film produced with an inclination angle of 45° is preferred in view of productivity.

The stretching method of a polymer film is described in detail in JP-A-2002-86554 (paragraphs [0020] to [0030]). It is also preferred that out of two protective films of the polarizer, the film other than the antireflection film is an optically-compensatory film having an optically-compensatory layer comprising an optically anisotropic layer. The optically-compensatory film (retardation film) can improve the viewing angle properties of a liquid crystal display screen. The optically-compensatory film may be a known optically-compensatory film but from the standpoint of enlarging the viewing angle, an optically-compensatory film described in JP-A-2001-100042 where an optically-compensatory layer comprising a compound having a discotic structure unit is provided and the angle made by the discotic compound and the support is changing in the depth direction of the layer, is preferred. This angle is preferably increasing as the distance from the support surface side of the optically anisotropic layer increases.

Out of two protective films of the polarizer, the transparent support of at least one protective film preferably satisfies the following formulae (I) and (II), because the effect of improving the display viewed from the oblique direction of a liquid crystal display screen is high. In particular, the transparent support of the present invention preferably satisfies the following formulae (I) and (II).

$$0 \leq Re(630) \leq 10 \text{ and } |Rth(630)| \leq 25 \quad (I)$$

$$|Re(400)-Re(700)| \leq 10 \text{ and } |Rth(400)-Rth(700)| \leq 35 \quad (II)$$

(Image Display Device)

The laminate (preferably optical film, more preferably antireflection film) or polarizing plate of the present invention can be applied to an image display device such as liquid crystal display device (LCD), plasma display panel (PDP), electroluminescent display (ELD) and cathode ray tube display device (CRT). The laminate (antireflection film) of the present invention has a transparent support and therefore, is used by bonding the transparent support side to the image display surface of the image display device.

In the case of using the optical film of the present invention as one surface protective film of a polarizing film, the optical film can be preferably used for a transmissive, reflective or transflective liquid crystal display device in a mode such as twisted nematic (TN) mode, super twisted nematic (STN) mode, vertical alignment (VA) mode, in-plane switching (IPS) mode and optically compensated bend cell (OCB) mode.

The VA-mode liquid crystal cell includes (1) a VA-mode liquid crystal cell in a narrow sense where rod-like liquid crystalline molecules are oriented substantially in a vertical alignment at the time of not applying a voltage and oriented substantially in a horizontal alignment at the time of applying a voltage (described in JP-A-2-176625); (2) a (MVA-mode) liquid crystal cell where the VA mode is modified to a multi-domain system for enlarging the viewing angle (described in SID97, Digest of Tech. Papers (preprints), 28, 845 (1997)); (3) a (n-ASM-mode) liquid crystal cell where rod-like liquid crystalline molecules are oriented substantially in a vertical alignment at the time of not applying a voltage and oriented in a twisted multi-domain alignment at the time of applying a voltage (described in preprints of Nippon Ekisho Toronkai (Liquid Crystal Forum of Japan), 58-59 (1998)); and (4) a SURVAIVAL-mode liquid crystal cell (reported in LCD International 98).

The OCB-mode liquid crystal cell is a liquid crystal display device using a liquid crystal cell of bend alignment mode where rod-like liquid crystalline molecules are aligned substantially in opposite directions (symmetrically) between the upper part and the lower part of the liquid crystal cell, and this is disclosed in U.S. Pat. Nos. 4,583,825 and 5,410,422. Since rod-like liquid crystalline molecules are aligned symmetrically between the upper part and the lower part of the liquid crystal cell, the liquid crystal cell of bend alignment mode has a self-optically compensating ability. Accordingly, this liquid crystal mode is also called an OCB (optically compensatory bend) liquid crystal mode. A liquid crystal display device of bend alignment mode is advantageous in that the response speed is fast.

The entirety including a polarizing plate comprising a bend alignment-mode liquid crystal cell and an optically anisotropic layer preferably has optical properties satisfying the following formula (1') in the measurement at any wavelength of 450 nm, 550 nm and 630 nm, because the effect of improving the display viewed from the oblique direction of a liquid crystal display screen is high. In particular, the polarizing plate using the optical film of the present invention as a protective film preferably satisfies the following formula (1'). Formula (1'):

$$0.05 < (\Delta n \times d)/(Re \times Rth) < 0.20$$

[wherein $\Delta n$ is the intrinsic birefringence of the rod-like liquid crystal molecule in the liquid crystal cell, d is the liquid crystal layer thickness (unit: nm) of the liquid crystal cell, Re is the in-plane retardation value of the optically anisotropic layer as a whole, and Rth is the retardation value in a thickness direction of the optically anisotropic layer as a whole].

In the ECB-mode liquid crystal cell, rod-like liquid crystalline molecules are oriented substantially in a horizontal alignment at the time of not applying a voltage. This is most popularly used as a color TFT liquid crystal display device and is described in a large number of publications such as EL, PDP, LCD Display, Toray Research Center (2001).

Particularly, in the case of a TN-mode or IPS-mode liquid crystal display device, as described in JP-A-2001-100043 and the like, an optically-compensatory film having an effect of enlarging the viewing angle is preferably used for the protective film on the surface opposite the antireflection film of the present invention out of front and back two protective films of a polarizing film, because a polarizing plate having an antireflection effect and a viewing angle-enlarging effect with a thickness of one polarizing plate can be obtained.

EXAMPLES

The present invention is described in greater detail below by referring to Examples, but the present invention should not be construed as being limited thereto.

(Preparation of Sol Solution a-1)

In a 1,000 ml-volume reaction vessel equipped with a thermometer, a nitrogen inlet tube and a dropping funnel, 187 g (0.80 mol) of acryloyloxypropyltrimethoxysilane, 29.0 g (0.21 mol) of methyltrimethoxysilane, 320 g (10 mol) of methanol and 0.06 g (0.001 mol) of KF were charged, and 17.0 g (0.94 mol) of water was gradually added dropwise with stirring at room temperature. After the completion of dropwise addition, the solution was stirred for 3 hours at room temperature and then heated with stirring for 2 hours under reflux of methanol. Thereafter, the low boiling point fraction was removed by distillation under reduced pressure, and the residue was filtered to obtain 120 g of Sol Solution a-1. The thus-obtained substance was measured by GPC, as a result, the mass average molecular weight was 1,500 and out of the oligomer or higher components, the proportion of the components having a molecular weight of 1,000 to 20,000 was 30%.

Also, from the 1H-NMR measurement results, the structure of the obtained substance was the structure represented by the following formula:

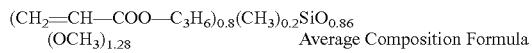

Furthermore, the condensation rate α as measured by $^{29}$Si—NMR was 0.59. From these analysis results, this silane coupling agent sol was found to be mostly occupied by a linear structure portion. Also, the gas chromatography analysis revealed that the residual ratio of the raw material acryloxypropyltrimethoxysilane was 5% or less.

(Preparation of Sol Solution a-2)

In a reaction vessel equipped with a stirrer and a reflux condenser, 119 parts of methyl ethyl ketone, 101 parts of acryloyloxypropyltrimethoxysilane (KBM5103, produced by Shin-Etsu Chemical Co., Ltd.) and 3 parts of diisopropoxyaluminum ethyl acetate were added and mixed and after adding 30 parts of ion-exchanged water, the reaction was allowed to proceed at 60° C. for 4 hours. The reaction solution was cooled to room temperature, and then fine controlled to a solid content of 29 mass % by methylethyl ketone to obtain Sol Solution a-2.

The mass average molecular weight of Sol Solution a-2 was 1,600 and out of the oligomer or higher components, the proportion of the components having a molecular weight of 1,000 to 20,000 was 100%. Also, the gas chromatography analysis revealed that the raw material acryloxypropyl-trimethoxysilane was not remaining at all.

(Synthesis of Perfluoroolefin Copolymer (1)(FP-1))

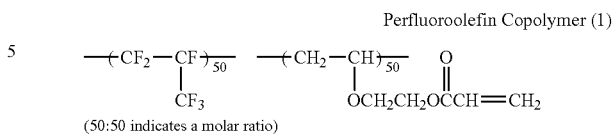

(50:50 indicates a molar ratio)

In a stainless steel-made autoclave having an internal volume of 100 ml and equipped with a stirrer, 40 ml of ethyl acetate, 14.7 g of hydroxyethyl vinyl ether and 0.55 g of dilauroyl peroxide were charged, and the inside of the system was degassed and displaced with nitrogen gas. Furthermore, 25 g of hexafluoropropylene (HFP) was introduced into the autoclave, and the temperature was elevated to 65° C. The pressure when the temperature in the autoclave reached 65° C. was 0.53 MPa (5.4 kg/cm$^2$). The reaction was continued for 8 hours while keeping this temperature and when the pressure reached 0.31 MPa (3.2 kg/cm$^2$), the heating was stopped and the system was allowed to cool. When the inner temperature dropped to room temperature, the unreacted monomer was expelled, and the autoclave was opened to take out the reaction solution. The obtained reaction solution was poured in a large excess of hexane and after removing the solvent by decantation, the precipitated polymer was taken out. This polymer was dissolved in a small amount of ethyl acetate, and the residual monomer was completely removed by performing reprecipitation twice from hexane. After drying, 28 g of the polymer was obtained. Subsequently, 20 g of the polymer was dissolved in 100 ml of N,N-dimethylacetamide, and 11.4 g of acrylic acid chloride was added dropwise thereto under ice cooling, followed by stirring at room temperature for 10 hours. Thereafter, ethyl acetate was added to the reaction solution, and the resulting solution was washed with water. The organic layer was extracted and then concentrated, and the obtained polymer was reprecipitated from hexane to obtain 19 g of Perfluoroolefin Copolymer (1) (FP-1). The refractive index of the obtained polymer was 1.421, the number average molecular weight was 23,000 and the mass average molecular weight was 30,000.

[Synthesis of Fluorine-Containing Polymer]

Synthesis Example 1

Synthesis of Fluorine-Containing Polymer TP1

In a stainless steel-made autoclave having an internal volume of 100 mL and equipped with a stirrer, 18.5 g of ethyl acetate, 8.8 g of hydroxyethyl vinyl ether (HEVE), 1.2 g of Silaplane FM-0725 (produced by Chisso Corp.) and 0.40 g of V-65 (thermal radical generator, produced by Wako Pure Chemicals Industries, Ltd.) were charged, and the inside of the system was degassed and displaced with nitrogen gas. Furthermore, 15 g of hexafluoropropylene (HFP) was introduced into the autoclave, and the temperature was elevated to 62° C. The pressure when the temperature in the autoclave reached 62° C. was 8.9 kg/cm$^2$. The reaction was continued for 9 hours while keeping the inside of autoclave at 62° C. and when the pressure reached 6.2 kg/cm$^2$, the heating was stopped and the system was allowed to cool.

When the inner temperature dropped to room temperature, the unreacted monomer was expelled, and the autoclave was opened to take out the reaction solution. The obtained reaction solution was poured in a mixture of hexane in large excess and 2-propanol and after removing the solvent by decantation, the precipitated polymer was taken out. This polymer was dissolved in a small amount of ethyl acetate, and the residual monomer was completely removed by performing reprecipitation twice from a mixture of hexane and 2-propanol. After drying under reduced pressure, 8.3 g of TP1 was obtained. The number average molecular weight of the obtained polymer was 17,000 and the mass average molecular weight was 43,000.

Synthesis Example 2

Synthesis of Fluorine-Containing Polymer TP2

In a stainless steel-made autoclave having an internal volume of 100 mL and equipped with a stirrer, 30 g of ethyl acetate, 8.8 g of hydroxyethyl vinyl ether (HEVE), 0.82 g of VPS-1001 (macro-azo initiator, produced by Wako Pure Chemicals Industries, Ltd.) and 0.29 g of lauroyl peroxide were charged, and the inside of the system was degassed and displaced with nitrogen gas. Furthermore, 15 g of hexafluoropropylene (HFP) was introduced into the autoclave, and the temperature was elevated to 70° C. The pressure when the temperature in the autoclave reached 70° C. was 9.0 kg/cm$^2$. The reaction was continued for 9 hours while keeping the inside of autoclave at 70° C. and when the pressure reached 6.0 kg/cm$^2$, the heating was stopped and the system was allowed to cool.

When the inner temperature dropped to room temperature, the unreacted monomer was expelled, and the autoclave was opened to take out the reaction solution. The obtained reaction solution was poured in a mixture of hexane in large excess and 2-propanol and after removing the solvent by decantation, the precipitated polymer was taken out. This polymer was dissolved in a small amount of ethyl acetate, and the residual monomer was completely removed by performing reprecipitation twice from a mixture of hexane and 2-propanol. After drying under reduced pressure, 19.3 g of TP2 was obtained. The number average molecular weight of the obtained polymer was 21,000 and the mass average molecular weight was 53,000.

[Preparation of Silica Liquid Dispersion A]

28 Parts of acryloyloxypropyltrimethoxysilane "KBM-5103" {produced by Shin-Etsu Chemical Co., Ltd.}, 2 parts of tridecafluorooctyltrimethoxysilane {produced by GE Toshiba Silicones Co., Ltd.} and 1.5 parts of diisopropoxy-aluminum ethyl acetate were added and mixed to 500 parts of a hollow silica fine particle sol (isopropyl alcohol silica sol, produced according to Preparation Example 4 of JP-A-2002-79616 by changing the size, average particle diameter: 40 nm, shell thickness: 6 nm, silica concentration: 20 mass %, refractive index of silica particle: 1.30) and after adding thereto 9 parts of ion-exchanged water, the reaction was allowed to proceed at 60° C. for 8 hours. Thereafter, the reaction solution was cooled to room temperature and 1.8 parts of acetylacetone was added thereto. While adding cyclohexanone to 500 g of the obtained liquid dispersion to keep constant the silica content, the solvent was displaced by reduced-pressure distillation at a pressure of 20 kPa. No foreign matter was generated in the liquid dispersion and the viscosity when the solid content concentration was adjusted to 26% with cyclohexanone was 10 mPa·s at 25° C. The amount of residual isopropyl alcohol in Liquid Dispersion A obtained was analyzed by gas chromatography and found to be 1.0%.

Synthesis Example

Synthesis of N-Methylmorpholine Salt of p-Toluenesulfonic Acid

N-Methylmorpholine (3.0 g) was dissolved in 30 cm$^3$ of 2-butanone and 5.7 g of p-toluenesulfonic acid monohydrate was added little by little with stirring. After further stirring for 1 hour, the solvent was removed by distillation under reduced pressure, and the obtained solid was recrystallized from acetone to obtain 6.1 g of N-methylmorpholine salt of p-toluenesulfonic acid.

[Preparation of Coating Solution (LL-1) for Low Refractive Index Layer]

87.0 Parts of a fluorine-containing copolymer {Compound (P-3) (number average molecular weight: 25,000, mass average molecular weight: 35,000)}, 17.2 parts (5 parts as the solid content) of Sol Solution a-1, 5.0 parts of a dipentaerythritol pentaacrylate and dipentaerythritol hexaacrylate mixture "DPHA" {produced by Nippon Kayaku Co., Ltd.} and 3 parts of photoradical generator "Irgacure OXE01" {produced by Ciba Specialty Chemicals Corp.} were dissolved in 200 parts of methyl ethyl ketone. The resulting solution was diluted with cyclohexanone and methyl ethyl ketone to adjust the solid content concentration of the entire coating composition to 6% and the ratio of cyclohexane and methyl ethyl ketone to 20/80, thereby preparing Coating Solution (LL-1) for Low Refractive Index Layer.

[Preparation of Coating Solutions (LL-2) to (LL-10) for Low Refractive Index Layer]

Coating Solutions (LL-2) to (LL-10) for Low Refractive Index Layer were prepared in the same manner as (LL-1) except that in the preparation of Coating Solution (LL-1) for Low Refractive Index Layer, the composition was changed as shown in the Table below.

TABLE 11

| No. | Fluorine-Containing Siloxane-Containing Polymer Kind | Fluorine-Containing Siloxane-Containing Polymer Parts by Mass | Photopolymerizable Polysiloxane Kind | Photopolymerizable Polysiloxane Parts by Mass | DPHA Parts by Mass | Sol a-1 Parts by Mass | Polymerization Initiator Kind | Polymerization Initiator Parts by Mass | Fine Particle Kind | Fine Particle Parts by Mass |
|---|---|---|---|---|---|---|---|---|---|---|
| LL-1 | P-3 | 87 | — | — | 5 | 5 | 907 | 3 | — | — |
| LL-2 | PP-5 | 87 | — | — | 5 | 5 | 907 | 3 | — | — |
| LL-3 | FP-1 | 87 | — | — | 5 | 5 | 907 | 3 | — | — |
| LL-4 | P-3 | 87 | — | — | — | — | 907 | 3 | — | — |
| LL-5 | P-3 | 87 | — | — | 5 | 5 | 184 | 3 | — | — |
| LL-6 | P-3 | 87 | — | — | 5 | 5 | OXE01 | 3 | — | — |
| LL-7 | P-3 | 87 | — | — | 5 | 5 | 369 | 3 | — | — |
| LL-8 | P-3 | 87 | — | — | 5 | 5 | BP | 3 | — | — |

TABLE 11-continued

| No. | Fluorine-Containing Siloxane-Containing Polymer Kind | Parts by Mass | Photopolymerizable Polysiloxane Kind | Parts by Mass | DPHA Parts by Mass | Sol a-1 Parts by Mass | Polymerization Initiator Kind | Parts by Mass | Fine Particle Kind | Parts by Mass |
|---|---|---|---|---|---|---|---|---|---|---|
| LL-9 | P-3 | 49 | RMS033 | 1 | 5 | 14 | 907 | 2 | MEK-ST-L | 30 |
| LL-10 | P-3 | 49 | RMS033 | 1 | 5 | 5 | 907 | 2 | Liquid Dispersion A | 39 |

The contents of the compounds used in the Table above are shown below. In the Table, the "parts" indicates "parts by mass of the solid content" in all cases.

Fluorine-Containing Siloxane-Containing Polymer:

P-3*: Compound P-3

PP-5*: Compound PP-5

Photopolymerizable Silicone:

RMS33*: "RMS-33", produced by Gelest.
DPHA: photopolymerizable compound "DPHA", a mixture of pentaerythritol triacrylate and pentaerythritol tetraacrylate, produced by Nippon Kayaku Co., Ltd.

Photopolymerization Initiator:

OXE01*: "Irgacure OXE01", produced by Ciba Specialty Chemicals Corp., molecular weight: 451.
184*: "Irgacure 184", produced by Ciba Specialty Chemicals Corp., molecular weight: 204.
907*: "Irgacure 907", produced by Ciba Specialty Chemicals Corp., molecular weight: 279.
369*: "Irgacure 369", produced by Ciba Specialty Chemicals Corp., molecular weight: 367.

BP: benzoyl peroxide, produced by Polysciences, Inc.

Fine Particle:

MEK-ST-L*: "MEK-ST-L", produced by Nissan Chemicals Industries, Ltd.; a dispersion of fine silica particle, solvent: MEK, average particle size: 45 nm.

Liquid Dispersion A: Silica Liquid Dispersion A.

[Preparation of Coating Solution (LL-11 to LL-18) for Low Refractive Index Layer]

Respective components were mixed as shown in the Table below and dissolved in 2-butanone to produce coating solutions for low refractive index layer having a solid content of 6%.

TABLE 12

Coating Solution for Low Refractive Index Layer

| No. | Fluorine-Containing Polymer Kind | Amount Used | Curing Agent Kind | Amount Used | Curing Catalyst Acid | Base | Addition Method | Amount Used | Inorganic Particle Kind | Amount Used |
|---|---|---|---|---|---|---|---|---|---|---|
| LL-11 | TP1 | 72 | H-a | 18 | PTS | b-20 | solution | 1.0 | ST | 10 |
| LL-12 | TP1 | 72 | — | — | PTS | b-20 | solution | 1.0 | ST | 10 |
| LL-13 | TP1 | 64 | H-b | 16 | PTS | b-20 | solution | 1.5 | ST-L | 20 |
| LL-14 | TP1 | 64 | H-a | 16 | PTS | b-14 | solution | 1.5 | (ST/ST-L) | 10/10 |
| LL-15 | TP2 | 72 | H-a | 18 | PTS | b-14 | solid | 1.0 | ST | 10 |
| LL-16 | TP2 | 64 | CY303 | 16 | PTS | b-14 | solution | 1.5 | Liquid Dispersion A | 20 |
| LL-17 | TP2 | 64 | CY303 | 16 | UVI-6990 | | solution | 1.5 | ST-L | 20 |
| LL-18 | TP2 | 64 | H-b | 16 | UVI-6990 | | solution | 1.5 | ST-L | 20 |

In the Table above, CY303 denotes Cymel 303, a methylolated methyl melamine produced by Japan Cytec Industries Inc.; ST and ST-L denote "MEK-ST" and "MEK-ST-L", respectively, colloidal silica (silica particle) produced by Nissan Chemicals Industries, Ltd.; UVI-6990 denotes a photocationic polymerization initiator produced by Union Carbide Japan Co., Ltd., and the same notations are used in the following. H-a and H-b denote compounds having structures shown below, and the same notations are used in the following.

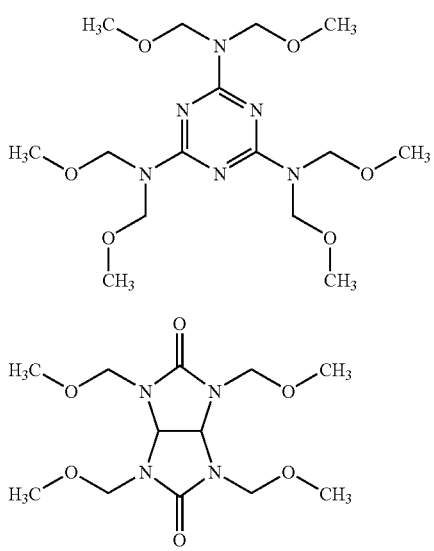

Also, in the Table above, the names of acid and base as the curing catalyst have the same meanings as those used in the portions describing the acid and base. The addition method indicates how the salt is prepared and used, that is, "solid" means that a salt of acid and organic base is isolated and used, and "solution" means that a solution containing acid and organic base in the same equivalent is prepared and used. These are used by the same notification in the following.

tered through a polypropylene-made filter having a pore size of 30 μm to prepare Coating Solutions HL-1 to HL-10 for Hardcoat Layer.

TABLE 13

|  | HL-1 | HL-2 | HL-3 |
|---|---|---|---|
| Polymethyl methacrylate | 1.4 | 1.4 | 1.4 |
| PET-30 | 29.7 | 29.7 | 29.7 |
| DPHA | 1.6 | 1.6 | 1.6 |
| Sol Solution a-1 | 8.1 | 8.1 | 8.1 |
| 184* | 1.6 | | |
| 907* | | 1.6 | |
| Benzoyl peroxide | | | 1.6 |
| Liquid dispersion of 8-μm crosslinked polymethyl methacrylate particle | 9.0 | 9.0 | 9.0 |
| Methyl ethyl ketone | 15.7 | 15.7 | 15.7 |
| Methyl isobutyl ketone | 33.0 | 33.0 | 33.0 |

The contents of the compounds used in the Table above are shown below. In the Table, the "parts" indicates "parts by mass of the solid content" in all cases.

DPHA: photopolymerizable compound "DPHA", a mixture of pentaerythritol triacrylate and pentaerythritol tetraacrylate, produced by Nippon Kayaku Co., Ltd.

Photopolymerization Initiator:

184*: "Irgacure 184", produced by Ciba Specialty Chemicals Corp., molecular weight: 204.

907*: "Irgacure 907", produced by Ciba Specialty Chemicals Corp., molecular weight: 279.

Benzoyl peroxide: produced by Polysciences, Inc.

8-μm Crosslinked polymethyl methacrylate: a 30% methyl ethyl ketone liquid dispersion of crosslinked polymethyl methacrylate particle having an average particle diameter of 8.0 μm; used after dispersion in a polytron dispersing machine at 10,000 rpm for 20 minutes.

PET-30: a mixture of pentaerythritol triacrylate and pentaerythritol tetraacrylate [produced by Nippon Kayaku Co., Ltd.].

Polymethyl methacrylate: polymethyl methacrylate powder (mass average molecular weight: 120,000, produced by Aldrich).

TABLE 14

| | Coating Solution for Hardcoat Layer | | | | | | | | | | |
|---|---|---|---|---|---|---|---|---|---|---|---|
| | Inorganic Particle | | Cationic Polymerizable Compound | | Curing Agent | | Curing Catalyst | | | | Solvent | |
| No. | Kind | Amount Used | Kind | Amount Used | Kind | Amount Used | Acid | Base | Addition Method | Amount Used | Kind | Amount Used |
| HL-4 | ST | 50 | A-1 | 35.8 | CY303 | 6.2 | PTS | b-20 | solution | 1.0 | MEK/MiBK | 5/90 |
| HL-5 | ST | 50 | A-1 | 35.8 | H-a | 6.2 | PTS | b-20 | solution | 1.0 | MEK/MiBK | 5/90 |
| HL-6 | ST-L | 50 | EX314 | 35.8 | H-b | 6.2 | PTS | b-20 | solution | 1.5 | MEK/MiBK | 5/90 |
| HL-7 | (ST/ST-L) | 25/25 | A-1 | 35.8 | H-a | 6.2 | PTS | b-14 | solution | 1.5 | MEK/MiBK | 5/90 |
| HL-8 | ST | 50 | EX314 | 35.8 | H-a | 18 | PTS | b-14 | solid | 1.0 | MEK/MiBK | 5/90 |
| HL-9 | ST | 50 | A-1 | 35.8 | CY303 | 16 | PTS | b-14 | solution | 1.5 | MEK/MiBK | 5/90 |
| HL-10 | ST-L | 50 | EX314 | 35.8 | CY303 | 16 | UVI-6990 | | solution | 1.5 | MEK/MiBK | 5/90 |
| HL-11 | ST-L | 50 | A-1 | 35.8 | CY303 | 16 | UVI-6990 | | solution | 1.5 | MEK/MiBK | 5/90 |

Preparation of Coating Solution for Hardcoat Layer

Respective materials were mixed according to the formulation in the Table below, and the mixture obtained was filtered In the Table above, A-1 denotes a polyfunctional epoxy compound, Compound (A-1); EX314 denotes DENACOL EX314 (produced by Nagase Chemicals Ltd.) shown below.

Examples 1 to 26 and Comparative Examples 1 to 6

Preparation of Antireflection Film by Simultaneous Superposition

The preparation of antireflection film was performed under the coating conditions shown below.

Condition: Simultaneous Superposition-1

Figure 9:
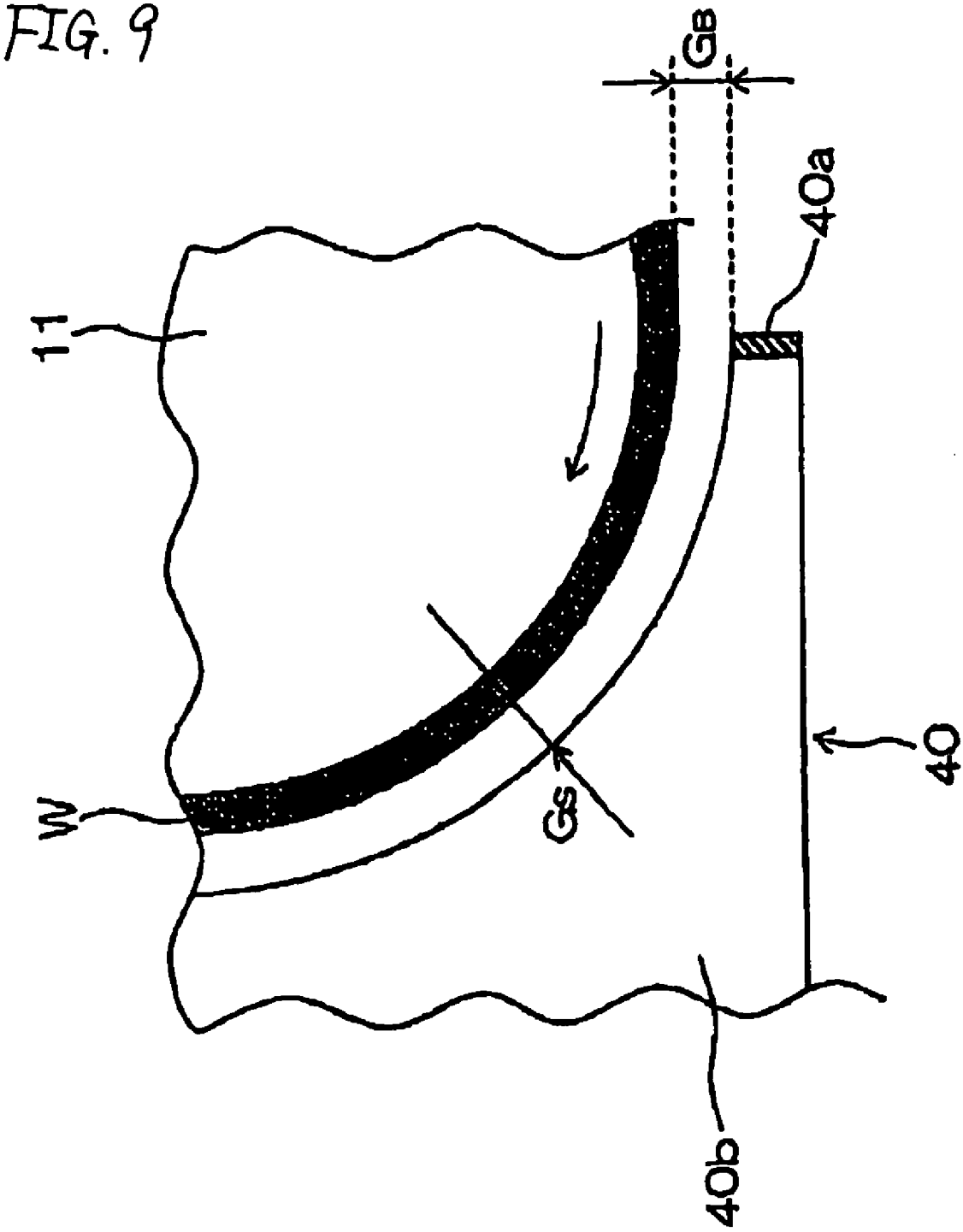
FIG. 9 illustrates a cross-sectional view showing the low-pressure chamber and the web W approaching closer, wherein (1) denotes support; (2) denotes hardcoat layer; (3) denotes medium refractive index layer; (4) denotes high refractive index layer; (5) denotes low refractive index layer; 10 denotes coater; 11 denotes backup roller; W denotes web; 13 denotes slot die; 14 denotes coating solution; 14a denotes bead; 14b denotes coating film; 15, 50 denote pockets; 16, 52 denote slots; 16a, 52a denote slot openings; 17 denotes end lip; 18 denotes land; 18a denotes upstream lip land; 18b denotes downstream lip land; $I_{UP}$ denotes land length of upstream lip land 18a; $I_{LO}$ denotes land length of downstream lip land 18b; LO denotes overbite length (difference between the distance from the downstream lip land 18b to the web W and the distance from the upstream lip land 18a to the web W); $G_L$ denotes gap between the end lip 17 and the web W (gap between the downstream lip land 18b and the web W); 31a denotes upstream lip land; 31b denotes downstream lip land; 32 denotes pocket; 33 denotes slot; 40 denotes low-pressure chamber; 40a denotes back plate; 40b denotes side plate; 51 denotes slide; 55 denotes cover; $G_B$ denotes gap between the back plate 40a and the web W; and $G_S$ denotes gap between the side plate 40b and the web W.

A 80 μm-thick triacetyl cellulose film (FUJI-TAC TD80UF, produced by Fuji Photo Film Co., Ltd.) in a roll form was unrolled, and the coating solution for hardcoat layer and the coating solution for low refractive index layer were coated thereon by using the geeser shown in FIGS. 7A, 8 and 9 and the die coating method shown in Coating Condition A below, dried at 30° C. for 15 seconds and at 80° C. for 60 seconds, and then irradiated with an ultraviolet ray at an irradiation dose of 300 mJ/cm$^2$ by using an air-cooled metal halide lamp (manufactured by Eye Graphics Co., Ltd.) of 240 W/cm under nitrogen purging to give an atmosphere having an oxygen concentration of 0.1%, thereby curing the coating layers. In this way, an antireflection film was prepared.

Condition: Simultaneous Superposition-2

A 80 μm-thick triacetyl cellulose film (FUJI-TAC TD80UF, produced by Fuji Photo Film Co., Ltd.) in a roll form was unrolled, and the coating solution for hardcoat layer and the coating solution for low refractive index layer were coated thereon by using the geeser shown in FIGS. 7A, 8 and 9 and the die coating method shown in Coating Condition A below, dried at 30° C. for 15 seconds and at 80° C. for 60 seconds, and further dried at 100° C. for 8 minutes, thereby curing the coating layers. In this way, an antireflection film was prepared.

Condition: Simultaneous Superposition-3

A 80 μm-thick triacetyl cellulose film (FUJI-TAC TD80UF, produced by Fuji Photo Film Co., Ltd.) in a roll form was unrolled, and the coating solution for hardcoat layer and the coating solution for low refractive index layer were coated thereon by using the geeser shown in FIGS. 7A, 8 and 9 and the die coating method shown in Coating Condition A below, dried, at 30° C. for 15 seconds and at 80° C. for 60 seconds, further dried at 100° C. for 8 minutes, and then irradiated with an ultraviolet ray at an irradiation dose of 300 mJ/cm$^2$ by using an air-cooled metal halide lamp (manufactured by Eye Graphics Co., Ltd.) of 240 W/cm under nitrogen purging to give an atmosphere having an oxygen concentration of 0.1%, thereby curing the coating layers. In this way, an antireflection film was prepared.

Condition: Simultaneous Superposition-4

A 80 μm-thick triacetyl cellulose film (FUJI-TAC TD80UF, produced by Fuji Photo Film Co., Ltd.) in a roll form was unrolled, and the coating solution for hardcoat layer and the coating solution for low refractive index layer were coated thereon by using the geeser shown in FIGS. 7A, 8 and 9 and the die coating method shown in Coating Condition A below, dried at 30° C. for 15 seconds and at 80° C. for 60 seconds, and further dried at 100° C. for 8 minutes in an atmosphere having an oxygen concentration reduced to 0.1% by nitrogen purging, thereby curing the coating layers. In this way, an antireflection film was prepared.

(Coating Condition A):

The coating solution for hardcoat layer was supplied from a pocket 15 and coated by a slot 16. The coating solution for low refractive index layer was supplied from a slot 50 and coated by a slide 51. In the slot die 13 used, the upstream lip land length I$_{UP}$ was 0.5 mm, the downstream lip land length I$_{LO}$ was 50 μm, the opening length of the slot 16 in the web running direction was 150 μm, and the length of the slot 16 was 50 mm. The gap between the upstream lip land 18a and the web W was made 50 μm longer than the gap between the downstream lip land 18b and the web W, and the gap G$_L$ between the downstream lip land 18b and the web W was set to 70 μm. Also, the gap G$_S$ between the side plate 40b of the low-pressure chamber 40 and the web W and the gap G$_B$ between the back plate 40a and the web W both were set to 200 μm. The length of the slide 51 from the outlet 52a of the slot 52 to the coating part was set to 5 mm. On the slot die shown in FIG. 7A, a cover shown by 55 of FIG. 6 was disposed so that the cross-sectional area defined by the cover 55, the slide surface and the backup roll could be 59.5 mm$^2$. The coating was performed at a coating speed of 30 m/min to give a wet coated amount of the coating solution for hardcoat layer of 30 ml/m$^2$ and a wet coated amount of the coated solution for low refractive index layer of 3.5 ml/m$^2$. The film thickness of the hardcoat layer formed under this coating condition was 10 μm, and the firm thickness of the low refractive index layer was 95 nm. Incidentally, the coating width and the effective width were set to 1,300 mm and 1,280 mm, respectively.

Condition: Sequential Superposition-1

A 80 μm-thick triacetyl cellulose film (FUJI-TAC TD80UF, produced by Fuji Photo Film Co., Ltd.) in a roll form was unrolled, the coating solution for hardcoat layer was coated thereon by using the geeser shown in FIGS. 7A, 8 and 9 and the die coating method shown in Coating Condition B below, dried at 30° C. for 15 seconds and at 80° C. for 60 seconds and then irradiated with an ultraviolet ray at an irradiation dose of 60 mJ/cm$^2$ by using an air-cooled metal halide lamp (manufactured by Eye Graphics Co., Ltd.) of 160 W/cm under nitrogen purging, thereby curing the coating layer, and the resulting film was then taken up to prepare a triacetyl cellulose film having coated thereon a hardcoat layer having a film thickness of 10 μm.

The triacetyl cellulose film having coated thereon a hardcoat layer was again unrolled, the coating solution for low refractive index layer was coated thereon under Coating Condition B below, dried at 80° C. for 60 seconds and then irradiated with an ultraviolet ray at an irradiation dose of 300 mJ/cm$^2$ by using an air-cooled metal halide lamp (manufactured by Eye Graphics Co., Ltd.) of 240 W/cm under nitrogen purging to give an atmosphere having an oxygen concentration of 0.1%, thereby forming a low refractive index layer having a thickness of 95 nm, and the resulting film was taken up to prepare an antireflection film.

Condition: Sequential Superposition-2

A 80 μm-thick triacetyl cellulose film (FUJI-TAC TD80UF, produced by Fuji Photo Film Co., Ltd.) in a roll form was unrolled, the coating solution for hardcoat layer was coated thereon by using the geeser shown in FIGS. 7A, 8 and 9 and the die coating method shown in Coating Condition B below, dried at 30° C. for 15 seconds and at 80° C. for 60 seconds and further dried at 100° C. for 8 minutes, thereby curing the coating layer to form a hardcoat layer, and the resulting film was then taken up to prepare a triacetyl cellulose film having coated thereon a hardcoat layer having a film thickness of 10 μm.

The triacetyl cellulose film having coated thereon a hardcoat layer was again unrolled, the coating solution for low refractive index layer was coated thereon under Coating Condition B below, dried at 80° C. for 60 seconds and further dried at 100° C. for 8 minutes to form a low refractive index layer having a thickness of 95 nm, and the resulting film was taken up. In this way, antireflection films were prepared.

(Coating Condition B):

The coating solution was supplied from a pocket 15 and coated by a slot 16. A slot 50 was not prepared. In the slot die 13 used, the upstream lip land length $I_{UP}$ was 0.5 mm, the downstream lip land length $I_{LO}$ was 50 μm, the opening length of the slot 16 in the web running direction was 150 μm, and the length of the slot 16 was 50 mm. The gap between the upstream lip land 18a and the web W was made 50 μm longer than the gap between the downstream lip land 18b and the web W, and the gap $G_L$ between the downstream lip land 18b and the web W was set to 70 μm in the case of hardcoat layer and to 50 μm in the case of low refractive index layer. Also, the gap $G_S$ between the side plate 40b of the low-pressure chamber 40 and the web W and the gap $G_B$ between the back plate 40a and the web W both were set to 200 μm. According to the liquid physical properties of each coating solution, the coating was performed at a coating speed of 30 m/min to give a wet coated amount of 30 ml/m² in the case of hardcoat layer and performed at a coating speed of 30 m/min to give a wet coated amount of 3.5 ml/m² in the case of low refractive index layer. Incidentally, the coating width and the effective width were set to 1,300 mm and 1,280 mm, respectively.

TABLE 15

| | Coating Solution for Hardcoat Layer | Coating Solution for Low Refractive Index Layer | Coating System | Scratch Resistance | Average Reflectance | Mixing Region |
|---|---|---|---|---|---|---|
| Example 1 | HL-1 | LL-1 | Simultaneous Superposition-1 | ○ | 2.7% | ○ |
| Example 2 | HL-2 | LL-2 | Simultaneous Superposition-1 | ○ | 2.7% | ○ |
| Example 3 | HL-2 | LL-3 | Simultaneous Superposition-1 | ○ | 2.7% | ○ |
| Example 4 | HL-2 | LL-4 | Simultaneous Superposition-1 | ○ | 2.7% | ○ |
| Example 5 | HL-2 | LL-5 | Simultaneous Superposition-1 | ○ | 2.7% | ○ |
| Example 6 | HL-2 | LL-6 | Simultaneous Superposition-1 | ○ | 2.7% | ○ |
| Example 7 | HL-2 | LL-7 | Simultaneous Superposition-1 | ○ | 2.7% | ○ |
| Example 8 | HL-2 | LL-9 | Simultaneous Superposition-1 | ○ | 2.7% | ○ |
| Example 9 | HL-2 | LL-10 | Simultaneous Superposition-1 | ○ | 2.0% | ○ |
| Example 10 | HL-3 | LL-8 | Simultaneous Superposition-4 | ○ | 2.7% | ○ |
| Example 11 | HL-2 | LL-8 | Simultaneous Superposition-3 | ○Δ | 2.7% | ○ |
| Example 12 | HL-4 | LL-16 | Simultaneous Superposition-2 | ○ | 2.0% | ○ |
| Example 13 | HL-5 | LL-16 | Simultaneous Superposition-2 | ○ | 2.0% | ○ |
| Example 14 | HL-6 | LL-16 | Simultaneous Superposition-2 | ○ | 2.0% | ○ |
| Example 15 | HL-7 | LL-16 | Simultaneous Superposition-2 | ○ | 2.0% | ○ |
| Example 16 | HL-8 | LL-16 | Simultaneous Superposition-2 | ○ | 2.0% | ○ |
| Example 17 | HL-9 | LL-16 | Simultaneous Superposition-2 | ○ | 2.0% | ○ |
| Example 18 | HL-9 | LL-11 | Simultaneous Superposition-2 | ○ | 2.7% | ○ |
| Example 19 | HL-9 | LL-12 | Simultaneous Superposition-2 | ○ | 2.7% | ○ |
| Example 20 | HL-9 | LL-13 | Simultaneous Superposition-2 | ○ | 2.7% | ○ |
| Example 21 | HL-9 | LL-14 | Simultaneous Superposition-2 | ○ | 2.7% | ○ |
| Example 22 | HL-9 | LL-15 | Simultaneous Superposition-2 | ○ | 2.7% | ○ |
| Example 23 | HL-11 | LL-17 | Simultaneous Superposition-1 | ○ | 2.7% | ○ |
| Example 24 | HL-11 | LL-18 | Simultaneous Superposition-1 | ○ | 2.7% | ○ |
| Example 25 | HL-10 | LL-17 | Simultaneous Superposition-1 | ○ | 2.7% | ○ |
| Example 26 | HL-10 | LL-11 | Simultaneous Superposition-3 | ○Δ | 2.7% | ○ |
| Comparative Example 1 | HL-2 | LL-17 | Simultaneous Superposition-1 | ΔX | 2.7% | ○ |
| Comparative Example 2 | HL-4 | LL-8 | Simultaneous Superposition-4 | Δ | 2.7% | ○ |
| Comparative Example 3 | HL-4 | LL-1 | Simultaneous Superposition-3 | X | 2.7% | ○ |
| Comparative Example 4 | HL-2 | LL-11 | Simultaneous Superposition-3 | ΔX | 2.7% | ○ |
| Comparative Example 5 | HL-2 | LL-1 | Sequential superposition-1 | ΔX | 2.7% | X |
| Comparative Example 6 | HL-4 | LL-11 | Sequential superposition-2 | Δ | 2.7% | X |

(Evaluation of Optical Film)

The optical film samples obtained were evaluated on the following items. The results a shown in the Table above.

(1) Average Reflectance

The back surface of the film was roughened with sand paper and then treated with black ink to eliminate the back surface reflection and in this state, the integral spectral reflectance on the front surface side was measured at an incident angle of 5° in the wavelength region of 380 to 780 nm by using a spectrophotometer (manufactured by JASCO Corp.). The arithmetic mean value of integral reflectances at 450 to 650 nm was used for the result.

(2) Evaluation of Scratch Resistance

A rubbing test was performed using a rubbing tester under the following conditions.

Environmental conditions of evaluation: 25° C. and 60% RH

Rubbing Material:

A steel wool {No. 0000, manufactured by Nippon Steel Wool K.K.} was wound around the rubbing tip (1 cm×1 cm) of the tester coming into contact with the sample and fixed by a band not to move. Thereafter, the steel wool was rubbed back and force under the following conditions.

Moving distance (one way): 13 cm

Rubbing rate: 13 cm/sec

Load: 500 g/cm$^2$

Contact area of tip: 1 cm×1 cm

Number of rubbings: 20 reciprocations

An oily black ink was applied to the back side of the rubbed sample and observed by reflected light with an eye, and scratches on the rubbed portion were evaluated according to the following criteria.

○: Scratches were not observed at all even by very careful observation.

○Δ: Weak scratches were slightly observed by very careful observation.

Δ: Weak scratches were observed.

ΔX: Scratches of medium degree were observed.

X: Scratches were observed at the first glance.

The level ○Δ or higher was judged OK.

(3) Confirmation of Mixing Region

An ultrathin section of the cross section of the antireflection film obtained was prepared and the vicinity of interface between the hardcoat layer and the low refractive index layer (region of 1 μm or less from the interface) was photographed at a magnification of 150,000 by using Hitachi transmission electron microscope H-9500. When judged that disturbance is not present in the vicinity of the interface in the image photographed, this was rated X, and when judged that a mixing region ascribable to migration of materials in other layers into the vicinity of the interface is present, this was rated ○.

The results in the Table above revealed the followings.

First, the embodiment where two layers each contains a compound including the radical polymerization functional group is described below.

In Examples 1 to 9 (an embodiment where the coating solution for hardcoat layer contains a radical polymerizable compound and a photoradical polymerization initiator; an embodiment where the coating solution for low refractive index layer contains a radical polymerizable compound and a photoradical polymerization initiator), the antireflection film of the present invention produced under the condition of Simultaneous Superposition-1 (only photo-curing treatment) has good scratch resistance.

In Example 10 (an embodiment where the coating solution for hardcoat layer contains a radical polymerizable compound and a thermal radical polymerization initiator; an embodiment where the coating solution for low refractive index layer contains a radical polymerizable compound and a thermal radical polymerization initiator), the antireflection film of the present invention produced under the condition of Simultaneous Superposition-2 (only heat curing treatment) has good scratch resistance.

In Example 11 (an embodiment where the coating solution for hardcoat layer contains a radical polymerizable compound and a photoradical polymerization initiator; an embodiment where the coating solution for low refractive index layer contains a radical polymerizable compound and a thermal radical polymerization initiator), the scratch resistance of the antireflection film of the present invention produced under the condition of Simultaneous Superposition-3 (photo-curing treatment after heat curing treatment) is inferior to that of Examples 1 to 10.

The embodiment where two layers simultaneously coated each contains at least either one of a hydroxyl group-containing compound and a curing agent capable of reacting with the hydroxy group, is described below. In the following, the compound of this embodiment is collectively referred to as a hydroxyl group-curing type compound.

In Examples 12 to 22 (an embodiment where the coating solution for hardcoat layer contains a hydroxyl group-curing type compound and a thermal acid generator; an embodiment where the coating solution for low refractive index layer contains a hydroxyl group-curing type compound and a thermal acid generator), the antireflection film of the present invention produced under the condition of Simultaneous Superposition-2 (only heat curing treatment) has good scratch resistance.

In Examples 23 to 25 (an embodiment where the coating solution for hardcoat layer contains a hydroxyl group-curing type compound and a photoacid generator; an embodiment where the coating solution for low refractive index layer contains a hydroxyl group-curing type compound and a photoacid generator), the antireflection film of the present invention produced under the condition of Simultaneous Superposition-1 (only photo-curing treatment) has good scratch resistance.

In Example 26 (an embodiment where the coating solution for hardcoat layer contains a hydroxyl group-curing type compound and a photoacid generator; an embodiment where the coating solution for low refractive index layer contains a hydroxyl group-curing type compound and a thermal acid generator), the scratch resistance of the antireflection film of the present invention produced under the condition of Simultaneous Superposition-3 (photo-curing treatment after heat curing treatment) is inferior to that of Examples 12 to 25.

The scratch resistance of the antireflection film produced under respective conditions in Comparative Example 1 (an embodiment where the coating solution for hardcoat layer contains a radical polymerizable compound and a photoradical polymerization initiator; an embodiment where the coating solution for low refractive index layer contains a hydroxyl group-curing type compound and a photoacid generator; Simultaneous Superposition-1 (only photo-curing treatment)), in Comparative Example 2 (an embodiment where the coating solution for hardcoat layer contains a hydroxyl group-curing type compound and a thermal acid generator; an embodiment where the coating solution for low refractive index layer contains a radical polymerizable compound and a thermal radical polymerization initiator; Simultaneous Superposition-4 (only heat curing treatment)), in Comparative Example 3 (an embodiment where the coating solution for hardcoat layer contains a hydroxyl group-curing type compound and a thermal acid generator; an embodiment where the coating solution for low refractive index layer contains a radical polymerizable compound and a photoradical polymerization initiator; Simultaneous Superposition-3 (photo-curing treatment after heat curing treatment)), and in Comparative Example 4 (an embodiment where the coating solution for hardcoat layer contains a radical polymerizable compound and a photoradical polymerization initiator; an embodiment where the coating solution for low refractive index layer contains a hydroxyl group-curing type compound and a thermal acid generator; Simultaneous Superposition-3 (photo-curing treatment after heat curing treatment)) is poor as compared with the present invention.

The scratch resistance of the antireflection film produced in Comparative Examples 5 and 6 is poor as compared with the present invention due to the sequential coating (sequential superposition).

In the case of an embodiment where the coating solution for hardcoat layer and the coating solution for low refractive index layer both contain a radical polymerizable compound and a radical polymerizable initiator or both contain a hydroxyl group-curing type compound and a curable catalyst, the antireflection film produced by the production method of the present invention is improved in the interface adhesion, and the scratch resistance thereof is enhanced. The average reflectance of the antireflection film is not different between the simultaneous superposition and the sequential superposition, and the antireflection film produced by the production method of the present invention has good average reflectance.

From the results of Examples 1 to 10 and Examples 12 to 25, it is seen that when the coating solution for hardcoat layer and the coating solution for low refractive index layer each is formulated as a coating solution treated by the same curing condition (all layers are heat-cured or all layers are photo-cured), the interface adhesion is more improved and the scratch resistance is more enhanced. Furthermore, when the same curing condition is applied to respective layers, the production process can be simplified.

On the other hand, in the case of the condition of sequential superposition, as seen from the results of Comparative Example 5 (an embodiment where the coating solution for hardcoat layer contains a radical polymerizable compound and a photoradical polymerization initiator; an embodiment where the coating solution for low refractive index layer contains a radical polymerizable compound and a photoradical polymerization initiator), even in an embodiment where the coating solution for hardcoat layer and the coating solution for low refractive index layer both contain a radical polymerizable compound and a photoradical polymerization initiator, the scratch resistance is poor. The reason thereof is not clear but is considered because the density of the functional group capable of bonding at the interface between the hardcoat layer and the low functional layer is decreased and due to no mixing of the hardcoat layer and the low refractive index layer at the interface, the physical adhesion is lowered.

Even by the simultaneous superposition, in the case of not an embodiment where the coating solution for hardcoat layer and the coating solution for low refractive index layer (at least two kinds of coating compositions) both contain a radical polymerizable compound and a radical polymerization initiator or both contain a hydroxyl group-curing type compound and a curing catalyst, the scratch resistance is sometimes poor. The reason thereof is not clear but is considered because the polymerization initiator and/or curing catalyst cannot diffuse into other layers and contribute to curing of each layer.

From the Table above, it is seen that the mixing region is generated in the production process using simultaneous superposition and even when a mixing region is present, the antireflection effect by optical interference is brought about. Furthermore, the low refractive index layer using hollow silica has a low average reflectance and gives an excellent antireflection film.

A laminate was produced in the same manner as in Example 9 except that a coating solution for low refractive index layer prepared by changing Sol a-1 to the same mass of Sol a-2 was used in Example 9. As a result of the same evaluation, a laminate similarly having excellent scratch resistance was obtained.

Laminates were produced by not performing nitrogen purging at the photocuring in Examples 23 to 25 and evaluated in the same manner, as a result, almost the same scratch resistance was obtained.

Examples B1 to B10 and Comparative Examples B1 to B14

Synthesis of Perfluoroolefin Copolymer (FP-2)

A perfluoroolefin copolymer was synthesized in the same manner in (Synthesis of Perfluoroolefin Copolymer (FP-1)) except for changing 20 mass % of ethyl acetate to isopropyl alcohol. The obtained polymer had a refractive index of 1.421, a number average molecular weight of 3,000 and a mass average molecular weight of 4,000.

(Synthesis of Perfluoroolefin Copolymer (TP3))

A perfluoroolefin copolymer was synthesized in the same manner as in (Synthesis of Fluorine-Containing Polymer TP1) except for not using polymerizable silicon compound Silaplane FM-0725. The number average molecular weight of the obtained polymer was 20,000 and the mass average molecular weight of the obtained polymer was 41,000.

[Preparation of Silica Liquid Dispersion B]

The silica liquid dispersion before surface treatment with acryloyloxypropyltrimethoxysilane in Preparation of Silica Liquid Dispersion A was designated as Silica Liquid Dispersion B.

[Preparation of Silica Liquid Dispersion C]

Silica Liquid Dispersion C was obtained by performing surface treatment and solvent displacement in the same manner as in Liquid Dispersion A except that in Preparation of Liquid Dispersion A, tridecafluorooctyltrimethoxysilane was replaced by the same mass of acryloyloxypropyltrimethoxysilane.

[Preparation of Silica Liquid Dispersion D]

A silica particle having a refractive index of 1.27 was prepared by changing the particle preparation conditions in Preparation of Silica Liquid Dispersion A to give an average particle diameter of 80 nm, a shell thickness of 10 nm, and a silica concentration of 20 mass %. Silica Liquid Dispersion D was obtained using this particle by performing the same surface treatment and solvent displacement as in Silica Liquid Dispersion C.

[Preparation of Coating Solutions (LL-19) to (LL-28) for Low Refractive Index Layer]

Coating Solutions (LL-19) to (LL-28) for Low Refractive Index Layer were prepared in the same manner as (LL-1) except that in Preparation of Coating Solution (LL-1) for Low Refractive Index Layer, the composition was changed as shown in the Table below.

TABLE 16

| No. | Fluorine-Containing Polymer Kind | Parts by Mass | Curable Compound Kind | Parts by Mass | Polymerization Initiator/Catalyst Kind | Parts by Mass | Fine Particle Kind | Parts by Mass |
|---|---|---|---|---|---|---|---|---|
| LL-19 | FP-2 | 100 | — | — | 907 | 5 | — | — |
| LL-20 | FP-1 | 100 | — | — | 907 | 5 | — | — |
| LL-21 | PP-2 | 100 | — | — | 907 | 5 | — | — |
| LL-22 | TP3 | 80 | CY303 | 20 | PTS/b-14 | 2 | — | — |
| LL-23 | TP1 | 80 | CY303 | 20 | PTS/b-14 | 2 | — | — |
| LL-24 | PP-34 | 100 | — | — | UVI-6990 | 5 | — | — |
| LL-25 | — | — | DPHA | 45 | 907 | 2 | Dispersion B | 55 |
| LL-26 | — | — | DPHA | 28 | 907 | 2 | Dispersion C | 72 |
| LL-27 | — | — | DPHA | 28 | 907 | 2 | Dispersion A | 72 |
| LL-28 | — | — | DPHA | 28 | 907 | 2 | Dispersion D | 72 |

The contents of the compounds used in the Table above are shown below. In the Table, the "parts" indicates "parts by mass of the solid content" in all cases.
Fluorine-Containing Polymer:
  PP-2*: Compound PP-2
  PP-34*: Compound PP-34
  PTS/b-14: PTS and an isolated salt of Organic Base b-14
  Liquid Dispersion A: Silica Liquid Dispersion A
  Liquid Dispersion B: Silica Liquid Dispersion B
  Liquid Dispersion C: Silica Liquid Dispersion C
  Liquid Dispersion D: Silica Liquid Dispersion D
Preparation of Coating Solution for Hardcoat Layer:
  The materials were mixed according to the Table below and then filtered through a polypropylene-made filter having a pore size of 30 µm to prepare Coating Solutions HL-12 to HL-14 for Hardcoat Layer.

TABLE 17

| | HL-12 | HL-13 | HL-14 |
|---|---|---|---|
| Polymethyl methacrylate | 1.4 | 1.4 | 1.4 |
| DPHA | 33 | — | — |
| CY303 | — | 27 | — |
| Pentaerythritol | — | 6 | — |
| EX314 | — | — | 33 |
| 907 | 1.6 | — | — |
| PTS/b-14 | — | 1.2 | — |
| UVI-6990 | — | — | 1.6 |
| Dispersion of 3-µm crosslinked polymethyl methacrylate particle | 15 | 15 | 15 |
| Methyl ethyl ketone | 14 | 14 | 14 |
| Methyl isobutyl ketone | 35 | 35 | 35 |

The contents of the compounds used in the Table above are shown below. In the Table, the "parts" indicates "parts by mass of the solid content" in all cases.
Polymethyl Methacrylate:
  A polymethyl methacrylate powder (mass average molecular weight: 120,000, produced by Aldrich).
3-µm Crosslinked Polymethyl Methacrylate Particle:
  A 30% methyl ethyl ketone liquid dispersion of MXS-300 (3-µm crosslinked polymethyl methacrylate particle [produced by The Soken Chemical & Engineering Co., Ltd.]); used after dispersion in a polytron dispersing machine at 10,000 rpm for 20 minutes.
PTS/b-14:
  PTS and an isolated salt of Organic Base b-14.
(Production of Laminate by Simultaneous Superposition)
  The preparation of antireflection film was performed by combining a hardcoat layer and a low refractive index layer under the coating conditions shown below.

Condition: Simultaneous Superposition-5
  The same simultaneous superposition condition as Simultaneous Superposition-1 except that in Simultaneous Superposition-1, the wet coated amount of the coating solution for hardcoat layer under Coating Condition A was changed to 15 ml/m$^2$. The film thickness of the hardcoat layer formed under this coating condition is 5 µm.
Condition: Simultaneous Superposition-6
  The same simultaneous superposition condition as Simultaneous Superposition-2 except that in Simultaneous Superposition-2, the wet coated amount of the coating solution for hardcoat layer under Coating Condition A was changed to 15 ml/m$^2$. The film thickness of the hardcoat layer formed under this coating condition is 5 µm.
Condition: Simultaneous Superposition-7
  The same simultaneous superposition condition as Simultaneous Superposition-3 except that in Simultaneous Superposition-3, the wet coated amount of the coating solution for hardcoat layer under Coating Condition A was changed to 15 ml/m$^2$. The film thickness of the hardcoat layer formed under this coating condition is 5 µm.
Condition: Sequential Superposition-3
  The same sequential superposition condition as Sequential Superposition-1 except that in Sequential Superposition-1, the wet coated amount of the coating solution for hardcoat layer under Coating Condition B was changed to 15 ml/m$^2$. The film thickness of the hardcoat layer formed under this coating condition is 5 µm.
Condition: Sequential Superposition-4
  The same sequential superposition condition as Sequential Superposition-2 except that in Sequential Superposition-2, the wet coated amount of the coating solution for hardcoat layer under Coating Condition B was changed to 15 ml/m$^2$. The film thickness of the hardcoat layer formed under this coating condition is 5 µm.
Condition: Sequential Superposition-5
  The same sequential superposition condition as Sequential Superposition-3 except that in Sequential Superposition-3, the drying/curing conditions after coating of the low refractive index layer were changed to drying at 80° C. for 60 seconds and then curing at 100° C. for 8 minutes.
Condition: Sequential Superposition-6
  The same sequential superposition condition as Sequential Superposition-4 except that in Sequential Superposition-4, the drying/curing conditions after coating of the low refractive index layer were changed to drying at 80° C. for 60 seconds and then irradiation of an ultraviolet ray at an irradiation dose of 300 mJ/cm$^2$ using an air-cooled metal halide lamp (manufactured by Eye Graphics Co., Ltd.) of 240 W/cm under nitrogen purging to give an atmosphere having an oxygen concentration of 0.1%.

TABLE 18

| | Coating Solution for Hardcoat Layer | Coating Solution for Low Refractive Index Layer | Coating System | Scratch Resistance | Average Reflectance | Repelling |
|---|---|---|---|---|---|---|
| Example-B1 | HL-12 | LL-19 | Simultaneous Superposition-5 | ○Δ | 2.9 | ○Δ |
| Example-B2 | HL-12 | LL-20 | Simultaneous Superposition-5 | ○ | 2.8 | ○Δ |
| Example-B3 | HL-12 | LL-21 | Simultaneous Superposition-5 | ○ | 2.7 | ○ |
| Example-B4 | HL-13 | LL-22 | Simultaneous Superposition-6 | ○ | 2.8 | ○Δ |
| Example-B5 | HL-13 | LL-23 | Simultaneous Superposition-6 | ○ | 2.7 | ○ |
| Example-B6 | HL-14 | LL-24 | Simultaneous Superposition-5 | ○ | 2.7 | ○ |
| Example-B7 | HL-12 | LL-25 | Simultaneous Superposition-5 | ○ | 3.0 | ○ |
| Example-B8 | HL-12 | LL-26 | Simultaneous Superposition-5 | ○ | 2.9 | ○ |
| Example-B9 | HL-12 | LL-27 | Simultaneous Superposition-5 | ○ | 2.8 | ○ |
| Example-B10 | HL-12 | LL-28 | Simultaneous Superposition-5 | ○ | 2.5 | ○ |
| Comparative Example-B1 | HL-12 | LL-19 | Sequential Superposition-3 | X | 3.3 | X |
| Comparative Example-B2 | HL-12 | LL-20 | Sequential Superposition-3 | X | 3.2 | X |
| Comparative Example-B3 | HL-12 | LL-21 | Sequential Superposition-3 | Δ | 2.7 | ○Δ |
| Comparative Example-B4 | HL-13 | LL-22 | Sequential Superposition-4 | X | 3.2 | X |
| Comparative Example-B5 | HL-13 | LL-23 | Sequential Superposition-4 | Δ | 2.7 | ○Δ |
| Comparative Example-B6 | HL-14 | LL-24 | Sequential Superposition-3 | Δ | 2.7 | ○Δ |
| Comparative Example-B7 | HL-12 | LL-25 | Sequential Superposition-3 | X | 3.5 | X |
| Comparative Example-B8 | HL-12 | LL-26 | Sequential Superposition-3 | X | 3.3 | X |
| Comparative Example-B9 | HL-12 | LL-27 | Sequential Superposition-3 | Δ | 2.9 | ○Δ |
| Comparative Example-B10 | HL-12 | LL-28 | Sequential Superposition-3 | Δ | 2.6 | ○Δ |
| Comparative Example-B11 | HL-12 | LL-22 | Simultaneous Superposition-7 | X | 3.2 | X |
| Comparative Example-B12 | HL-12 | LL-22 | Sequential Superposition-5 | X | 3.2 | X |
| Comparative Example-B13 | HL-13 | LL-20 | Simultaneous Superposition-7 | X | 3.2 | X |
| Comparative Example-B14 | HL-13 | LL-20 | Sequential Superposition-6 | X | 3.2 | X |

The antireflection films obtained were further subjected to the following evaluation of (4). The results obtained are shown together in the Table above.

(4) Repelling of Low Refractive Index Layer

The antireflection film was cut into an A4-size sheet, a PET film with black adhesive was laminated on the back surface, and the repelling was evaluated with an eye under 500 lux of a three-wavelength fluorescent lamp according to the following criteria. Five A4-size sheets were observed and the frequency of occurrence of repelling was evaluated. In addition to the evaluation with an eye, the number of occurrences of repelling in a 0.2-mm square was observed through an optical microscope at a magnification of 400 times.

○: Repelling is not recognized either with an eye or through a microscope.

○Δ: Repelling is not recognized with an eye but from 1 to 3 occurrences of repelling recognizable only through a microscope are present in a 1-mm square.

Δ: From 1 to 4 occurrences of repelling recognizable with an eye are present in five A4-size sheets.

X: Five or more occurrences of repelling recognizable with an eye are present in five A4-size sheets.

The level of ○Δ or higher was judged OK.

As seen from Table 18, the laminate according to the present invention where two layers simultaneously coated are obtained by simultaneously coating, drying and curing coating compositions containing compounds having polymerizable functional groups capable of forming a chemical bond is reduced in the occurrence of repelling, excellent in the scratch resistance and assured of low reflection.

As for the degree of occurrence of repelling, when the compounds contained in two layers of hardcoat layer and low refractive index layer have polymerizable functional groups capable of forming a chemical bond in common, repelling is readily generated in the case of sequential coating (Comparative Examples B1 to B3, Comparative Examples B4 and B5, Comparative Example B6, and Comparative Examples B7 to B10) but is reduced in the case of coating by simultaneous superposition and is more improved in the case where the compound containing a silicone-based compound within the molecule is incorporated into the upper layer (Examples B1 to B3, Examples B4 and B5, Example B6, and Examples B7 to B10). Even in the case of coating by simultaneous superposition, when the compounds contained in two layers take different polymerization forms and do not contain polymerizable functional groups capable of forming a chemical bond, repelling readily occurs and the scratch resistance is also bad (Comparative Examples B11 and B13).

In addition, a laminate was produced by not performing nitrogen purging at the photocuring in Example B6 and evaluated in the same manner, as a result, a laminate having good scratch resistance was obtained.

According to the present invention, a production method of a laminate (preferably a laminate for optical film or a laminate for antireflection film) assured of good productivity and good scratch resistance can be provided. Also, by using the laminate produced by the production method of the present invention, an antireflection film, a polarizing plate and an image display device each assured of good scratch resistance can be produced.

The entire disclosure of each and every foreign patent application from which the benefit of foreign priority has been claimed in the present application is incorporated herein by reference, as if fully set forth.

What is claimed is:

1. A method for producing a laminate comprising a support and at least two layers provided by coating at least two kinds of coating compositions, respectively, the method comprising:
   simultaneously coating at least two kinds of coating compositions on a support;
   drying the at least two kinds of coating compositions to form at least two layers; and
   curing the at least two layers by at least one of a heat treatment and an irradiation with ionizing radiation,
   wherein the at least two kinds of coating compositions each comprises a compound having a polymerizable functional group,
   wherein the at least two kinds of coating compositions are simultaneously coated onto the support from at least one slot die and at least one slide coating head, respectively, of a coating apparatus comprising the at least one slot die and the at least one slide coating head disposed in a vicinity of an end part of the at least one slot die, while the support is supported by a backup roller,
   wherein a length of a slide surface of the slide coating head is from 1.5 to 50 mm,
   wherein a coating amount of the coating composition flown from the slide coating head is 100 cc/m$^2$ or less,
   wherein a cover for covering the entire slide surface is provided and a cross-sectional area defined by the cover, the slide surface, and the backup roller is 550 mm$^2$ or less,
   wherein the dried and cured at least two layers coated simultaneously comprise an upper layer having a thickness of from 30 nm to less than 200 nm and a lower layer having a thickness of from 0.5 to 20 μm in which the support, the lower layer, and the upper layer are provided in this order, and
   wherein the upper layer contains a silicone-based compound and hollow silica particles.

2. The method according to claim 1, wherein the at least two kinds of coating compositions each comprises a radical polymerizable compound and a radical polymerization initiator.

3. The method according to claim 2, wherein the radical polymerization initiators contained in the at least two kinds of coating compositions all are photoradical polymerization initiators.

4. The method according to claim 2, wherein the radical polymerizable compound comprises at least one compound having at least two (meth)acryloyl groups within one molecule.

5. The method according to claim 1, wherein layers provided by coating the at least two kinds of coating compositions each has a refractive index different from a refractive index of a layer adjacent thereto.

6. The method according to claim 1, wherein in a vicinity of an interface between layers provided by coating the at least two kinds of coating compositions, a mixing region in which the compound having a polymerizable functional group capable of forming a chemical bond to each other is allowed to migrate from respective layers and mixed is present.

7. The method according to claim 1, wherein the upper layer has a refractive index which is lower than a refractive index of the lower layer, and the upper layer having a lower refractive index comprises a fluorine-containing polymer having a polysiloxane partial structure.

8. The method according to claim 1, wherein the upper layer has a refractive index which is lower than a refractive index of the lower layer, and the upper layer having a lower refractive index comprises a particle whose refractive index is lower than that of the lower layer and whose particle size is from 30 to 150 nm.

9. The method according to claim 8, wherein the particle is surface-treated with a compound having an alkyl group or a fluorine-containing alkyl group.

* * * * *